US012672085B2

(12) United States Patent
Ma et al.

(10) Patent No.: US 12,672,085 B2
(45) Date of Patent: Jun. 30, 2026

(54) TIMING ADVANCE ADJUSTMENT

(71) Applicant: QUALCOMM Incorporated, San Diego, CA (US)

(72) Inventors: Liangping Ma, San Diego, CA (US); Changhwan Park, San Diego, CA (US); Xiao Feng Wang, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 198 days.

(21) Appl. No.: 18/069,097

(22) Filed: Dec. 20, 2022

(65) Prior Publication Data

US 2023/0262636 A1     Aug. 17, 2023

Related U.S. Application Data

(60) Provisional application No. 63/267,934, filed on Feb. 13, 2022.

(51) Int. Cl.
*H04W 56/00*          (2009.01)
(52) U.S. Cl.
CPC ..... *H04W 56/006* (2013.01); *H04W 56/0045* (2013.01)
(58) Field of Classification Search
CPC ........... H04W 56/0045; H04W 56/006; H04W 84/06; H04W 72/0446; H04W 24/10;
(Continued)

(56) References Cited

U.S. PATENT DOCUMENTS 8,811,433 B2     8/2014  Zhao et al.
10,278,175 B2 *  4/2019  Ahn ..................... H04W 56/004
(Continued)

FOREIGN PATENT DOCUMENTS

WO     WO-2018031966 A1     2/2018

OTHER PUBLICATIONS

Moderator (Thales): "FL Summary #1 on Enhancements on UL Time and Frequency Synchronization for NR NTN", 3GPP TSG-RAN WG1 Meeting #107-e, R1-2111123, 3rd Generation Partnership Project (3GPP), Mobile Competence Centre, 650, Route Des Lucioles, F-06921 Sophia-Antipolis Cedex, France, vol. 3GPP TSG-RAN WG1 Meeting #107-e, No. R1-2111123, e-Meeting, Nov. 11, 2021-Nov. 19, 2021, 99 Pages, Nov. 15, 2021, XP052097711, p. 30.

(Continued)

*Primary Examiner* — Nathan S Taylor
(74) *Attorney, Agent, or Firm* — Harrity & Harrity, LLP

(57)     ABSTRACT

Various aspects of the present disclosure generally relate to wireless communication. In some aspects, a user equipment (UE) may obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The UE may generate an adjusted timing advance value that is different from the current timing advance value by an amount that is less than the threshold. Numerous other aspects are described.

37 Claims, 23 Drawing Sheets

(58) Field of Classification Search

CPC ............. H04W 56/0005; H04W 72/23; H04W 74/0833; H04W 36/0077; H04W 36/322; H04W 56/0015; H04W 56/004; H04W 64/003; H04W 64/006; H04W 74/0836; H04W 24/08; H04W 28/0226; H04W 36/0058; H04W 36/0072; H04W 36/00835; H04W 36/304; H04W 36/32; H04W 36/326; H04W 36/34; H04W 36/362; H04W 4/021; H04W 4/024; H04W 4/029; H04W 4/80; H04W 48/14; H04W 56/00; H04W 56/005; H04W 56/0055; H04W 56/009; H04W 64/00; H04W 72/04; H04W 72/0453; H04W 72/0466; H04W 72/12; H04W 72/1268; H04W 72/21; H04W 72/232; H04W 74/006; H04W 74/0891; H04W 76/10; H04W 76/11; H04W 76/20; H04W 76/28; H04W 8/245; H04W 80/02; H04W 84/005; H04W 84/16; H04W 88/005; H04W 88/06; H04W 88/08; H04B 7/18563; H04B 7/1851; H04B 7/18513; H04B 7/18541; H04B 7/0695; H04B 7/18504; H04B 7/1853; H04L 5/0051; H04L 1/0038; H04L 1/1819; H04L 27/2607; H04L 27/2646; H04L 43/16; H04L 5/0044; H04L 5/0048; H04L 5/0053; H04L 5/0055; G01S 19/41; G01S 19/46; G01S 19/48; G01S 5/02521; G01S 5/0258; G01S 5/0278; G01S 5/06; Y02D 30/70

See application file for complete search history.

(56) References Cited

U.S. PATENT DOCUMENTS

| | | | | |
|---|---|---|---|---|
| 10,624,015 | B2 * | 4/2020 | Duan ..................... | H04W 36/34 |
| 11,122,633 | B2 * | 9/2021 | Bae ................... | H04W 56/0005 |
| 11,457,480 | B2 * | 9/2022 | Chai ..................... | H04W 72/23 |
| 11,540,324 | B2 | 12/2022 | Sakhnini et al. | |
| 11,805,492 | B2 * | 10/2023 | Ma ....................... | H04W 56/006 |
| 11,871,370 | B2 | 1/2024 | Lauridsen et al. | |
| 12,035,276 | B2 | 7/2024 | Jung et al. | |
| 12,273,913 | B2 * | 4/2025 | Xiong ............... | H04W 74/0866 |
| 12,289,676 | B2 * | 4/2025 | Li ..................... | H04W 52/0216 |
| 2019/0174523 | A1 * | 6/2019 | Wang ................... | H04L 5/0055 |
| 2019/0373602 | A1 * | 12/2019 | Qin ..................... | H04B 7/0404 |
| 2021/0258865 | A1 * | 8/2021 | Park ..................... | H04W 48/16 |
| 2022/0070811 | A1 | 3/2022 | Tripathi et al. | |
| 2022/0086780 | A1 | 3/2022 | Tsai et al. | |
| 2022/0124660 | A1 * | 4/2022 | Cheng .................. | H04W 72/23 |
| 2022/0124795 | A1 | 4/2022 | Wu et al. | |
| 2022/0232503 | A1 | 7/2022 | Cheng et al. | |
| 2022/0232504 | A1 | 7/2022 | Cozzo et al. | |
| 2022/0295225 | A1 | 9/2022 | Keating et al. | |
| 2022/0321206 | A1 * | 10/2022 | Shrestha ............. | H04W 56/004 |
| 2022/0322414 | A1 | 10/2022 | Khoshkholgh Dashtaki et al. | |
| 2022/0330191 | A1 | 10/2022 | Shin et al. | |
| 2022/0408389 | A1 * | 12/2022 | Wang ............... | H04W 56/0045 |
| 2023/0131305 | A1 | 4/2023 | Cozzo et al. | |
| 2023/0262636 | A1 * | 8/2023 | Ma ....................... | H04W 56/006 370/350 |
| 2023/0262687 | A1 | 8/2023 | Sayed Hassan et al. | |
| 2023/0269685 | A1 * | 8/2023 | Park .................. | H04W 56/0005 370/350 |
| 2023/0276336 | A1 * | 8/2023 | Wu ..................... | H04W 36/326 370/331 |
| 2023/0284165 | A1 * | 9/2023 | Ye ........................ | H04B 7/1851 370/503 |
| 2023/0336309 | A1 | 10/2023 | Zhuang et al. | |
| 2023/0337161 | A1 | 10/2023 | Ma et al. | |
| 2023/0396323 | A1 * | 12/2023 | Yavuz ................ | H04B 7/18513 |
| 2023/0397032 | A1 * | 12/2023 | Yavuz ................. | H04W 36/322 |
| 2023/0403068 | A1 | 12/2023 | Hu et al. | |
| 2023/0413131 | A1 * | 12/2023 | Shrestha ............... | H04W 72/23 |
| 2024/0057002 | A1 * | 2/2024 | Sun ..................... | H04W 72/232 |
| 2024/0196362 | A1 * | 6/2024 | Yamine ............... | H04W 64/003 |
| 2024/0204866 | A1 * | 6/2024 | Ciochina .............. | H04B 7/1851 |
| 2024/0267863 | A1 * | 8/2024 | Hong .................... | H04W 56/00 |
| 2024/0361469 | A1 * | 10/2024 | Dupray ................. | G01S 19/46 |
| 2024/0373505 | A1 * | 11/2024 | Ashraf ............. | H04W 72/0446 |

OTHER PUBLICATIONS

Partial International Search Report—PCT/US2023/060741—ISA/EPO—Apr. 18, 2023.

Qualcomm Incorporated: "Timing Requirements", 3GPP TSG-RAN WG4 Meeting # 101-bis-e, R4-2200421, 3rd Generation Partnership Project (3GPP), Mobile Competence Centre, 650, Route Des Lucioles, F-06921 Sophia-Antipolis Cedex, France, vol. 3GPP TSG-RAN WG4 Meeting # 101-bis-e, No. R4-2200421, Electronic Meeting, Jan. 17-25, 2022, 6 Pages, Nov. 17, 2022, XP052094829, the whole document.

RAN4 Vice Chair (Intel): "RAN4#101-bis-e RRM Session Meeting Report", 3GPP TSG-RAN WG4 Meeting #101-bis-e, R4-2202424, 3rd Generation Partnership Project (3GPP), Mobile Competence Centre, 650, Route Des Lucioles, F-06921 Sophia-Antipolis Cedex, France, vol. 3GPP TSG-RAN WG4 Meeting # 101-bis-e, No. R4-2202424, Jan. 17-25, 2022, 211 Pages, Jan. 17, 2022, XP052123018, p. 77.

International Search Report and Written Opinion—PCT/US2023/060741—ISA/EPO—Jun. 20, 2023.

3GPP: "RAN1 Chair's Notes", 3GPP TSG RAN WG1 Meeting #105-e, e-Meeting, May 10-27, 2021, Version 12, 145 pages.

3GPP TS 38.133: "3rd Generation Partnership Project, Technical Specification Group Radio Access Network, NR, Requirements for Support of Radio Resource Management (Release 17)", 3GPP TS 38.133, V17.4.0, Dec. 2021, 2884 Pages.

Apple: "Discussion on Timing Requirements for NR NTN", 3GPP TSG-RAN WG4 Meeting# 102-e, R4-2203794, 3rd Generation Partnership Project (3GPP), Mobile Competence Centre, 650, Route Des Lucioles, F-06921 Sophia-Antipolis Cedex, France, vol. RAN WG4, No. Electronic Meeting, Feb. 21, 2022-Mar. 3, 2022, 5Pages, Feb. 14, 2022, XP052115200, Section 2.

Asia Pacific Telecom et al., "UI Time and Frequency Synchronization in NTN", 3GPP TSG RAN WG1#104bis-e, R1-2102733, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, 9 Pages, Apr. 7, 2021, XP052177726, Section 2.1.

ETSI TS 138 133, "5G; NR; Requirements for Support of Radio Resource Management (3GPP TS 38.133 Version 16.4.0 Release16)", V16.4.0, Aug. 2020, 1465 pages.

Intel Corporation: "Discussion on the Remaining Issues for NTN Timing Requirements", 3GPP Tsg RAN4 Meeting #102-e, R4-2204419, 3rd Generation Partnership Project (3GPP), Mobile Competence Centre, 650, Route Des Lucioles, F-06921 Sophia-Antipolis Cedex, France, vol. RAN WG4, No. Electronic Meeting, Feb. 21, 2022-Mar. 3, 2022, 5 Pages, Feb. 14, 2022, XP052111767, Section 1, Section 2.

* cited by examiner

800

TA

815
TA resulting from
gradual TA adjustment

805
TA based on previous
combination

Combination
update

UL Tx

810
TA based on current
combination t0   t1   t2   t3          Time

1000

1025
Gradual TA adjustment using adjusted TA value

1020
TA based at least in part on updated TA value

1010
TA based at least in part on current combination

1015
TA based at least in part on non-updated TA value

1005
TA based at least in part on previous combination

TA

UL Tx

Time t0   t1   t2   t3

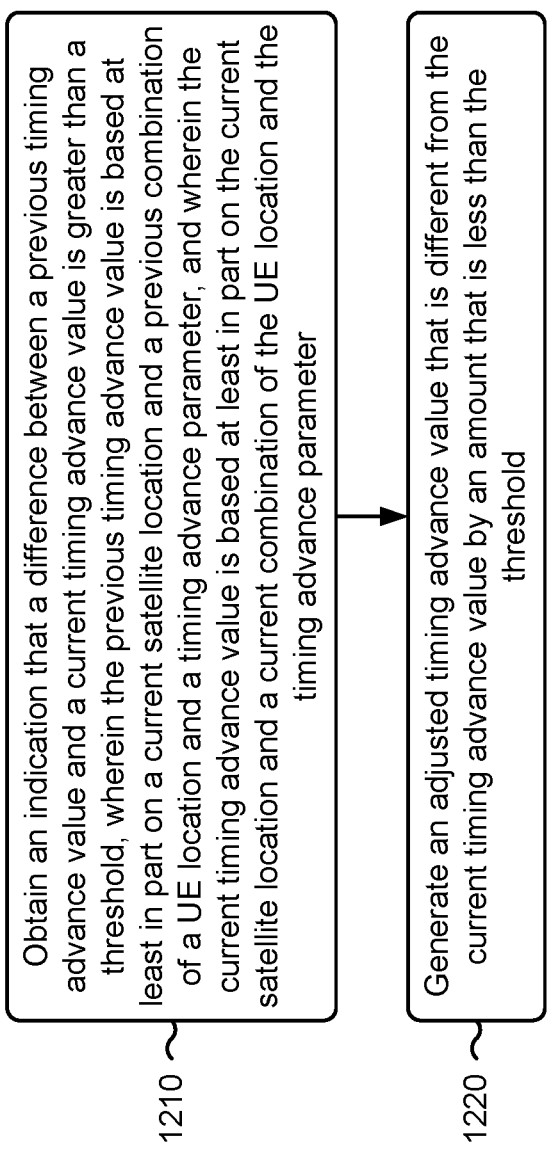

1200

1210 — Obtain an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter 1220 — Generate an adjusted timing advance value that is different from the current timing advance value by an amount that is less than the threshold

FIG. 12

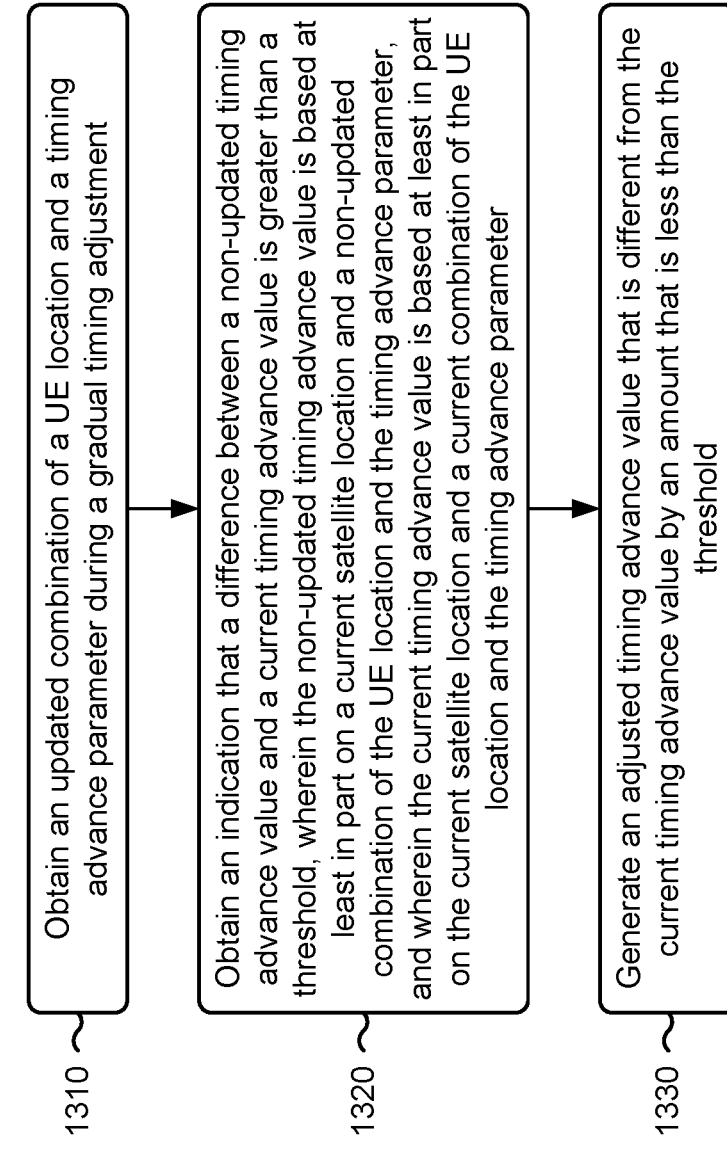

1310 — Obtain an updated combination of a UE location and a timing advance parameter during a gradual timing adjustment 1320 — Obtain an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter 1330 — Generate an adjusted timing advance value that is different from the current timing advance value by an amount that is less than the threshold

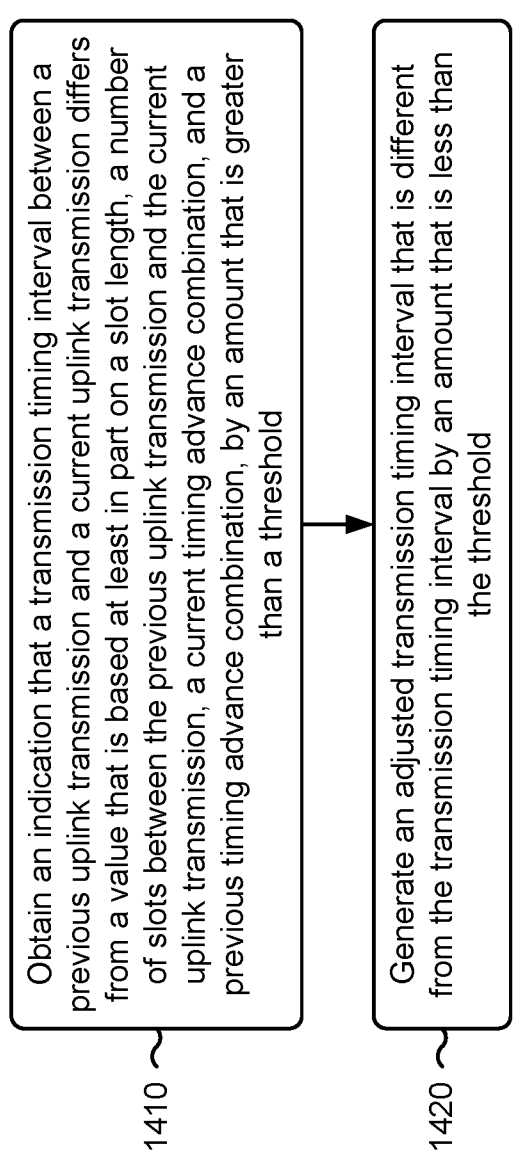

1410 — Obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold 1420 — Generate an adjusted transmission timing interval that is different from the transmission timing interval by an amount that is less than the threshold

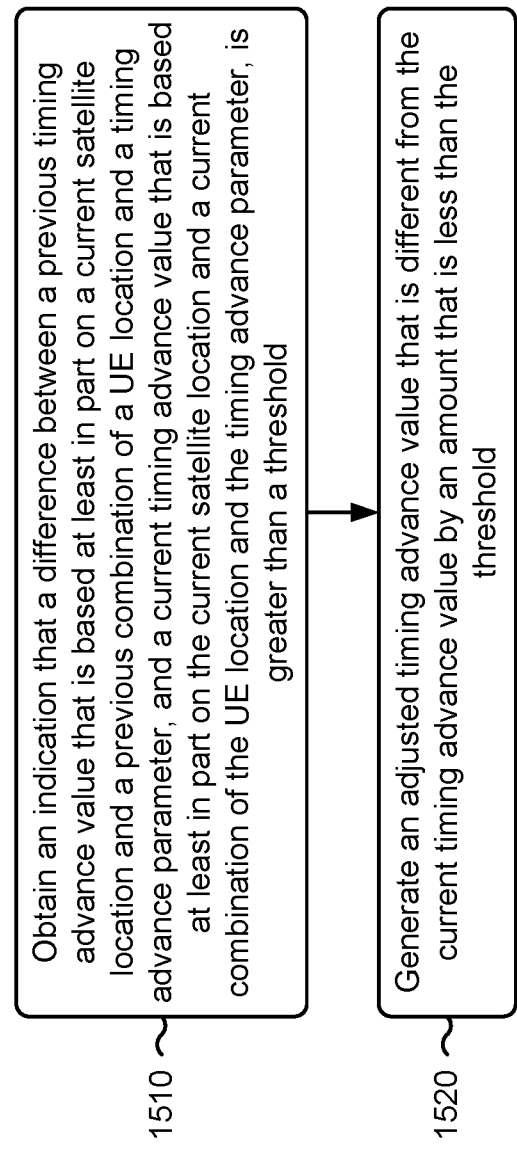

1510 Obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold 1520 Generate an adjusted timing advance value that is different from the current timing advance value by an amount that is less than the threshold

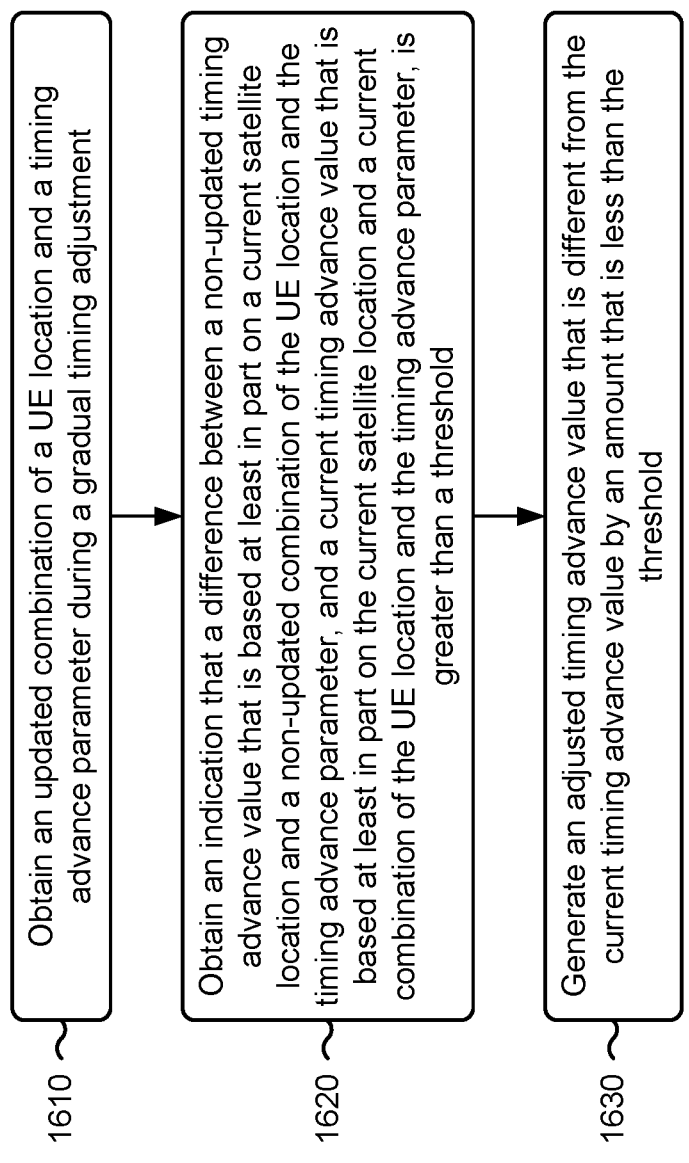

1600

1610   Obtain an updated combination of a UE location and a timing advance parameter during a gradual timing adjustment 1620   Obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold 1630   Generate an adjusted timing advance value that is different from the current timing advance value by an amount that is less than the threshold

FIG. 16

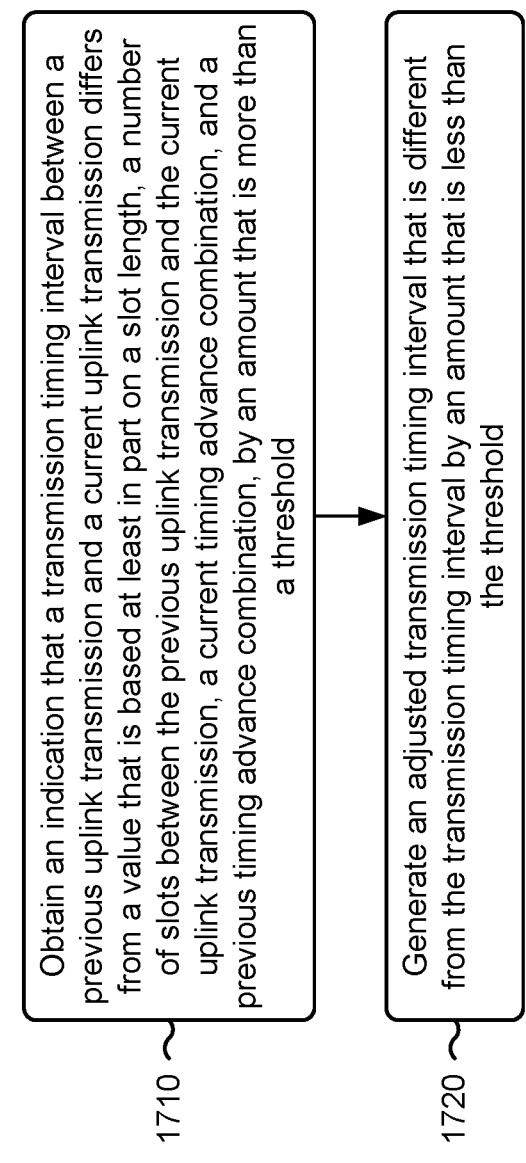

1710  Obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is more than a threshold 1720  Generate an adjusted transmission timing interval that is different from the transmission timing interval by an amount that is less than the threshold

TIMING ADVANCE ADJUSTMENT

CROSS-REFERENCE TO RELATED APPLICATION

This Patent application claims priority to U.S. Provisional Patent Application No. 63/267,934, filed on Feb. 13, 2022, entitled "TIMING ADVANCE ADJUSTMENT," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for wireless communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include obtaining an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter. The method may include generating an adjusted timing advance value that is different from the current timing advance value by an amount that is less than the threshold.

Some aspects described herein relate to a method of wireless communication performed by a UE. The method may include obtaining an updated combination of a UE location and a timing advance parameter during a gradual timing adjustment. The method may include obtaining an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter. The method may include generating an adjusted timing advance value that is different from the current timing advance value by an amount that is less than the threshold.

Some aspects described herein relate to a method of wireless communication performed by a UE. The method may include obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The method may include generating an adjusted transmission timing interval that is different from the transmission timing interval by an amount that is less than the threshold.

Some aspects described herein relate to an apparatus for wireless communication performed by a UE. The apparatus may include a memory and one or more processors, coupled to the memory. The one or more processors may be configured to obtain an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter. The one or more processors may be configured to generate an adjusted timing advance value that is different from the current timing advance value by an amount that is less than the threshold.

Some aspects described herein relate to an apparatus for wireless communication performed by a UE. The apparatus may include a memory and one or more processors, coupled to the memory. The one or more processors may be configured to obtain an updated combination of a UE location and a timing advance parameter during a gradual timing adjustment. The one or more processors may be configured to obtain an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter. The one or more processors may be configured to generate an adjusted timing advance value that is different from the current timing advance value by an amount that is less than the threshold.

Some aspects described herein relate to an apparatus for wireless communication performed by a UE. The apparatus may include a memory and one or more processors, coupled to the memory. The one or more processors may be configured to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The one or more processors may be configured to generate an adjusted transmission timing interval that is different from the transmission timing interval by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter. The set of instructions, when executed by one or more processors of the UE, may cause the UE to generate an adjusted timing advance value that is different from the current timing advance value by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an updated combination of a UE location and a timing advance parameter during a gradual timing adjustment. The set of instructions, when executed by one or more processors of the UE, may cause the UE to obtain an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter. The set of instructions, when executed by one or more processors of the UE, may cause the UE to generate an adjusted timing advance value that is different from the current timing advance value by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The set of instructions, when executed by one or more processors of the UE, may cause the UE to generate an adjusted transmission timing interval that is different from the transmission timing interval by an amount that is less than the threshold.

Some aspects described herein relate to an apparatus for wireless communication. The apparatus may include means for obtaining an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter. The apparatus may include means for generating an adjusted timing advance value that is different from the current timing advance value by an amount that is less than the threshold.

Some aspects described herein relate to an apparatus for wireless communication. The apparatus may include means for obtaining an updated combination of a UE location and a timing advance parameter during a gradual timing adjustment. The apparatus may include means for obtaining an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter. The apparatus may include means for generating an adjusted timing advance value that is different from the current timing advance value by an amount that is less than the threshold.

Some aspects described herein relate to an apparatus for wireless communication. The apparatus may include means for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The apparatus may include means for generating an adjusted transmission timing interval that is different from the transmission timing interval by an amount that is less than the threshold.

Some aspects described herein relate to a method of wireless communication performed by a user equipment (UE). The method may include obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The method may include generating an adjusted timing advance value that is different from the current timing advance value by an amount that is less than the threshold.

Some aspects described herein relate to a method of wireless communication performed by a UE. The method may include obtaining an updated combination of a UE location and a timing advance parameter during a gradual timing adjustment. The method may include obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold. The method may include generating an adjusted timing advance value that is different from the current timing advance value by an amount that is less than the threshold.

Some aspects described herein relate to a method of wireless communication performed by a UE. The method may include obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The method may include generating an adjusted transmission timing interval that is different from the transmission timing interval by an amount that is less than the threshold.

Some aspects described herein relate to an apparatus for wireless communication performed by a UE. The apparatus may include a memory and one or more processors, coupled to the memory. The one or more processors may be configured to obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The one or more processors may be configured to generate an adjusted timing advance value that is different from the current timing advance value by an amount that is less than the threshold.

Some aspects described herein relate to an apparatus for wireless communication performed by a UE. The apparatus may include a memory and one or more processors, coupled to the memory. The one or more processors may be configured to obtain an updated combination of a UE location and a timing advance parameter during a gradual timing adjustment. The one or more processors may be configured to obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold. The one or more processors may be configured to generate an adjusted timing advance value that is different from the current timing advance value by an amount that is less than the threshold.

Some aspects described herein relate to an apparatus for wireless communication performed by a UE. The apparatus may include a memory and one or more processors, coupled to the memory. The one or more processors may be configured to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The one or more processors may be configured to generate an adjusted transmission timing interval that is different from the transmission timing interval by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The set of instructions, when executed by one or more processors of the UE, may cause the UE to generate an adjusted timing advance value that is different from the current timing advance value by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an updated combination of a UE location and a timing advance parameter during a gradual timing adjustment. The set of instructions, when executed by one or more processors of the UE, may cause the UE to obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold. The set of instructions, when executed by one or more processors of the UE, may cause the UE to generate an adjusted timing advance value that is different from the current timing advance value by an amount that is less than the threshold.

Some aspects described herein relate to a non-transitory computer-readable medium that stores a set of instructions for wireless communication by a UE. The set of instructions, when executed by one or more processors of the UE, may cause the UE to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The set of instructions, when executed by one or more processors of the UE, may cause the UE to generate an adjusted transmission timing interval that is different from the transmission timing interval by an amount that is less than the threshold.

Some aspects described herein relate to an apparatus for wireless communication. The apparatus may include means for obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The apparatus may include means for generating an adjusted timing advance value that is different from the current timing advance value by an amount that is less than the threshold.

Some aspects described herein relate to an apparatus for wireless communication. The apparatus may include means for obtaining an updated combination of a UE location and a timing advance parameter during a gradual timing adjustment. The apparatus may include means for obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold. The apparatus may include means for generating an adjusted timing advance value that is different from the current timing advance value by an amount that is less than the threshold.

Some aspects described herein relate to an apparatus for wireless communication. The apparatus may include means for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The apparatus may include means for generating an adjusted transmission timing interval that is different from the transmission timing interval by an amount that is less than the threshold.

Aspects generally include a method, apparatus, system, computer program product, non-transitory computer-readable medium, user equipment, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 12 is a diagram illustrating an example process associated with gradual TA adjustment of a previous combination, in accordance with the present disclosure.

FIG. 13 is a diagram illustrating an example process associated with gradual TA adjustment of an updated combination, in accordance with the present disclosure.

FIG. 14 is a diagram illustrating an example process associated with transmission timing interval adjustment, in accordance with the present disclosure.

FIG. 15 is a diagram illustrating an example process associated with gradual TA adjustment of a previous combination, in accordance with the present disclosure.

FIG. 16 is a diagram illustrating an example process associated with gradual TA adjustment of an updated combination, in accordance with the present disclosure.

FIG. 17 is a diagram illustrating an example process associated with transmission timing interval adjustment, in accordance with the present disclosure.

DETAILED DESCRIPTION

Figure 1:
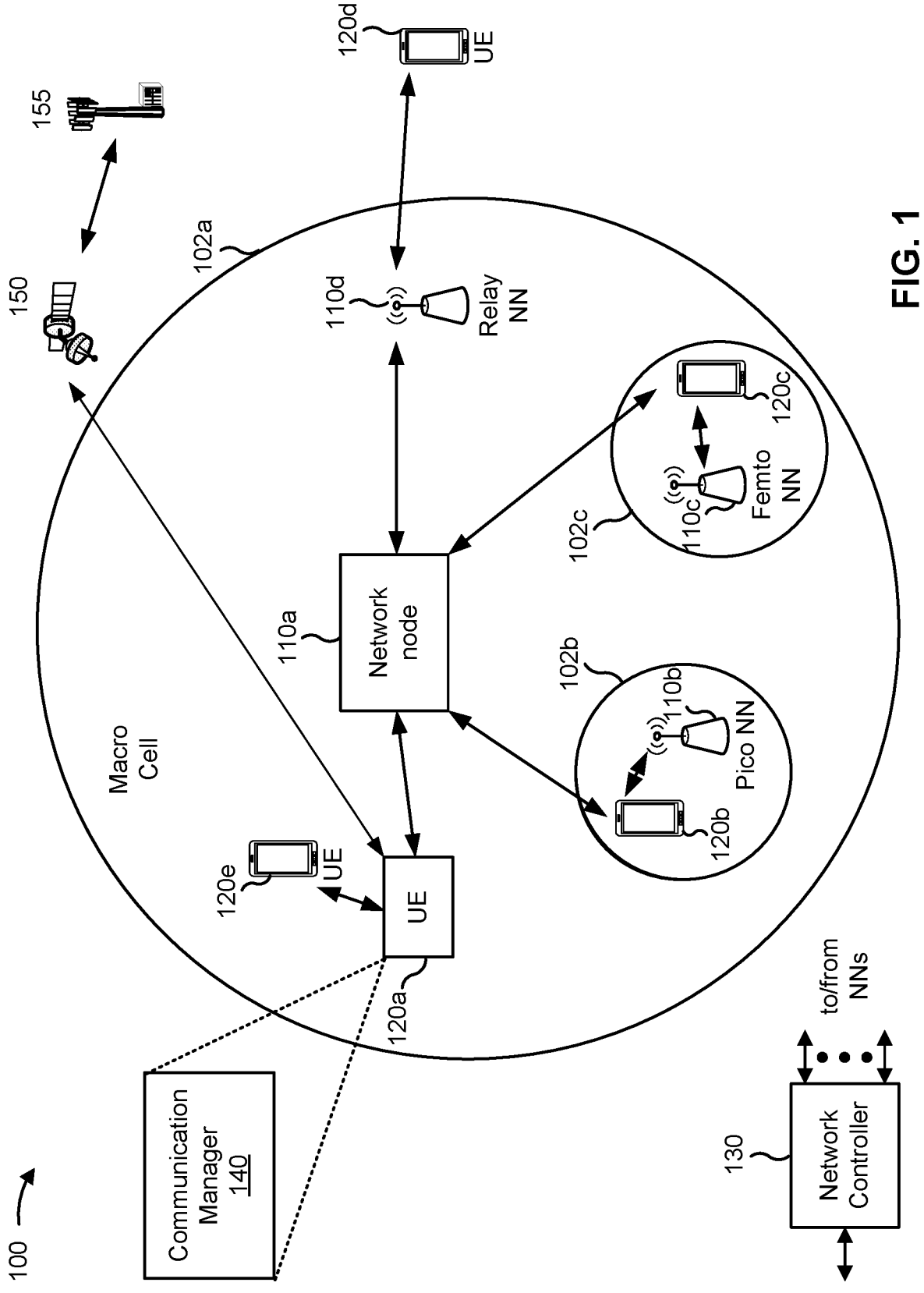
FIG. 1 is a diagram illustrating an example of a wireless network, in accordance with the present disclosure.

In some cases, a user equipment (UE) may use timing advance (TA) to adjust a timing of an uplink transmission to a network entity. The network entity may be a terrestrial network entity or a non-terrestrial network (NTN) entity, such as an unmanned aerial vehicle (UAV). The UE may use the TA to ensure that the transmission arrives at the network entity at a correct time. For example, multiple UEs may use the TA (e.g., the same TA or different TAs) to ensure that the uplink transmissions by the UEs are synchronized at the network entity (e.g., to ensure that the uplink transmissions arrive at the network entity at the same time).

In some cases, the UE may perform gradual TA adjustment to mitigate spikes in an uplink reception timing error at the network entity. An uplink reception timing error may occur when an uplink communication is received by the network entity at a time that is different than a time at which the network entity expects to receive the uplink communication. In some cases, the gradual TA adjustment may be used to mitigate (e.g., reduce or eliminate) double correction that occurs when a UE calculates an updated TA following a position change, such as a change from a previous location (e.g., a previous cell) to a current location (e.g., a current cell). The double correction may occur, for example, when the UE performs both closed-loop timing offset correction (that is based on feedback from the network entity) and open-loop timing offset correction (that is not based on feedback from the network entity) to adjust for the position change. The open-loop timing offset correction may result in an abrupt change to the TA whose error has been corrected by the closed-loop timing offset correction, and this may lead to a spike in errors for the TA. In some cases, the TA adjustment may involve changes to one or more TA parameters. For example, the TA adjustment may be based at least in part on a previous TA parameter or a current TA parameter. In some cases, the TA parameter may be based at least in part on a feeder link round-trip delay (e.g., a delay between a satellite and an uplink time synchronization reference point) and/or may be based at least in part on a distance between the satellite and an uplink time synchronization reference point divided by the speed of light at time t, among other examples.

As described herein, the UE may obtain an indication of the previous TA value and the current TA value, and may generate an adjusted TA value if the difference between the previous TA value and the current TA value is greater than a threshold. For example, the UE may obtain an indication that a difference between a previous TA value and a current TA value is greater than a threshold, where the previous TA value is based at least in part on a current satellite location and a previous combination of a UE location and a TA parameter, and where the current TA value is based at least in part on the current satellite location and a current combination of the UE location and the TA parameter, and may generate an adjusted TA value that is different from the current TA value by an amount that is less than the threshold. The UE may adjust the TA value by an amount that is within the threshold, thereby mitigating the spikes in the TA adjustment and reducing uplink reception timing errors at the network entity.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a NN 110a, a NN 110b, a NN 110c, and a NN 110d), a UE 120 or multiple UEs 120 (shown as a UE 120a, a UE 120b, a UE 120c, a UE 120d, and a UE 120e), and/or other network entities. A network node 110 is an entity that communicates with UEs 120. A network node 110 (sometimes referred to as a NN) may include, for example, an NR network node, an LTE network node, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the network node 110 may be disaggregated according to an open radio access network (RAN) (O-RAN) architecture or the like, which is described in more detail in connection with FIG. 3. Each network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the NN 110a may be a macro network node for a macro cell 102a, the NN 110b may be a pico network node for a pico cell 102b, and the NN 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node). In some examples, the network nodes 110 may be interconnected to one another and/or to one or more other network nodes 110 or network entities (not shown) in the wireless network 100 through various types of backhaul interfaces, such as a direct physical connection or a virtual network, using any suitable transport network.

In some cases, the UE 120 may be configured to communicate with a satellite, such as the satellite 150, or a gateway, such as the gateway 155. The satellite 150 may include some or all of the features of the satellite 420 or the satellite 440 described in connection with FIGS. 4A and 4B. The gateway may include some or all of the features of the gateway 450 described in connection with FIGS. 4A and 4B.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the NN 110d (e.g., a relay network node) may communicate with the NN 110a (e.g., a macro network node) and the UE 120d in order to facilitate communication between the NN 110a and the UE 120d. A network node 110 that relays communications may be referred to as a relay station, a relay network node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

The electromagnetic spectrum is often subdivided, by frequency/wavelength, into various classes, bands, channels, etc. In 5G NR, two initial operating bands have been identified as frequency range designations FR1 (410 MHz-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or May be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold; and generate an adjusted timing advance value that is different from the current timing advance value by an amount that is less than the threshold. Additionally, or alternatively, the communication manager 140 may perform one or more other operations described herein.

In some aspects, the communication manager 140 may obtain an updated combination of a UE location and a timing advance parameter during a gradual timing adjustment; obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold; and generate an adjusted timing advance value that is different from the current timing advance value by an amount that is less than the threshold. Additionally, or alternatively, the communication manager 140 may perform one or more other operations described herein.

In some aspects, the communication manager 140 may obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold; and generate an adjusted transmission timing interval that is different from the transmission timing interval by an amount that is less than the threshold. Additionally, or alternatively, the communication manager 140 may perform one or more other operations described herein.

As indicated above, FIG. 1 is provided as an example. Other examples may differ from what is described with regard to FIG. 1.

Figure 2:
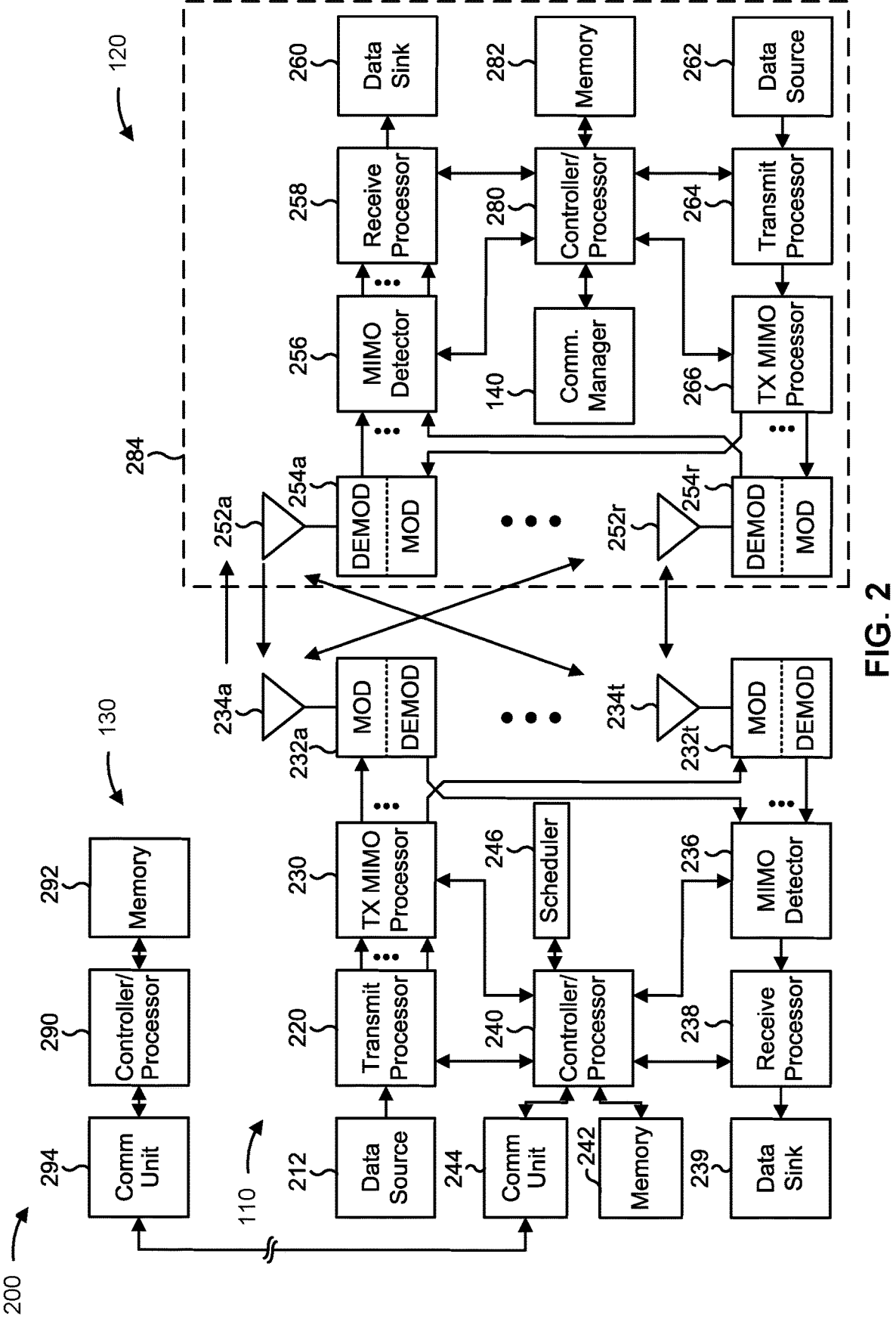
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120, and/or any other component(s) of FIG. 2 may perform one or more techniques associated with timing advance adjustment, as described in more detail elsewhere herein. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold; and/or means for generating an adjusted timing advance value that is different from the current timing advance value by an amount that is less than the threshold. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for obtaining an updated combination of a UE location and a timing advance parameter during a gradual timing adjustment; means for obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold; and/or means for generating an adjusted timing advance value that is different from the current timing advance value by an amount that is less than the threshold. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold; and/or means for generating an adjusted transmission timing interval that is different from the transmission timing interval by an amount that is less than the threshold. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
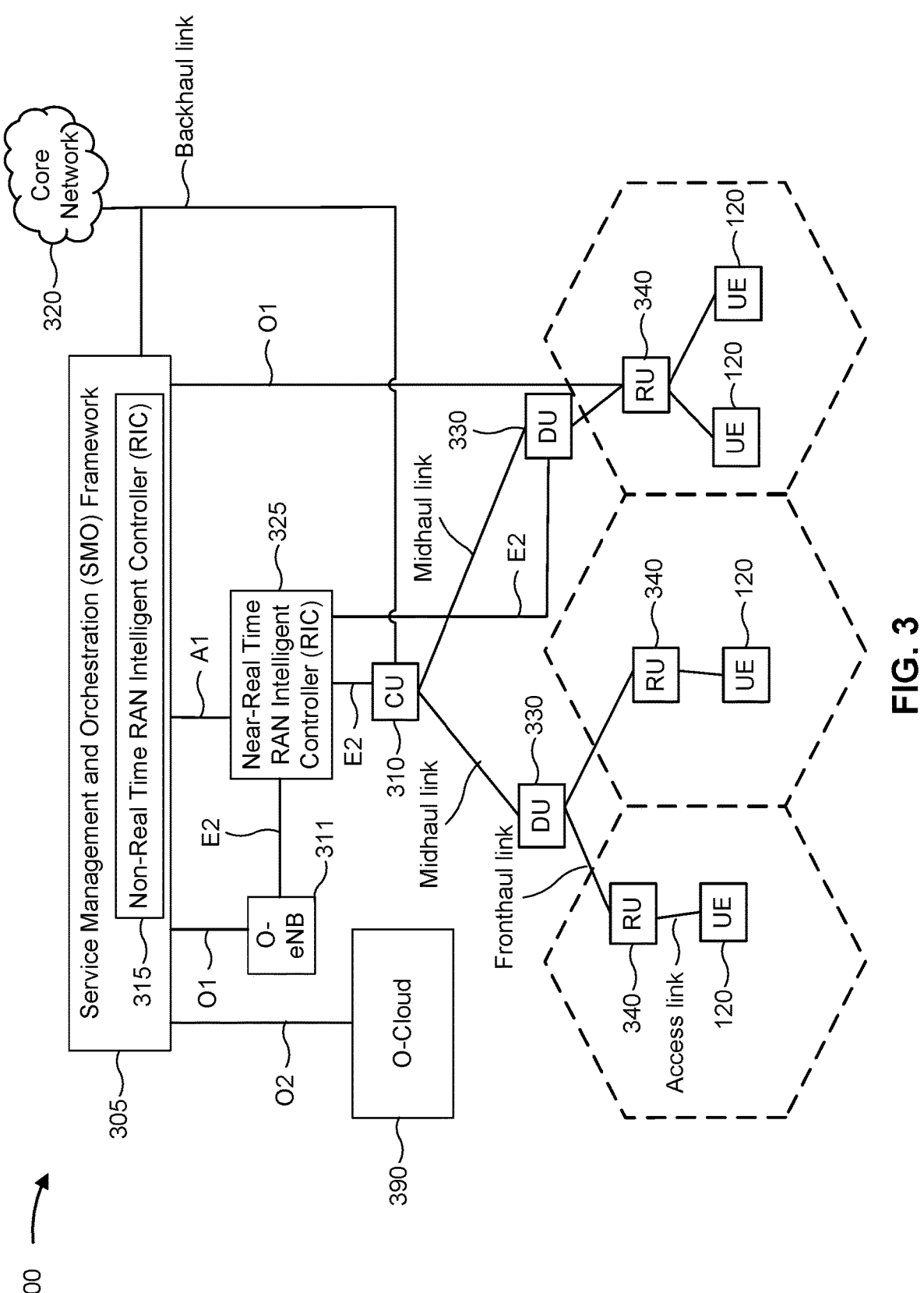
FIG. 3 is a diagram illustrating an example disaggregated architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network entity, a network entity, a mobility element of a network, a RAN node, a core network entity, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

In some aspects, the UE 120 may adjust a TA value for gradual TA adjustment for communicating with one or more of the entities described above, such as the base station 110, the CU 310, the DU 330, or the RU 340, among other examples. In some aspects, the entities may be NTN entities. In some aspects, the entities may be terrestrial entities. In some aspects, the entities may include a combination of terrestrial and NTN entities.

As indicated above, FIG. 3 is provided as an example. Other examples may differ from what is described with regard to FIG. 3.

FIGS. 4A, 4B and 4C are diagrams illustrating examples of satellite deployments in NTN. For example, FIG. 4A is a diagram illustrating an example 400 of a regenerative satellite deployment in the NTN, FIG. 4B is a diagram illustrating an example 410 of a transparent satellite deployment in the NTN, and FIG. 4C is a diagram illustrating an example of TA adjustment for the satellite in the NTN.

Example 400 shows a regenerative satellite deployment in an NTN. In example 400, a UE 120 is served by a satellite 420 via a service link 430. For example, the satellite 420 may include a base station 110 (e.g., base station 110a) and/or a gNB. The satellite 420 may be referred to as a non-terrestrial base station, a regenerative repeater, and/or an on-board processing repeater, among other examples. The satellite 420 may demodulate an uplink RF signal and may modulate a baseband signal derived from the uplink RF signal to produce a downlink RF transmission. The satellite 420 may transmit the downlink RF signal to the UE 120 on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from a gateway 450 via a feeder link 460. For example, the satellite 440 may receive an RF transmission from the gateway 450 via the feeder link 460 and may relay the RF transmission to the UE 120 via the service link 430 without demodulating the RF transmission. Additionally, or alternatively, the satellite 440 may receive an RF transmission from the UE 120 via the service link 430 and may relay the RF transmission to the gateway 450 via the feeder link 460 without demodulating the RF transmission. The satellite 440 may frequency convert the RF transmission(s) received on the service link 430 to a frequency of the RF transmission(s) on the feeder link 460 (or vice versa) and may amplify and/or filter the relayed RF transmission(s). The UEs 120 shown in example 400 and example 410 may be associated with a GNSS capability or a global positioning system (GPS) capability, though not all UEs have such capabilities. The satellite 440 may provide a cell that covers the UE 120.

As shown in FIG. 4B, the service link 430 may include a link between the satellite 420/440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). As shown in FIG. 4B, an uplink of the service link 430 is indicated by reference number 430-U and a downlink of the service link 430 is indicated by reference number 430-D. Similarly, an uplink of the feeder link 460 is indicated by reference number 460-U and a downlink of the feeder link 460 is indicated by reference number 460-D.

The feeder link 460 and the service link 430 may each experience Doppler effects due to the movement of the satellites 420 and 440, and potentially movement of a UE 120. The Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency. Furthermore, due to the long distance between the UE 120 and satellite 420/440, communication in an NTN may be associated with a much longer delay (e.g., a longer latency and/or a longer round-trip time (RTT)) than a delay associated with a terrestrial network. The delay may be even greater in a transparent satellite deployment because any communication between the UE 120 and the gateway 450 must travel over the service link 430 and the feeder link 460, each of which may associated with a longer delay than a terrestrial network.

Figure 4:
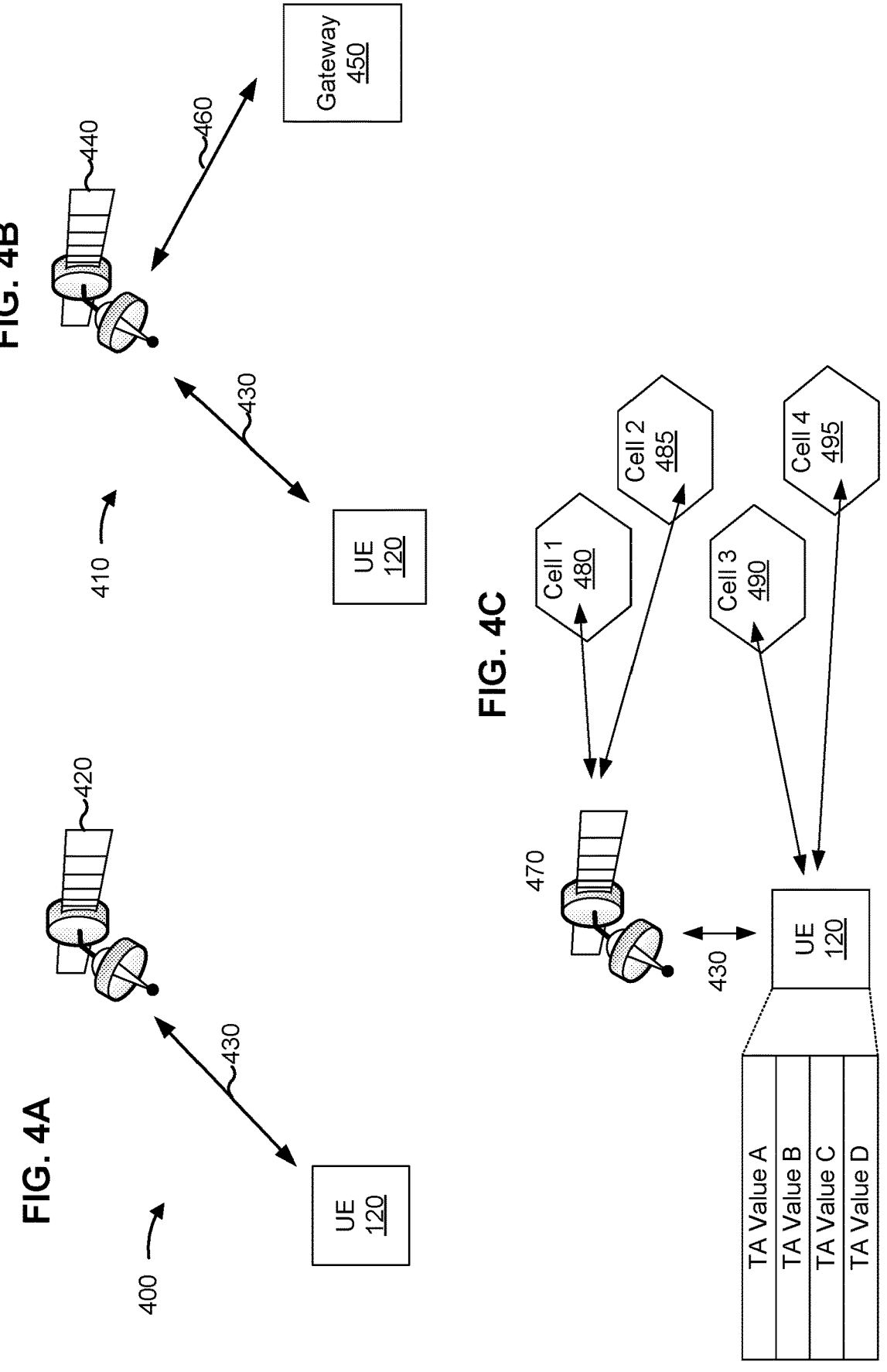
FIGS. 4A, 4B, and 4C are diagrams illustrating a non-terrestrial network (NTN), in accordance with the present disclosure.

As shown in FIG. 4C, the satellite 470 may move between cells, such as the first cell (cell 1) 485 and the second cell (cell 2) 495. Similarly, the UE 120 may move between cells, such as between the third cell (cell 3) 490 and the fourth cell (cell 4) 495. While FIG. 4 shows four cells, it is understood that the satellite 470 and the UE 120 may move between any number of cells. As described herein, the UE 120 may store multiple TA values based at least in part on a location of the UE 120 and/or a location of the satellite 470. For example, the UE may store a TA value A for the satellite 470 at cell 1 and the UE 120 at cell 3, a TA value B for the satellite 470 at cell 1 and the UE 120 at cell 4, a TA value C for the satellite 470 at cell 2 and the UE 120 at cell 3, and a TA value D for the satellite 470 at cell 2 and the UE 120 at cell 4. In some cases, as described in more detail below, the UE 120 moving between cell 3 and cell 4 may be referred to as the UE 120 moving between the "previous cell" and the "current cell" or between the "first cell" and the "second cell."

As indicated above, FIGS. 4A, 4B and 4C are provided as examples. Other examples may differ from what is described with regard to FIGS. 4A, 4B and 4C.

Figure 5:
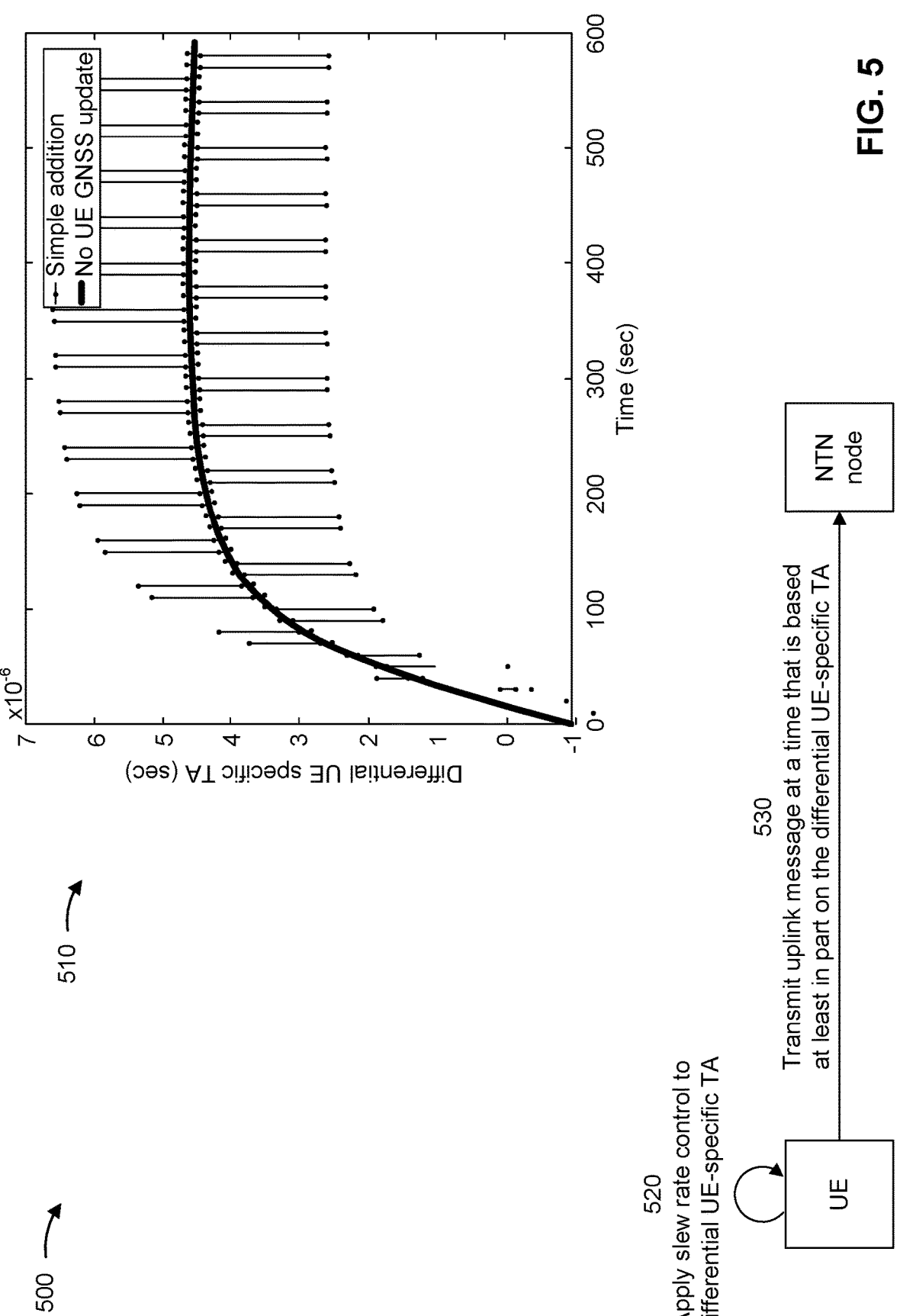
FIG. 5 is a diagram illustrating an example of timing advance (TA) slew rate control in an NTN, in accordance with the present disclosure.

FIG. 5 is a diagram illustrating an example 500 associated with TA slew rate control in an NTN, in accordance with the present disclosure. As shown in FIG. 5, example 500 includes communication between a UE and an NTN node (e.g., a regenerative satellite 520 that includes a base station 110 and/or a transparent satellite 540 that relays communications between the UE and a gateway 350, among other examples). In some aspects, the UE and the NTN node may be included in a wireless network, such as wireless network 100, which may be or include an NTN in which one or more satellites are deployed. In some aspects, the UE and the NTN node may communicate via a wireless service link, which may include an uplink (e.g., service link 330-U) and a downlink (e.g., service link 330-D).

In general, as described above, an NTN deployment may be associated with long delays (e.g., a long latency and/or a long RTT) relative to a terrestrial network due at least in part to the long distance between the UE and the NTN node. Furthermore, the delay in a transparent satellite deployment may exceed the delay in a regenerative satellite deployment because any communication between the UE and a base station or gateway travels from the UE to the NTN node over a service link and then from the NTN node to the base station or gateway over a feeder link, where both the service link and the feeder link may be associated with a longer delay than a terrestrial network. Accordingly, in an NTN, a UE may generally apply a TA to an uplink transmission performed in an RRC idle or inactive state and/or an uplink transmission performed in an RRC connected state. For example, the TA applied by the UE may have a value that corresponds to a length of time that a signal takes to travel from the base station to the UE and back to the base station (which may be included in the NTN node in a regenerative satellite deployment or a gateway in a transparent satellite deployment). For example, the TA applied by the UE may correspond to an RTT between the base station and the UE because the TA is relative to a downlink frame at the UE, which is already a single-trip delay relative to the same downlink frame at the base station. In this way, the TA applied by the UE may align uplink reception timing implemented at the base station to enable communication with different UEs that may be located at various distances from the base station. For example, the TA that a UE applies when performing an uplink transmission in an NTN, $T_{TA}$, may be given by the following formula (the "first formula"):

$$T^{TA} = (N_{TA} + N_{TA,UE\text{-}specific} + N_{TA,common} + N_{TA,offset}) \times T_c$$

In the above expression, $N_{TA}$ is a closed-loop timing offset between uplink and downlink radio frames at the UE. For example, the closed-loop timing offset may be defined as zero (0) for a PRACH transmission that occurs before the UE has established an RRC connection, and the closed-loop timing offset value may then be updated based at least in part on a TA command field in msg2 in a four-step random access procedure, a TA command field in msgB in a two-step random access procedure, and/or a MAC control element (MAC-CE) TA command, among other examples. Furthermore, the parameter $N_{TA,UE\text{-}specific}$ represents an open-loop UE-specific TA that is self-estimated by the UE to precompensate for a service link delay, the parameter $N_{TA,common}$ is a network-controlled common TA that includes any timing offsets that may be considered necessary by the NTN, the parameter $N_{TA,offset}$ is a fixed TA offset that the UE uses to calculate the TA applied to an uplink transmission, and $T_C$ is a timing unit defined as 1/(480, 000x4096) seconds, or 0.509 nanoseconds. In some cases, however, the open-loop UE-specific TA, $N_{TA,UE\text{-}specific}$, may potentially cause problems such as increased uplink reception timing error at the base station. In some aspects, the parameter (or term) $N_{TA,common}$ represents the RTT between an uplink time synchronization reference point and the base station. In some aspects, the parameter $N_{TA,common}$ is a function of time. In some aspects, the network may signal to the UE one or more parameters which the UE may use as coefficients in a Taylor series to construct a model that gives $N_{TA,common}$ as a function of time. In some aspects, when the network signals an updated one or more parameters, the UE constructs an updated model for $N_{TA,common}$. In some aspects, $N_{TA,common}$ given by a model may be represented by a curve, and when the one or more parameters (e.g., coefficients) are updated, $N_{TA,common}$ may move from a first curve to a second curve and may experience an abrupt change.

In some cases, the UE may self-estimate the open-loop UE-specific TA based at least in part on a position of the UE and a satellite position (e.g., a position of the NTN node), where the position of the UE may be estimated based at least in part on a current or most recent GNSS position fix, which the UE may update every few seconds (e.g., in 10 second intervals). The open-loop UE-specific TA may be a TA calculation that is not based on feedback, as opposed to a closed-loop calculation (described below). Accordingly, during the interval between GNSS position fixes, the UE location that the UE uses to calculate the UE-specific TA may be inaccurate (e.g., when the UE is in motion). In some cases, the inaccuracy in the UE location used to calculate the UE-specific TA may be corrected in the closed-loop timing offset (e.g., the base station may measure the uplink reception timing error and transmit a TA command that indicates the closed-loop timing offset to be used to calculate the overall TA that the UE is to apply for an uplink transmission). As a result, when the UE calculates a new open-loop UE-specific TA following an updated GNSS position fix, the new open-loop UE-specific TA may correct for a change in the UE location even though the error in the UE location may have already been corrected by the closed-loop timing offset. This may cause a double correction problem, whereby the TA that the UE applies to an uplink transmission after updating a GNSS position fix is calculated at least in part on the closed-loop timing offset and the open-loop UE-specific TA both correcting for an error in the UE location. For example, in FIG. 5, graph 510 illustrates how updated GNSS position fixes can result in abrupt changes in uplink timing (shown as spikes relative to curve 515, which represents the change to the UE-specific TA (e.g., in a time interval of 0.1 second) in a scenario where the UE does not update a GNSS position fix such that there is no double correction in the overall TA calculated by the UE). The abrupt changes that occur when the UE obtains updated GNSS position fixes may lead to spikes or jumps in uplink reception timing error at a base station in NTN. In some aspects, an abrupt change to the TA parameter (e.g., the common TA parameter, the model that gives $N_{TA,common}$, or the like), similarly, may lead to the double correction problem. In some aspects, a change to the UE GNSS location (e.g., via a GNSS position fix) and a change to the TA parameter may lead to the double correction problem.

Accordingly, some aspects described herein relate to a gradual TA adjustment that may be applied to mitigate the spikes in the uplink reception timing error. For example, the UE may perform gradual TA adjustment, which may be based at least in part on a difference between a previous TA value associated with a current satellite location and a previous combination of the UE location and a TA parameter, and a current TA value associated with a current satellite location and current combination of the UE location and the TA parameter. For example, if the previous TA value differs from the current TA value by greater than a threshold, the UE may generate an adjusted TA value that is different from the current TA value by an amount that is less than the threshold. In some aspects, the threshold may be a constant threshold, a dynamic threshold, or a configurable threshold, among other examples.

As indicated above, FIG. 5 is provided as an example. Other examples may differ from what is described with regard to FIG. 5.

Figure 6:
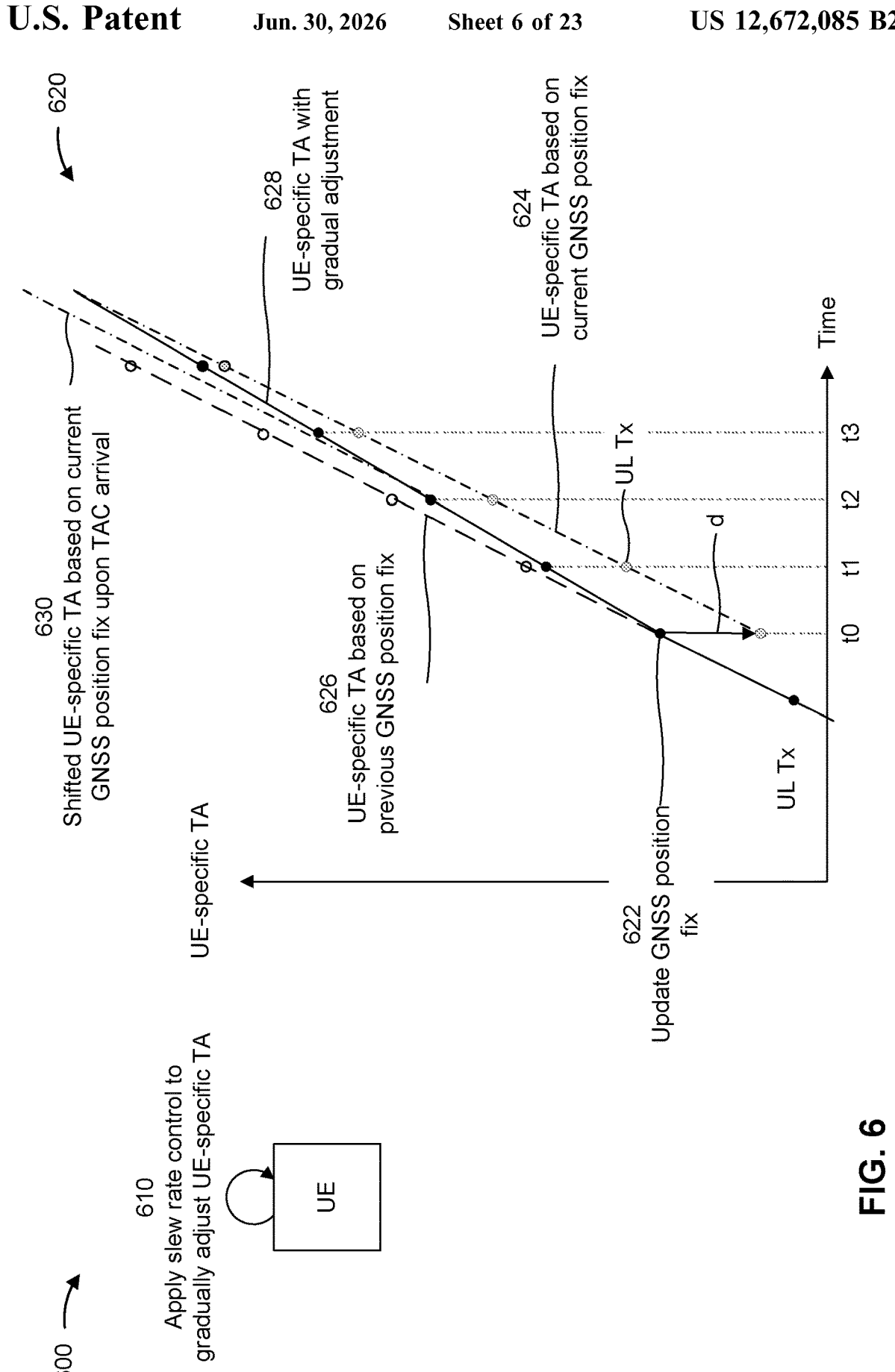
FIG. 6 is a diagram illustrating an example of controlling a TA slew rate in an NTN based at least in part on a gradual adjustment to a UE-specific TA, in accordance with the present disclosure.

FIG. 6 is a diagram illustrating an example 600 associated with controlling a TA slew rate (e.g., adjustment rate) in a network entity (e.g., terrestrial or NTN) based at least in part on a gradual adjustment to a UE-specific TA, in accordance with the present disclosure. As shown in FIG. 6, example 600 includes a UE (e.g., UE 120) that may calculate a self-estimated open-loop UE-specific TA based at least in part on a position or location of the UE (referred to herein as a UE location) and a position or location of the network entity (e.g., referred to herein as a satellite position). In some aspects, the UE may use the open-loop UE-specific TA to determine a TA to use when transmitting an uplink message to the network entity (e.g., via a wireless service link).

As shown in FIG. 6, and by reference number 610, the UE may apply slew rate control to gradually adjust the UE-specific TA and thereby mitigate (e.g., reduce or eliminate) uplink reception timing errors that may occur at a base station in the network entity after the UE updates a GNSS position fix. For example, in some aspects, the UE may obtain a current GNSS position fix to update a previous GNSS position fix, and may apply the slew rate control to gradually adjust the UE-specific TA when a difference between a first UE-specific TA calculated for the current GNSS position fix and a second UE-specific TA calculated for the previous GNSS position fix exceeds a range±Te. In some aspects, the first UE-specific TA and the second UE-specific TA may be calculated based at least in part on the same satellite position and the same satellite velocity, which may correspond to a satellite position and a satellite velocity at a time when the UE is to transmit an uplink message.

In some aspects, when the difference between the first UE-specific TA calculated for the current GNSS position fix and the second UE-specific TA calculated for the previous GNSS position fix exceeds the range±Te at the time of completing a new GNSS position fix, the UE may adjust the UE-specific TA used to calculate the overall TA such that the difference between the UE-specific TA used to calculate the overall TA and the UE-specific TAs calculated for the current GNSS position fix (e.g., for a time after completing the new GNSS position fix) is within the range±Te. For example, in some aspects, the UE may adjust the second UE-specific TA associated with the previous GNSS position fix by a delta, which may have a value that causes the adjusted UE-specific TA to differ from the first UE-specific TA associated with the current GNSS position fix by a value that is within the range±Te. Furthermore, to ensure that the gradual adjustment to the UE-specific TA is neither too fast nor too slow, a change in the delta that is used to adjust the UE-specific TA may satisfy one or more thresholds. For example, in some aspects, the delta may be adjusted over time, and each adjustment to the delta may satisfy a threshold (e.g., Tq seconds) that defines a maximum amount of a magnitude for the timing change in one adjustment. Additionally, or alternatively, multiple adjustments to the delta may result in an aggregate adjustment rate that satisfies a threshold that defines a minimum aggregate adjustment rate (e.g., Tp per a first time duration, such as Tp per second) and/or a threshold that defines a maximum aggregate adjustment rate (e.g., Tq per a second time duration, such as Tq per 200 milliseconds). In some aspects, the parameters Te, Tq, and Tp may have values that depend on one or more of a frequency range (e.g., FR1 or FR2), a subcarrier spacing (e.g., 15, 30, 60, or 120 kilohertz (kHz)), and/or a satellite orbit type (e.g., low earth orbit (LEO), geostationary equatorial orbit (GEO), and/or medium earth orbit (MEO), among other examples).

Example values for the maximum autonomous time adjustment step $T_q$ and the aggregate adjustment rate $T_p$ are shown in Table 1.

TABLE 1

| Frequency Range | SCS of uplink signals (kHz) | $T_q$ | $T_p$ |
|---|---|---|---|
| 1 | 15 | $5.5 \times 64 \times T_c$ | $5.5 \times 64 \times T_c$ |
| | 30 | $5.5 \times 64 \times T_c$ | $5.5 \times 64 \times T_c$ |
| | 60 | $5.5 \times 64 \times T_c$ | $5.5 \times 64 \times T_c$ |
| 2 | 60 | $2.5 \times 64 \times T_c$ | $2.5 \times 64 \times T_c$ |
| | 120 | $2.5 \times 64 \times T_c$ | $2.5 \times 64 \times T_c$ |

In some aspects, when the difference between the first UE-specific TA calculated for the current GNSS position fix and the UE-specific TA used to calculate the overall TA exceeds the range±Te at the time of completing a new GNSS position fix, the UE may adjust the UE-specific TA used to calculate the overall TA such that the difference between the UE-specific TA used to calculate the overall TA (e.g., TTA) and the UE-specific TAs calculated for the current GNSS position fix (e.g., for a time after completing the new GNSS position fix) is within the range±Te. For example, in some aspects, the UE may adjust the UE-specific TA used to calculate the overall TA by a delta, which may have a value that causes the adjusted UE-specific TA to differ from the first UE-specific TA associated with the current GNSS position fix by a value that is within the range±Te. Furthermore, to ensure that the gradual adjustment to the UE-specific TA is neither too fast nor too slow, the delta that is used to adjust the UE-specific TA may satisfy one or more thresholds. For example, in some aspects, the delta satisfies a threshold, Tq seconds, that defines a maximum amount of a magnitude for the timing change in one adjustment. Additionally, or alternatively, multiple adjustments to the delta may result in an aggregate adjustment rate that satisfies a threshold that defines a minimum aggregate adjustment rate (e.g., Tp per a first time duration, such as Tp per second) and/or a threshold that defines a maximum aggregate adjustment rate (e.g., Tq per a second time duration, such as Tq per 200 milliseconds). In some aspects, the parameters Te, Tq, and Tp may have values that depend on one or more of a frequency range (e.g., FR1 or FR2), a subcarrier spacing (e.g., 15, 30, 60, or 120 kilohertz (kHz)), and/or a satellite orbit type (e.g., LEO, GEO, and/or MEO, among other examples).

In some aspects, reference number 620 depicts an example scenario in which the UE may apply slew rate control to gradually adjust the UE-specific TA following an updated GNSS position fix. For example, as shown in FIG. 6, the horizontal axis represents time and the vertical axis represents the UE-specific TA, which is generally based at least in part on the UE location and the satellite position. In general, the example shown in FIG. 6 illustrates an increase in the UE-specific TA, which may occur as the distance between the UE and the satellite increases (e.g., as the satellite moves between the cell 1 and the cell 2, or as the UE moves between the cell 3 and the cell 4, as shown in FIG. 4). As shown by reference number 622, the UE may update a GNSS position fix at time to. In some aspects, the UE may then calculate a first UE-specific TA based at least in part on the updated (current) GNSS position fix and may calculate a second UE-specific TA based at least in part on a GNSS position fix preceding the updated GNSS position fix, where the first UE-specific TA and the second UE-specific TA are both calculated based at least in part on the same satellite position and velocity.

Accordingly, in this case, curve 624 represents the first UE-specific TA that is calculated based at least in part on the current GNSS position fix and curve 626 represents the second UE-specific TA that is calculated based at least in part on the previous GNSS position fix. As shown in FIG. 6, at time to, the difference (d) between the first UE-specific TA and the second UE-specific TA may exceed the range±Te, whereby the UE may apply slew rate control to gradually adjust the UE-specific TA. For example, the UE may adjust the second UE-specific TA, which is based at least in part on the previous GNSS position fix and the current satellite position and satellite velocity (e.g., current satellite and Earth motion), whereby the UE may cumulatively adjust, over time, the second UE-specific position fix that is based at least in part on the previous GNSS position fix by a delta, $\delta(tn)$ (e.g., at times when uplink transmissions are performed). In this way, as shown by curve 628, the UE may gradually move away from the curve 626 that represents the UE-specific TA that is calculated based at least in part on the previous GNSS position fix and toward the curve 624 that represents the UE-specific TA that is calculated based at least in part on the current GNSS position fix. For example, the delta, $\delta(tn)$, is a function of a delay, tn, after the most recent GNSS position fix (e.g., $\delta(tn)=f*max\text{-}SlewRate*tn*sign(d)$), where f represents an aggressiveness factor (with smaller values resulting in a slower adjustment and smaller timing error), maxSlewRate is a maximum slew rate for the UE-specific TA, tn is a time of the nth uplink transmission relative to the most recent GNSS position fix, and sign (d) is a sign of the difference between the UE-specific TA that is based at least in part on the current GNSS position fix and the UE-specific TA that is based at least in part on the previous GNSS position fix. In this way, applying slew rate control to gradually adjust the UE-specific TA may avoid abrupt changes in the UE-specific TA that may cause uplink reception timing errors at the base station and/or may remove the effect of satellite motion and Earth rotation in the slew rate control applied to the UE-specific TA by considering only the effect of the updated GNSS position fix. In some aspects, in cases where the UE receives a timing advance command (TAC) from the base station while performing the gradual adjustment to the UE-specific TA, the UE may stop the gradual adjustment. Additionally, the UE may shift (up or down without changing the slope) the UE-specific TA that is based at least in part on the current GNSS position fix to the UE-specific TA that would be used for an uplink transmission at the TAC arrival, and the shifted UE-specific TA 630 May be used as the UE-specific TA for uplink transmissions after the TAC arrival (e.g., in place of the UE-specific TA with the gradual adjustment).

As indicated above, FIG. 6 is provided as an example. Other examples may differ from what is described with regard to FIG. 6.

Figure 7:
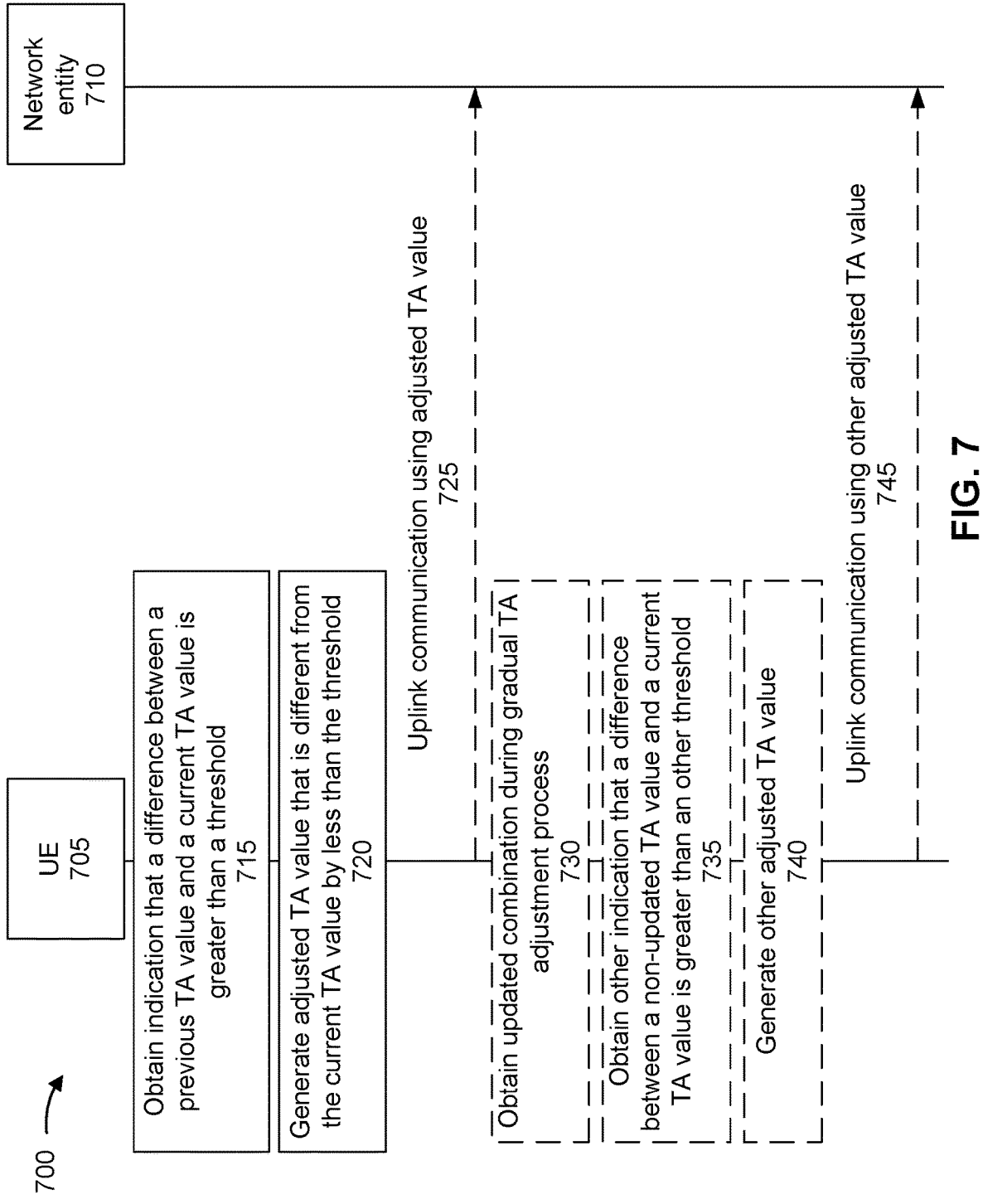
FIG. 7 is a diagram illustrating an example associated with gradual TA adjustment of a previous combination, in accordance with the present disclosure.

FIG. 7 is a diagram illustrating an example 700 associated with gradual TA adjustment of a previous combination, in accordance with the present disclosure. The UE 705 may communicate with the network entity 710. The UE 705 may include some or all of the features of the UE 120. The network entity 710 may be the base station 110 (e.g., the aggregated or disaggregated base station), may include the base station 110, or may be included in the base station 110. The network entity 710 may be a terrestrial network entity, an NTN, or a combination of a terrestrial entity and an NTN.

As shown in connection with reference number 715, the UE 705 may obtain an indication of a difference between a first TA value (e.g., a previous TA value) and a second TA value (e.g., a current TA value). For example, the UE 705 may calculate the difference between the previous TA value and the current TA value to obtain the indication of the difference.

In some aspects, the previous TA value may be based at least in part on the current network entity (e.g., satellite) location and a previous combination of the UE location and the TA parameter. In some aspects, a combination of the UE location and the TA parameter is a tuple that consists of two components: the UE location and the TA parameter, and a change to the combination occurs when any of the components changes. In some aspects, the current combination of the UE location and the TA parameter differs from the previous combination of the UE location and the TA parameter in one of the UE location and the TA parameter. In some aspects, the current combination of the UE location and the TA parameter differs from the previous combination of the UE location and the TA parameter in both the UE location and the TA parameter. In some aspects, the previous combination of the UE location and the TA parameter may include a previous UE location and a current TA parameter. In some aspects, the previous combination of the UE location and the TA parameter may include a current UE location and a previous TA parameter. In some aspects, the previous combination of the UE location and the TA parameter may include the previous UE location and the previous TA parameter. In some aspects, the current combination of the UE location and the TA parameter may include the current UE location and the current TA parameter. As described herein, the "TA parameter" may include one TA parameter or multiple TA parameters. In some aspects, the difference between the "previous TA parameter" and the "current TA parameter" indicates a change in a value for at least one TA parameter.

In some aspects, the TA parameter may be the common TA parameter $N_{TA,common}$. In some aspects, the common TA parameter is given by a model constructed by the UE using one or more parameters (e.g., coefficients in a Taylor series) signaled by the network. In some aspects, a change to the TA parameter in the combination of the UE location and the TA parameter means a change to the model.

In some aspects, the threshold may be a TA threshold, such as the Te threshold described above. In some aspects, the threshold may be specific to the NTN.

In some aspects, the UE 705 may determine whether the difference between the previous TA value and the current TA value is greater than, or greater than or equal to, the threshold. For example, the UE 705 may determine whether:

|TA (combination_p, sat_c)-TA (combination_c, sat_c)|>Te_NTN, where
combination_p is the previous combination of the UE location and the TA parameter,
combination_c is the current combination of the UE location and the TA parameter,
sat_c is the current satellite location,
TA (combination_p, sat_c) is the previous TA value,
TA (combination_c, sat_c) is the current TA value, and
Te_NTN is the threshold.

As shown in connection with reference number 720, the UE 705 may generate an adjusted TA value that is different from the current TA value by an amount that is less than, or less than or equal to, the threshold. The UE 705 may generate the adjusted TA value based at least in part on determining that the difference between the previous TA value and the current TA value is greater than, or greater than or equal to, the threshold.

The UE 705 may generate the adjusted TA value in accordance with one or more rules. In some aspects, the UE 705 may generate the adjusted TA value based at least in part on a maximum amount of the magnitude of the timing change allowed in one adjustment. For example, the maximum amount of the magnitude may correspond to the variable Tq (as described herein). In some aspects, the UE 705 may generate the adjusted TA value based at least in part on a minimum aggregate adjustment rate. For example, the minimum aggregate adjustment rate may be $T_p$ per T1 seconds (as described herein), where T1 may be 1 second(s), 0.5 s, or 2 s, among other examples. In some aspects, the UE 705 may generate the adjusted TA value based at least in part on a maximum aggregate adjustment rate. For example, the maximum aggregate adjustment rate may be Tp per T2 milliseconds (ms) (as described herein), where T2 may be 200 ms, 100 ms, or 400 ms, among other examples.

In some aspects, the UE location may be a GNSS location. The GNSS location may be obtained by a GNSS fix (e.g., a GNSS receiver processing a GNSS signal), or based at least in part on inertial sensors, among other examples.

In some aspects, the common TA parameter may represent the round-trip delay on the feeder link (e.g., the delay between the satellite and the uplink time synchronization reference point). In some aspects, the common TA parameter may be calculated based at least in part on $Delay_{common}(t)$, which may be the distance between the satellite and the uplink time synchronization reference point divided by the speed of light at time t (e.g., at the uplink time synchronization reference point). In some aspects, the common TA parameter may include the parameters used to calculate $Delay_{common}(t)$. In some aspects, the common TA parameter may not be signaled by the network. For example, when the satellite serves as a base station, in the combination of the UE location and the common TA parameters, the common TA ($N_{TA,common}$) parameters may be assumed to be zero.

In some aspects, the previous TA parameter and the current TA parameter may include a plurality of parameters, and the plurality of parameters may be updated at the same time. For example, the previous TA parameter and the current TA parameter may include the same parameter(s), and the values of those parameters(s) may be updated between the previous TA parameter and the current TA parameter. In some aspects, the UE may use the previous TA parameter to construct a model for the common TA ($N_{TA,common}$), and the UE may use the current TA parameter to construct an updated model for the common TA ($N_{TA,common}$).

In some aspects, the current satellite location may be derived based at least in part on Ephemeris information and Epoch time broadcasted within a validity duration and a certain orbit propagator mode. For example, the current satellite location may be different than the true satellite location. In some aspects, the threshold (Te_NTN) may be the maximum of NTN UE initial transmission timing error allowed for the sub-carrier spacing (SCS) of synchronization signal blocks (SSBs) and the SCS of uplink signals.

As shown in connection with reference number 725, the UE 705 may transmit an uplink communication based at least in part on the adjusted TA value. For example, the UE 705 may transmit, and the network entity 710 may receive, an uplink communication that is based at least in part on the adjusted TA value.

As shown in connection with reference number 730, the UE 705 may obtain an updated combination of the UE location and the TA parameters. As shown in connection with reference number 735, the UE 705 may determine that a non-updated TA value differs from the current TA value by an amount that is greater than, or greater than or equal to, an other threshold. As shown in connection with reference number 740, the UE 705 may generate an other adjusted TA value. As shown in connection with reference number 740, the UE 120 may transmit an uplink communication based at least in part on the other adjusted TA value. Additional details regarding these features are described in connection with FIG. 8. In some aspects, the processes described in connection with reference numbers 730, 735, 740, and 745 may be performed after the processes described above in connection with reference numbers 715, 720, and 725. In some aspects, the processes described in connection with reference numbers 730, 735, 740, and 745 may be performed before the processes described above in connection with reference numbers 715, 720, and 725.

As described above, the UE 705 may apply gradual TA adjustment to mitigate spikes or jumps in an uplink reception timing error at the network entity 710. This may reduce overcorrection (e.g., double correction) that occurs, for example, when the UE 705 calculates an updated UE-specific TA following an updated GNSS position fix.

As indicated above, FIG. 7 is provided as an example. Other examples may differ from what is described with regard to FIG. 7.

Figure 8:
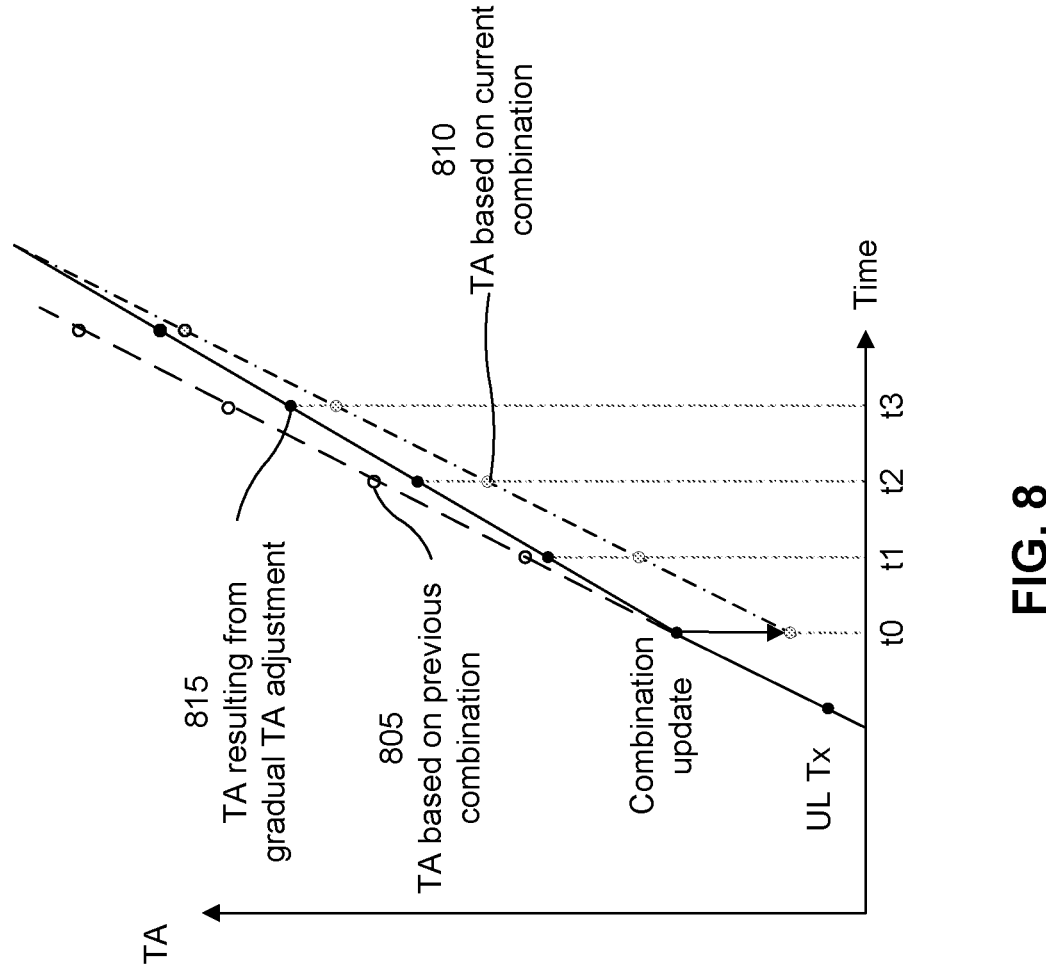
FIG. 8 is a diagram illustrating an example associated with gradual TA adjustment of a previous combination, in accordance with the present disclosure.

FIG. 8 is a diagram illustrating an example 800 associated with gradual TA adjustment of a previous combination, in accordance with the present disclosure. The previous TA value described above may correspond to the "TA based at least in part on previous combination" shown by reference number 805. The current TA value described above may correspond to the "TA based at least in part on current combination" shown by reference number 810. As described above in connection with FIG. 7, the UE 705 may generate an adjusted TA value such that the TA resulting from gradual TA adjustment (815) gradually changes the TA value to be used from the TA based at least in part on the previous combination (805) to the TA based at least in part on the current combination (810).

As indicated above, FIG. 8 is provided as an example. Other examples may differ from what is described with regard to FIG. 8.

Figure 9:
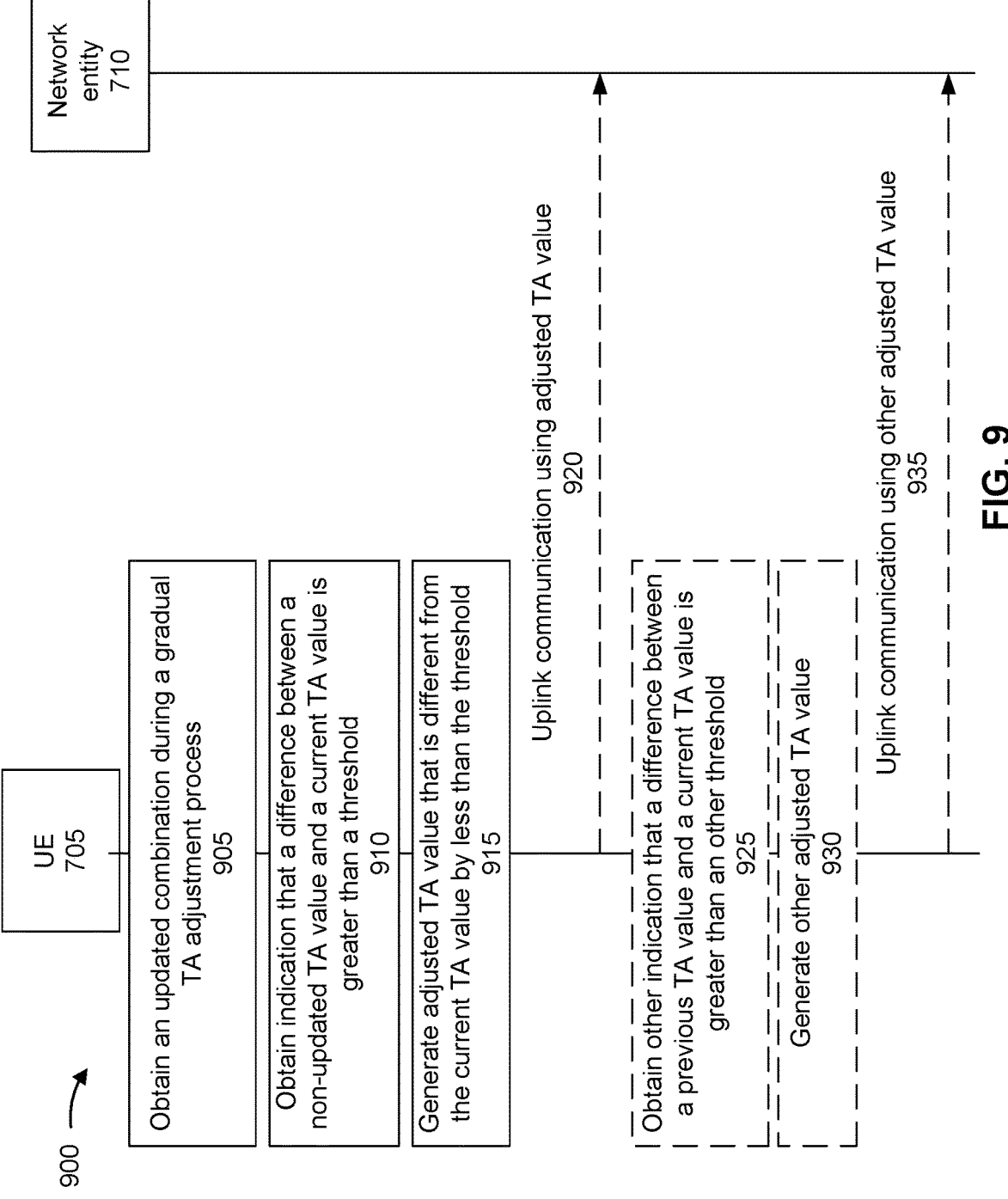
FIG. 9 is a diagram illustrating an example associated with gradual TA adjustment of an updated combination, in accordance with the present disclosure.

FIG. 9 is a diagram illustrating an example 900 associated with gradual TA adjustment of an updated combination, in accordance with the present disclosure.

As shown in connection with reference number 905, the UE 705 may obtain an updated combination (e.g., a third combination) of the UE location and the TA parameter during a gradual timing adjustment process (e.g., as described in connection with FIGS. 7-8).

As shown in connection with reference number 910, the UE 705 may obtain an indication of a difference between a non-updated TA value and a current TA value. For example, the UE 705 may calculate the difference between the non-updated TA value and the current TA value. The non-updated TA value may correspond to the TA value without the updated combination of the UE location and the TA parameter. Additional details regarding this feature are described in connection with FIG. 10.

In some aspects, the non-updated TA value may be the TTA value described above. In some aspects, before a first (e.g., still ongoing) adjustment process is completed, the UE 705 may receive the updated combination, and the UE 705 may start a second adjustment process (e.g., based at least in part on the adjusted timing advance value) which starts with the TA value where the first adjustment process left off.

In some aspects, the TA parameter may be a common TA parameter. For example, the non-updated TA parameter may be the model (e.g., Taylor series) for $N_{TA,common}$ (described herein) of the UE 705 at the time that is during the gradual TA adjustment process, and the current TA parameter may be the model for $N_{TA,common}$ of the UE 705 at the current time. In some aspects, the TA parameter may be a plurality of parameters (e.g., coefficients in a Taylor series) that the network signals to the UE for the latter to construct a model that gives the common TA (i.e., $N_{TA, common}$) as a function of time.

In some aspects, the non-updated TA value may be based at least in part on the current network entity (e.g., satellite) location and a non-updated combination of the UE location and the TA parameter. In some aspects, the non-updated combination of the UE location and the TA parameter may include a non-updated UE location and a current TA parameter. In some aspects, the non-updated combination of the UE location and the TA parameter may include a current UE location and a non-updated TA parameter. In some aspects, the non-updated combination of the UE location and the TA parameter may include the non-updated UE location and the non-updated TA parameter. In some aspects, the current combination of the UE location and the TA parameter may include the current UE location and the current TA parameter.

In some aspects, the threshold may be a TA threshold, such as the Te threshold described above. In some aspects, the threshold may be specific to the NTN. In some aspects, the threshold may be the same threshold as the threshold described above in connection with FIG. 7. In some aspects, the threshold may be different than the threshold described above in connection with FIG. 7.

In some aspects, the UE 705 may determine that the difference between the non-updated TA value and the current TA value is greater than, or greater than or equal to, the threshold. For example, the UE 705 may determine whether:

|TA (combination_n, sat_c)-TA (combination_c, sat_c)|>Te_NTN, where combination_n is the state of the gradual timing adjustment based on the first combination of the UE location and the TA parameter and the second combination, combination_c is the updated combination of the UE location and the TA parameter, sat_c is the current satellite location, TA (combination_n, sat_c) is the TA resulting from the gradual timing adjustment based at least in part on the first combination of the UE location and the TA parameter and the second combination, TA (combination_c, sat_c) is the current TA value, and Te_NTN is the threshold.

Although the difference TA (combination_n, sat_c)–TA (combination_c, sat_c) is shown as an absolute value difference, this may be only an example. In some aspects, the difference may not be a non-absolute value difference. In some aspects, the difference may be checked whether it is within a range, for example, [–Threshold, +Threshold], where Threshold takes a positive value.

As shown in connection with reference number 915, the UE 705 may generate an adjusted TA value that is different from the current TA value by an amount that is less than, or less than or equal to, the threshold. The UE 705 may generate the adjusted TA value based at least in part on determining that the difference between the non-updated TA value and the current TA value is greater than, or greater than or equal to, the threshold.

The UE 705 may generate the adjusted TA value in accordance with one or more rules. In some aspects, the UE 705 may generate the adjusted TA value based at least in part on a maximum amount of the magnitude of the timing change allowed in one adjustment. For example, the maximum amount of the magnitude may correspond to the variable Tq (as described herein). In some aspects, the UE 705 may generate the adjusted TA value based at least in part on a minimum aggregate adjustment rate. For example, the minimum aggregate adjustment rate may be Tp per T1 seconds (as described herein), where T1 may be 1 s, 0.5 s, or 2 s, among other examples. In some aspects, the UE 705 may generate the adjusted TA value based at least in part on a maximum aggregate adjustment rate. For example, the maximum aggregate adjustment rate may be Tp per T2 ms (as described herein), where T2 may be 200 ms, 100 ms, or 400 ms, among other examples.

In some aspects, the UE location may be a GNSS location. The GNSS location may be obtained by a GNSS fix (e.g., a GNSS receiver processing GNSS signal), or based at least in part on inertial sensors, among other examples.

In some aspects, the common TA parameter may represent the round-trip delay on the feeder link (e.g., the delay between the satellite and the uplink time synchronization reference point). In some aspects, the common TA parameter may be calculated based at least in part on $Delay_{common}(t)$, which may be the distance between the satellite and the uplink time synchronization reference point divided by the speed of light at time t (e.g., at the uplink time synchronization reference point). In some aspects, the common TA parameter may include the parameters used to calculate $Delay_{common}(t)$. In some aspects, the common TA parameter may not be signaled by the network. For example, when the satellite serves as a base station, in the combination of the UE location and the common TA parameters, the common TA ($N_{TA,common}$) parameters may be assumed to be zero.

In some aspects, the non-updated TA parameter and the current TA parameter may include a plurality of parameters, and the plurality of parameters may be updated at the same time.

In some aspects, the current satellite location may be derived based at least in part on Ephemeris information and Epoch time broadcasted within a validity duration and a certain orbit propagator mode. For example, the current satellite location may be different than the true satellite location. In some aspects, the threshold (Te_NTN) may be the maximum of NTN UE initial transmission timing error allowed for the SCS of SSBs and the SCS of uplink signals.

As shown in connection with reference number 920, the UE 705 may transmit an uplink communication based at least in part on the adjusted TA value. For example, the UE 705 may transmit, and the network entity 710 may receive, an uplink communication that is based at least in part on the adjusted TA value.

As shown in connection with reference number 925, the UE 705 may determine that a previous TA value differs from the current TA value by an amount that is greater than, or greater than or equal to, an other threshold. The previous TA value may correspond to a time that is prior to a time associated with the updated TA value (as described in connection with FIG. 7). As shown in connection with reference number 930, the UE 705 may generate an other adjusted TA value. As shown in connection with reference number 935, the UE 120 may transmit an uplink communication based at least in part on the other adjusted TA value. Additional details regarding these features are described in connection with FIG. 10. In some aspects, the processes described in connection with reference numbers 925, 930, and 935 may be performed after the processes described above in connection with reference numbers 905, 910, 915, and 920. In some aspects, the processes described in connection with reference numbers 925, 930, and 935 may be performed before the processes described above in connection with reference numbers 905, 910, 915, and 920.

As described above, the UE 705 may apply gradual TA adjustment to mitigate spikes or jumps in an uplink reception timing error at the network entity 710. This may reduce overcorrection (e.g., double correction) that occurs, for example, when the UE 705 calculates an updated UE-specific TA following an updated GNSS position fix.

As indicated above, FIG. 9 is provided as an example. Other examples may differ from what is described with regard to FIG. 9.

Figure 10:
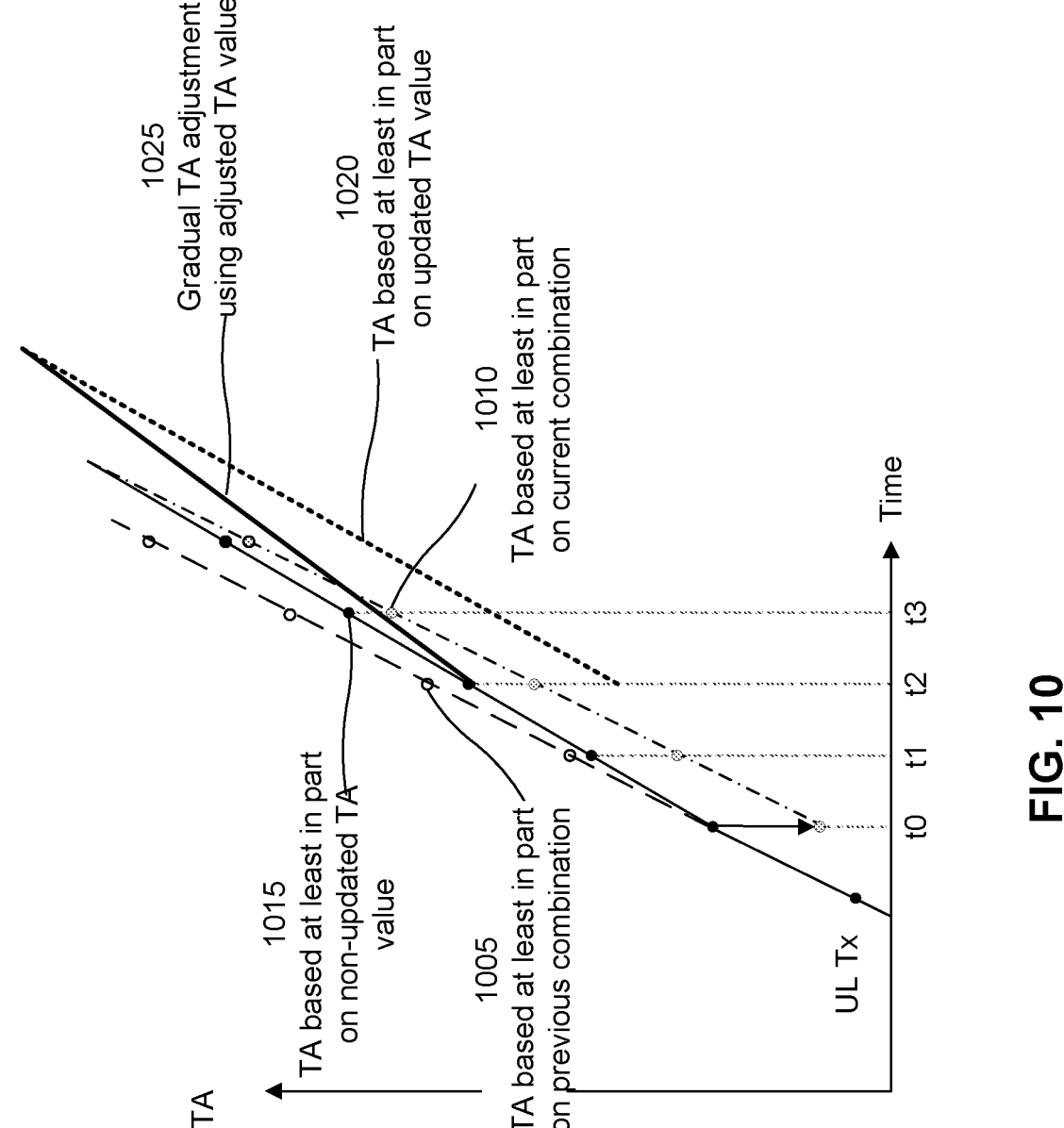
FIG. 10 is a diagram illustrating an example associated with gradual TA adjustment of an updated combination, in accordance with the present disclosure.

FIG. 10 is a diagram illustrating an example 1000 associated with gradual TA adjustment of an updated combination, in accordance with the present disclosure. The previous TA value (described above in connection with FIG. 7) may correspond to the "TA based at least in part on previous combination" shown by reference number 1005. The current TA value may correspond to the "TA based at least in part on current combination" shown by reference number 1010. The non-updated TA value may correspond to the "TA based at least in part on non-updated TA value" shown by reference number 1015. The updated TA value may correspond to the "TA based at least in part on updated TA value" shown by reference number 1020. The adjusted TA value may correspond to the "gradual TA adjustment using adjusted TA value" shown by reference number 1025. As described above in connection with FIG. 9, the UE 705 may generate an adjusted TA value such that the gradual TA adjustment (1025) using adjusted TA value gradually changes the TA value to be used from the TA based at least in part on previous TA value (1005) to the TA based at least in part on updated TA value (1020).

In some aspects, the UE 705 may obtain a third combination of the UE location and the TA parameter in the midst of a gradual timing adjustment process (e.g., as described in connection with FIGS. 7-8) based on a first combination of the UE location and the TA parameter and a second combination of the UE location and the TA parameter. In this example, the UE 705 may determine whether:

|TA (combination_n, sat_c)–TA (combination_c, sat_ c)|>Te_NTN, where combination_n is the state of the gradual timing adjustment based on the first combination of the UE location and the TA parameter and the second combination, combination_c is the third combination of the UE location and the TA parameter, sat_c is the current satellite location, TA (combination_n, sat_c) is the TA resulting from the gradual timing adjustment based on the first combination of the UE location and the TA parameter and the second combination, TA (combination_c, sat_c) is the current TA value, and Te_NTN is the threshold.

As indicated above, FIG. 10 is provided as an example. Other examples may differ from what is described with regard to FIG. 10.

Figure 11:
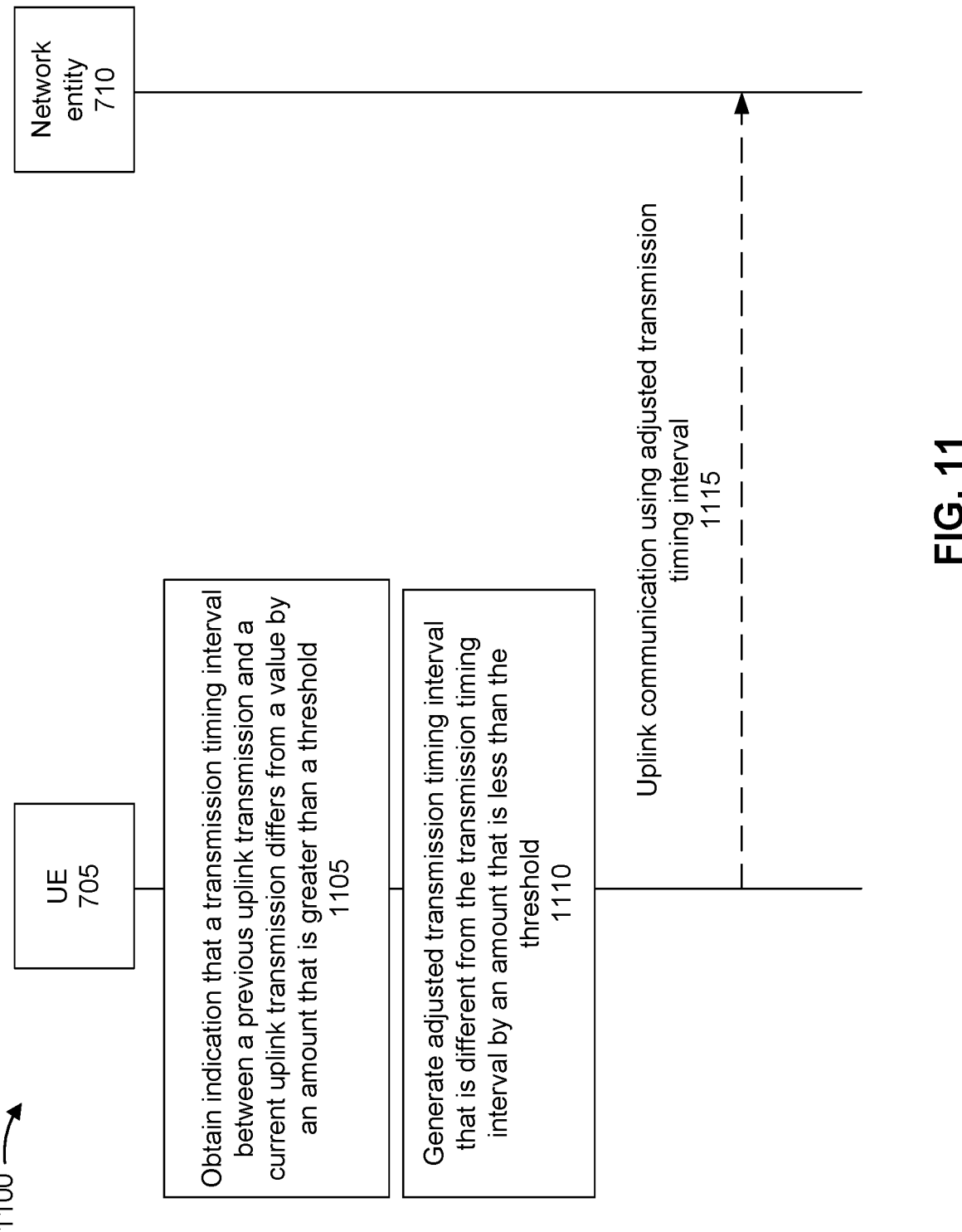
FIG. 11 is a diagram illustrating an example associated with transmission timing interval adjustment, in accordance with the present disclosure.

FIG. 11 is a diagram illustrating an example 1100 of transmission timing interval adjustment, in accordance with the present disclosure.

As shown in connection with reference number 1105, the UE 705 may obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The threshold may be based at least in part on the threshold described above in connection with FIG. 7. For example, the threshold may be 2xTe (double the Te). Alternatively, the threshold may be a different threshold than the threshold described above in connection with FIG. 7. In some aspects, the difference may be caused by the changed multiple-path propagation environment, and/or an update to the combination of the UE location and the TA parameter.

In some aspects, the current timing advance combination may be based at least in part on the current network entity location, the current UE location, and a current timing advance parameter. The network entity may be a terrestrial network entity or an NTN network entity.

In some aspects, the previous timing advance combination may be based at least in part on the current network entity location, a previous UE location, and a current timing advance parameter. In some aspects, the previous timing advance combination may be based at least in part on the current network entity location, a current UE location, and a previous timing advance parameter. In some aspects, the previous timing advance combination may be based at least in part on the current network entity location, the previous UE location, and the previous timing advance parameter.

In some aspects, the UE 705 may determine whether the transmission timing interval differs from the value by an amount that is greater than, or greater than or equal to, the threshold. In a first example, the UE 705 may determine whether:

$$|\text{slot\_length}*(\text{number of slots between the two transmissions}) - TA(\text{combination\_c,sat\_c})/2 + TA(\text{combination\_p,sat\_p})/2| > 2*Te\_NTN, \text{ where:}$$

slot_length is the slot length, number of slots between the two transmissions is the number of slots between the previous uplink transmission and the current uplink transmission, combination_c is the current combination of the UE location and the TA parameter, combination_p is the previous combination of the UE location and the TA parameter, sat_c is the current network entity location, sat_p is the current network entity location, TA (combination_c, sat_c) is the current TA value, TA (combination_p, sat_p) is the previous TA value, and Te NTN is the threshold.

In some aspects, the absolute value term may represent the observed transmission timing interval that would result if there were no change to the combination of the UE location and the TA parameter.

In a second example, the UE 705 may determine whether:

$$|\text{slot\_length}*(\text{number of slots between the two transmissions}) - TA(\text{combination\_c,sat\_c})/2 + TA\_\text{used}/2| > 2*Te\_NTN, \text{ where:}$$

TA used is the TA (TTA) that would be used without the update to the combination of the UE GNSS location and the TA parameter (e.g., the common TA parameters). In some aspects, if a third combination (i.e., combination_c) of the UE location and the TA parameter is received, TA_used is the TA resulting from the gradual timing adjustment based at least in part on a first combination of the UE location and the TA parameter and a second combination of the UE location and the TA parameter.

As shown in connection with reference number 1110, the UE 705 may generate an adjusted transmission timing interval that is different from the transmission timing interval by an amount that is less than, or less than or equal to, the threshold. The UE 705 may generate the adjusted transmission timing interval based at least in part on determining that the difference between the transmission timing interval and the value (calculated as above) is greater than, or greater than or equal to, the threshold.

The UE 705 may generate the adjusted transmission timing interval in accordance with one or more rules. In some aspects, the UE 705 may generate the adjusted transmission timing interval based at least in part on a maximum amount of the magnitude of the transmission timing interval allowed in one adjustment. For example, the maximum amount of the magnitude may correspond to the variable Tq (as described herein). In some aspects, the UE 705 may generate the adjusted transmission timing interval based at least in part on a minimum aggregate adjustment rate. For example, the minimum aggregate adjustment rate may be Tp per T1 seconds (as described herein), where T1 may be 1 s, 0.5 s, or 2 s, among other examples. In some aspects, the UE 705 may generate the adjusted transmission timing interval based at least in part on a maximum aggregate adjustment rate. For example, the maximum aggregate adjustment rate may be Tp per T2 ms (as described herein), where T2 may be 200 ms, 100 ms, or 400 ms, among other examples.

In some aspects, when a transmission timing interval from the previous transmission to the current transmission differs from $|\text{slot\_length}*(\text{number of slots between the two transmissions}) - TA\_ue\_c$ (GNSS_c, common_TA_c, sat_c)/2 + TA_ue_p (GNSS_p, common_TA_p, sat_c)/2| by more than 2*Te_NTN, the UE may adjust the current transmission timing following the rules:

1) The maximum amount of the magnitude of the timing change in one adjustment is Tq.

2) The minimum aggregate adjustment rate is Tp per T1 second, where T1 could be 1, 0.5, 2, etc.

3) The maximum aggregate adjustment rate is Tq per T2 ms, where T2 could be 200, 100, 400 etc.

In some aspects, when a transmission timing interval from the previous transmission to the current transmission differs from $|\text{slot\_length}*(\text{number of slots between the two transmissions}) - TA\_ue\_c$ (GNSS_c, common_TA_c, sat_c)/2 + TA_ue_p (GNSS_p, common_TA_p, sat_p)/2| by more than 2*Te_NTN, all adjustments made to the current transmission timing apart from |slot_length*(number of slots between the two transmissions)-TA_ue_c (GNSS_c, common_TA_c, sat_c)/2+TA_ue_p (GNSS_p, common_TA_p, sat_p)/2| may follow these rules:

1) The maximum amount of the magnitude of the timing change in one adjustment is Tq.
2) The minimum aggregate adjustment rate shall be Tp per T1 second, where T1 may be 1, 0.5, 2, etc.
3) The maximum aggregate adjustment rate shall be Tq per T2 ms, where T2 may be 200, 100, 400 etc.

As shown in connection with reference number 1115, the UE 705 may transmit an uplink communication based at least in part on the adjusted transmission timing interval. For example, the UE 705 may transmit, and the network entity 710 may receive, an uplink communication that is based at least in part on the adjusted transmission timing interval.

As indicated above, FIG. 11 is provided as an example. Other examples may differ from what is described with regard to FIG. 11.

FIG. 12 is a diagram illustrating an example process 1200 performed, for example, by a UE, in accordance with the present disclosure. Example process 1200 is an example where the UE (e.g., UE 120) performs operations associated with gradual TA adjustment of a previous combination].

As shown in FIG. 12, in some aspects, process 1200 may include obtaining an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter (block 1210). For example, the UE (e.g., using communication manager 140 and/or obtaining component 1808, depicted in FIG. 18) may obtain an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter, as described above.

As further shown in FIG. 12, in some aspects, process 1200 may include generating an adjusted timing advance value that is different from the current timing advance value by an amount that is less than the threshold (block 1220). For example, the UE (e.g., using communication manager 140 and/or generation component 1810, depicted in FIG. 18) May generate an adjusted timing advance value that is different from the current timing advance value by an amount that is less than the threshold, as described above.

Process 1200 may include additional aspects, such as any single aspect or any combination of aspects described below and/or in connection with one or more other processes described elsewhere herein.

In a first aspect, the previous combination of the UE location and the timing advance parameter comprises one or more of a previous UE location and a current timing advance parameter, a current UE location and a previous timing advance parameter, or the previous UE location and the previous timing advance parameter.

In a second aspect, alone or in combination with the first aspect, the current combination of the UE location and the timing advance parameter comprises a current UE location and a current timing advance parameter.

In a third aspect, alone or in combination with one or more of the first and second aspects, generating the adjusted timing advance value comprises generating the adjusted timing advance value that is different from the current timing advance value by the amount that is less than the threshold based at least in part on a maximum magnitude allowed for a timing advance value adjustment.

In a fourth aspect, alone or in combination with one or more of the first through third aspects, generating the adjusted timing advance value comprises generating the adjusted timing advance value that is different from the current timing advance value by the amount that is less than the threshold based at least in part on a minimum aggregate adjustment rate.

In a fifth aspect, alone or in combination with one or more of the first through fourth aspects, generating the adjusted timing advance value comprises generating the adjusted timing advance value that is different from the current timing advance value by the amount that is less than the threshold based at least in part on a maximum aggregate adjustment rate.

In a sixth aspect, alone or in combination with one or more of the first through fifth aspects, process 1200 includes obtaining an updated combination of the UE location and the timing advance parameter during a gradual timing adjustment, obtaining an other indication that a difference between a non-updated timing advance value that is based at least in part on the current satellite location and a non-updated combination of the UE location and the timing advance parameter, and the current timing advance value, is greater than an other threshold, and generating an other adjusted timing advance value that is different from the current timing advance value by an amount that is less than the other threshold.

In a seventh aspect, alone or in combination with one or more of the first through sixth aspects, the non-updated timing advance value corresponds to a timing advance value that is not adjusted in accordance with the gradual timing adjustment.

In an eighth aspect, alone or in combination with one or more of the first through seventh aspects, the gradual timing adjustment is based at least in part on the adjusted timing advance value.

In a ninth aspect, alone or in combination with one or more of the first through eighth aspects, the non-updated combination of the UE location and the timing advance parameter comprises one or more of a non-updated UE location and a current timing advance parameter, a current UE location and a non-updated timing advance parameter, or the non-updated UE location and the non-updated timing advance parameter.

In a tenth aspect, alone or in combination with one or more of the first through ninth aspects, the other threshold is the same as the threshold.

In an eleventh aspect, alone or in combination with one or more of the first through tenth aspects, the other threshold is different than the threshold.

In a twelfth aspect, alone or in combination with one or more of the first through eleventh aspects, generating the other adjusted timing advance value comprises generating the other adjusted timing advance value that is different from the current timing advance value by the amount that is less than the other threshold based at least in part on a maximum magnitude allowed for a timing advance value adjustment.

In a thirteenth aspect, alone or in combination with one or more of the first through twelfth aspects, generating the other adjusted timing advance value comprises generating the other adjusted timing advance value that is different from the current timing advance value by the amount that is less than the other threshold based at least in part on a minimum aggregate adjustment rate or a maximum aggregate adjustment rate.

In a fourteenth aspect, alone or in combination with one or more of the first through thirteenth aspects, process 1200 includes a transceiver, wherein the transceiver is configured to obtaining the indication that the difference between the previous timing advance value and the current timing advance value is greater than the threshold, and generating the adjusted timing advance value that is different from the current timing advance value by the amount that is less than the threshold.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a UE, in accordance with the present disclosure. Example process 1300 is an example where the UE (e.g., UE 120) performs operations associated with gradual TA adjustment of an updated combination.

As shown in FIG. 13, in some aspects, process 1300 may include obtaining an updated combination of a UE location and a timing advance parameter during a gradual timing adjustment (block 1310). For example, the UE (e.g., using communication manager 140 and/or obtaining component 1808, depicted in FIG. 18) may obtain an updated combination of a UE location and a timing advance parameter during a gradual timing adjustment, as described above.

As further shown in FIG. 13, in some aspects, process 1300 may include obtaining an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter (block 1320). For example, the UE (e.g., using communication manager 140 and/or obtaining component 1808, depicted in FIG. 18) may obtain an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter, as described above.

As further shown in FIG. 13, in some aspects, process 1300 may include generating an adjusted timing advance value that is different from the current timing advance value by an amount that is less than the threshold (block 1330). For example, the UE (e.g., using communication manager 140 and/or generation component 1810, depicted in FIG. 18) may generate an adjusted timing advance value that is different from the current timing advance value by an amount that is less than the threshold, as described above.

Process 1300 may include additional aspects, such as any single aspect or any combination of aspects described below and/or in connection with one or more other processes described elsewhere herein.

In a first aspect, the non-updated timing advance value corresponds to a timing advance value that is not adjusted in accordance with the gradual timing adjustment.

In a second aspect, alone or in combination with the first aspect, the non-updated combination of the UE location and the timing advance parameter comprises one or more of a non-updated UE location and a current timing advance parameter, a current UE location and a non-updated timing advance parameter, or the non-updated UE location and the non-updated timing advance parameter.

In a third aspect, alone or in combination with one or more of the first and second aspects, process 1300 includes a transceiver, wherein the transceiver is configured to obtaining the updated combination of the UE location and the timing advance parameter during the gradual timing adjustment, obtaining the indication that the difference between the non-updated timing advance value and the current timing advance value is greater than the threshold, and generating the adjusted timing advance value that is different from the current timing advance value by the amount that is less than the threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a UE, in accordance with the present disclosure. Example process 1400 is an example where the UE (e.g., UE 120) performs operations associated with transmission timing interval adjustment.

As shown in FIG. 14, in some aspects, process 1400 may include obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold (block 1410). For example, the UE (e.g., using communication manager 140 and/or obtaining component 1808, depicted in FIG. 18) may obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold, as described above.

As further shown in FIG. 14, in some aspects, process 1400 may include generating an adjusted transmission timing interval that is different from the transmission timing interval by an amount that is less than the threshold (block 1420). For example, the UE (e.g., using communication manager 140 and/or generation component 1810, depicted in FIG. 18) may generate an adjusted transmission timing interval that is different from the transmission timing interval by an amount that is less than the threshold, as described above.

Process 1400 may include additional aspects, such as any single aspect or any combination of aspects described below and/or in connection with one or more other processes described elsewhere herein.

In a first aspect, the current timing advance combination is a function of a current network entity location, a current UE location, and a timing advance parameter.

In a second aspect, alone or in combination with the first aspect, the previous timing advance combination is a function of one or more of a current network entity location, a previous UE location, and a current timing advance parameter, the current network entity location, a current UE location, and a previous timing advance parameter, or the current network entity location, the previous UE location, and the previous timing advance parameter.

In a third aspect, alone or in combination with one or more of the first and second aspects, generating the adjusted transmission timing interval comprises generating the adjusted transmission timing interval that is different from the transmission timing interval by the amount that is less than the threshold based at least in part on a maximum magnitude allowed for a timing interval adjustment.

In a fourth aspect, alone or in combination with one or more of the first through third aspects, generating the adjusted transmission timing interval comprises generating the adjusted transmission timing interval that is different from the transmission timing interval by the amount that is less than the threshold based at least in part on a minimum aggregate adjustment rate.

In a fifth aspect, alone or in combination with one or more of the first through fourth aspects, generating the adjusted transmission timing interval comprises generating the adjusted transmission timing interval that is different from the transmission timing interval by the amount that is less than the threshold based at least in part on a maximum aggregate adjustment rate.

In a sixth aspect, alone or in combination with one or more of the first through fifth aspects, the previous timing advance combination corresponds to a UE location and timing advance parameter that would be used without an update to the combination of the UE location and the timing advance parameter.

In a seventh aspect, alone or in combination with one or more of the first through sixth aspects, process 1400 includes a transceiver, wherein the transceiver is configured to obtaining the indication that the transmission timing interval between the previous uplink transmission and the current uplink transmission differs from the value by the amount that is greater than a threshold, and generating the adjusted transmission timing interval that is different from the transmission timing interval by the amount that is less than the threshold.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a UE, in accordance with the present disclosure. Example process 1500 is an example where the UE (e.g., UE 120) performs operations associated with timing advance adjustment.

As shown in FIG. 15, in some aspects, process 1500 may include obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold (block 1510). For example, the UE (e.g., using communication manager 140 and/or obtaining component 1808, depicted in FIG. 16) may obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold, as described above.

As further shown in FIG. 15, in some aspects, process 1500 may include generating an adjusted timing advance value that is different from the current timing advance value by an amount that is less than the threshold (block 1520). For example, the UE (e.g., using communication manager 140 and/or generation component 1810, depicted in FIG. 16) may generate an adjusted timing advance value that is different from the current timing advance value by an amount that is less than the threshold, as described above.

Process 1500 may include additional aspects, such as any single aspect or any combination of aspects described below and/or in connection with one or more other processes described elsewhere herein.

In a first aspect, the previous combination of the UE location and the timing advance parameter comprises a previous UE location and a current timing advance parameter, a current UE location and a previous timing advance parameter, or the previous UE location and the previous timing advance parameter.

In a second aspect, alone or in combination with the first aspect, the current combination of the UE location and the timing advance parameter comprises a current UE location and a current timing advance parameter.

In a third aspect, alone or in combination with one or more of the first and second aspects, generating the adjusted timing advance value comprises generating the adjusted timing advance value that is different from the current timing advance value by the amount that is less than the threshold based at least in part on a maximum magnitude allowed for a timing advance value adjustment.

In a fourth aspect, alone or in combination with one or more of the first through third aspects, generating the adjusted timing advance value comprises generating the adjusted timing advance value that is different from the current timing advance value by the amount that is less than the threshold based at least in part on a minimum aggregate adjustment rate.

In a fifth aspect, alone or in combination with one or more of the first through fourth aspects, generating the adjusted timing advance value comprises generating the adjusted timing advance value that is different from the current timing advance value by the amount that is less than the threshold based at least in part on a maximum aggregate adjustment rate.

In a sixth aspect, alone or in combination with one or more of the first through fifth aspects, the UE location is a global navigation satellite system location.

In a seventh aspect, alone or in combination with one or more of the first through sixth aspects, the timing advance parameter is a common timing advance parameter.

In an eighth aspect, alone or in combination with one or more of the first through seventh aspects, process 1500 includes obtaining an updated combination of the UE location and the timing advance parameter during a gradual timing adjustment, obtaining an other indication that a difference between a non-updated timing advance value that is based at least in part on the current satellite location and a non-updated combination of the UE location and the timing advance parameter, and the current timing advance value, is greater than an other threshold, and generating an other adjusted timing advance value that is different from the current timing advance value by an amount that is less than the other threshold.

In a ninth aspect, alone or in combination with one or more of the first through eighth aspects, the non-updated timing advance value corresponds to a timing advance value that is not adjusted in accordance with the gradual timing adjustment.

In a tenth aspect, alone or in combination with one or more of the first through ninth aspects, the gradual timing adjustment is based at least in part on the adjusted timing advance value.

In an eleventh aspect, alone or in combination with one or more of the first through tenth aspects, the non-updated combination of the UE location and the timing advance parameter comprises a non-updated UE location and a current timing advance parameter, a current UE location and a non-updated timing advance parameter, or the non-updated UE location and the non-updated timing advance parameter.

In a twelfth aspect, alone or in combination with one or more of the first through eleventh aspects, the other threshold is the same as the threshold.

In a thirteenth aspect, alone or in combination with one or more of the first through twelfth aspects, the other threshold is different than the threshold.

In a fourteenth aspect, alone or in combination with one or more of the first through thirteenth aspects, generating the other adjusted timing advance value comprises generating the other adjusted timing advance value that is different from the current timing advance value by the amount that is less than the other threshold based at least in part on a maximum magnitude allowed for a timing advance value adjustment.

In a fifteenth aspect, alone or in combination with one or more of the first through fourteenth aspects, generating the other adjusted timing advance value comprises generating the other adjusted timing advance value that is different from the current timing advance value by the amount that is less than the other threshold based at least in part on a minimum aggregate adjustment rate.

In a sixteenth aspect, alone or in combination with one or more of the first through fifteenth aspects, generating the other adjusted timing advance value comprises generating the other adjusted timing advance value that is different from the current timing advance value by the amount that is less than the other threshold based at least in part on a maximum aggregate adjustment rate.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by an UE, in accordance with the present disclosure. Example process 1600 is an example where the UE (e.g., UE 120) performs operations associated with timing advance adjustment.

As shown in FIG. 16, in some aspects, process 1600 may include obtaining an updated combination of a UE location and a timing advance parameter during a gradual timing adjustment (block 1810). For example, the UE (e.g., using communication manager 140 and/or obtaining component 1808, depicted in FIG. 16) may obtain an updated combination of a UE location and a timing advance parameter during a gradual timing adjustment, as described above.

As further shown in FIG. 16, in some aspects, process 1600 may include obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold (block 1620). For example, the UE (e.g., using communication manager 140 and/or obtaining component 1808, depicted in FIG. 16) may obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold, as described above.

As further shown in FIG. 16, in some aspects, process 1600 may include generating an adjusted timing advance value that is different from the current timing advance value by an amount that is less than the threshold (block 1630). For example, the UE (e.g., using communication manager 140 and/or generation component 1810, depicted in FIG. 16) may generate an adjusted timing advance value that is different from the current timing advance value by an amount that is less than the threshold, as described above.

Process 1600 may include additional aspects, such as any single aspect or any combination of aspects described below and/or in connection with one or more other processes described elsewhere herein.

In a first aspect, the non-updated timing advance value corresponds to a timing advance value that is not adjusted in accordance with the gradual timing adjustment.

In a second aspect, alone or in combination with the first aspect, the non-updated combination of the UE location and the timing advance parameter comprises a non-updated UE location and a current timing advance parameter, a current UE location and a non-updated timing advance parameter, or the non-updated UE location and the non-updated timing advance parameter.

In a third aspect, alone or in combination with one or more of the first and second aspects, generating the adjusted timing advance value comprises generating the adjusted timing advance value that is different from the current timing advance value by the amount that is less than the threshold based at least in part on a maximum magnitude allowed for a timing advance value adjustment.

In a fourth aspect, alone or in combination with one or more of the first through third aspects, generating the adjusted timing advance value comprises generating the adjusted timing advance value that is different from the current timing advance value by the amount that is less than the threshold based at least in part on a minimum aggregate adjustment rate.

In a fifth aspect, alone or in combination with one or more of the first through fourth aspects, generating the adjusted timing advance value comprises generating the adjusted timing advance value that is different from the current timing advance value by the amount that is less than the threshold based at least in part on a maximum aggregate adjustment rate.

In a sixth aspect, alone or in combination with one or more of the first through fifth aspects, the UE location is a global navigation satellite system location.

In a seventh aspect, alone or in combination with one or more of the first through sixth aspects, the timing advance parameter is a common timing advance parameter.

In an eighth aspect, alone or in combination with one or more of the first through seventh aspects, process 1600 includes obtaining an other indication that a difference between a previous timing advance value that is based at least in part on the current satellite location and a previous combination of the UE location and the timing advance parameter, and a current timing advance value that is based at least in part on the current satellite location and the current combination of the UE location and the timing advance parameter, is greater than an other threshold, and generating an other adjusted timing advance value that is different from the current timing advance value by an amount that is less than the other threshold.

In a ninth aspect, alone or in combination with one or more of the first through eighth aspects, the previous combination of the UE location and the timing advance parameter comprises a previous UE location and a current timing advance parameter, a current UE location and a previous timing advance parameter, or the previous UE location and the previous timing advance parameter.

In a tenth aspect, alone or in combination with one or more of the first through ninth aspects, the previous timing advance value corresponds to a timing advance value at a time period that is before the updated combination of the UE location and the timing advance parameter is obtained.

In an eleventh aspect, alone or in combination with one or more of the first through tenth aspects, generating the other adjusted timing advance value comprises generating the other adjusted timing advance value that is different from the current timing advance value by the amount that is less than the other threshold based at least in part on a maximum magnitude allowed for a timing advance value adjustment.

In a twelfth aspect, alone or in combination with one or more of the first through eleventh aspects, generating the other adjusted timing advance value comprises generating the other adjusted timing advance value that is different from the current timing advance value by the amount that is less than the other threshold based at least in part on a minimum aggregate adjustment rate.

In a thirteenth aspect, alone or in combination with one or more of the first through twelfth aspects, generating the other adjusted timing advance value comprises generating the other adjusted timing advance value that is different from the current timing advance value by the amount that is less than the other threshold based at least in part on a maximum aggregate adjustment rate.

In a fourteenth aspect, alone or in combination with one or more of the first through thirteenth aspects, the other threshold is the same as the threshold.

In a fifteenth aspect, alone or in combination with one or more of the first through fourteenth aspects, the other threshold is different than the threshold.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a diagram illustrating an example process 1700 performed, for example, by an UE, in accordance with the present disclosure. Example process 1700 is an example where the UE (e.g., UE 120) performs operations associated with timing advance adjustment.

As shown in FIG. 17, in some aspects, process 1700 may include obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold (block 1810). For example, the UE (e.g., using communication manager 140 and/or obtaining component 1808, depicted in FIG. 16) may obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold, as described above.

As further shown in FIG. 17, in some aspects, process 1700 may include generating an adjusted transmission timing interval that is different from the transmission timing interval by an amount that is less than the threshold (block 1720). For example, the UE (e.g., using communication manager 140 and/or generation component 1810, depicted in FIG. 16) may generate an adjusted transmission timing interval that is different from the transmission timing interval by an amount that is less than the threshold, as described above.

Process 1700 may include additional aspects, such as any single aspect or any combination of aspects described below and/or in connection with one or more other processes described elsewhere herein.

In a first aspect, the current timing advance combination is a function of a current network entity location, a current UE location, and a timing advance parameter.

In a second aspect, alone or in combination with the first aspect, the function includes one half of the current timing advance combination.

In a third aspect, alone or in combination with one or more of the first and second aspects, the previous timing advance combination is a function of one or more of the following a current network entity location, a previous UE location, and a current timing advance parameter, the current network entity location, a current UE location, and a previous timing advance parameter, or the current network entity location, the previous UE location, and the previous timing advance parameter.

In a fourth aspect, alone or in combination with one or more of the first through third aspects, the function includes one half of the previous timing advance combination.

In a fifth aspect, alone or in combination with one or more of the first through fourth aspects, generating the adjusted transmission timing interval comprises generating the adjusted transmission timing interval that is different from the transmission timing interval by the amount that is less than the threshold based at least in part on a maximum magnitude allowed for a timing interval adjustment.

In a sixth aspect, alone or in combination with one or more of the first through fifth aspects, generating the adjusted transmission timing interval comprises generating the adjusted transmission timing interval that is different from the transmission timing interval by the amount that is less than the threshold based at least in part on a minimum aggregate adjustment rate.

In a seventh aspect, alone or in combination with one or more of the first through sixth aspects, generating the adjusted transmission timing interval comprises generating the adjusted transmission timing interval that is different from the transmission timing interval by the amount that is less than the threshold based at least in part on a maximum aggregate adjustment rate.

In an eighth aspect, alone or in combination with one or more of the first through seventh aspects, the previous timing advance combination corresponds to a UE location and timing advance parameter that would be used without an update to the combination of the UE location and the timing advance parameter.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
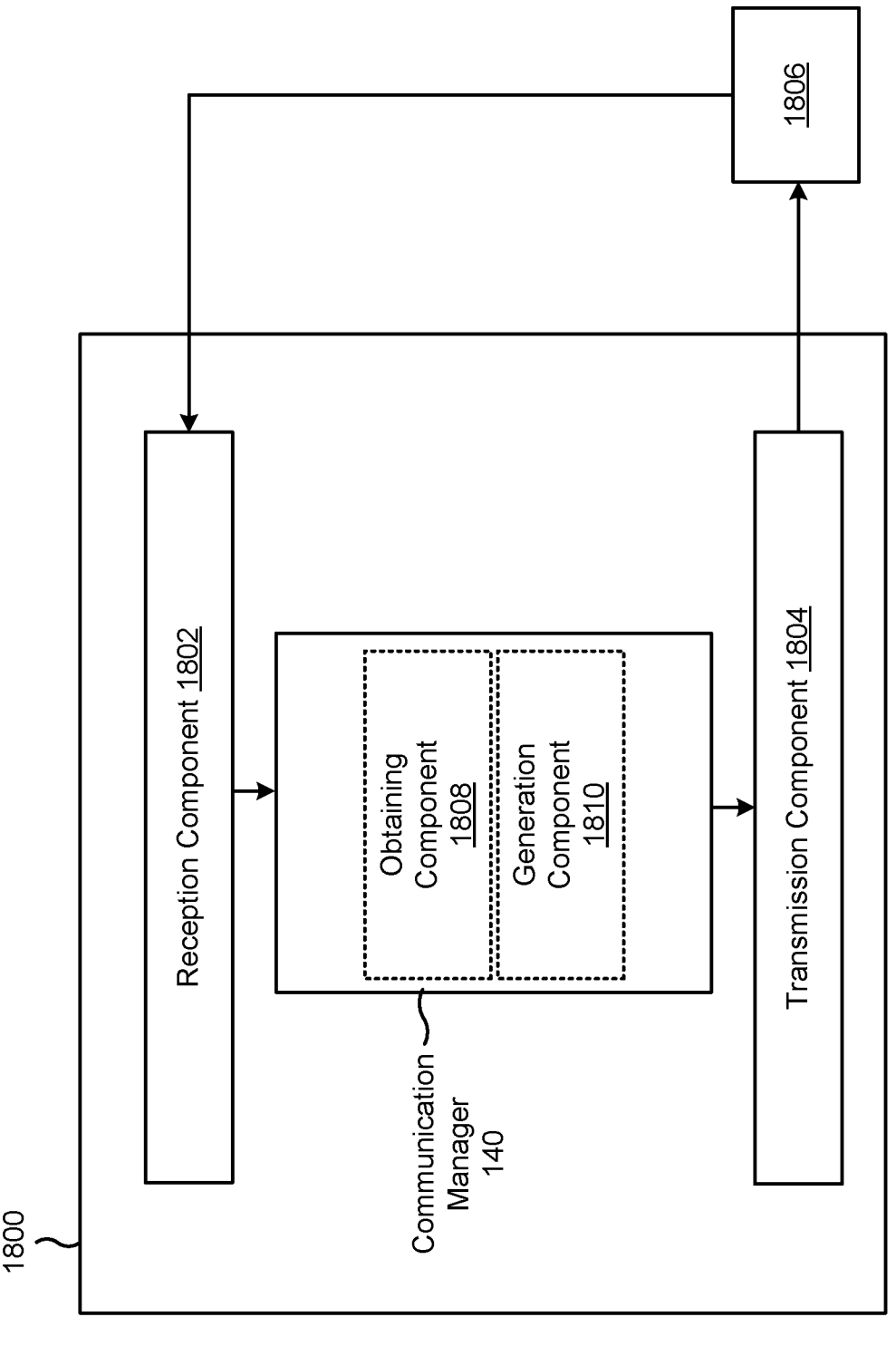
FIG. 18 is a diagram of an example apparatus for wireless communication, in accordance with the present disclosure.

FIG. 18 is a diagram of an example apparatus 1800 for wireless communication. The apparatus 1800 may be a UE, or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 140. The communication manager 140 may include one or more of a obtaining component 1808, or a generation component 1810, among other examples.

In some aspects, the apparatus 1800 may be configured to perform one or more operations described herein in connection with FIGS. 7-13. Additionally, or alternatively, the apparatus 1800 may be configured to perform one or more processes described herein, such as process 1200 of FIG. 12, process 1300 of FIG. 13, process 1400 of FIG. 14, or a combination thereof. In some aspects, the apparatus 1800 and/or one or more components shown in FIG. 18 may include one or more components of the UE described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the UE described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the UE described in connection with FIG. 2. In some aspects, the transmission component 1804 may be co-located with the reception component 1802 in a transceiver.

The obtaining component 1808 may obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold. The generation component 1810 may generate an adjusted timing advance value that is different from the current timing advance value by an amount that is less than the threshold.

The obtaining component 1808 may obtain an updated combination of the UE location and the timing advance parameter during a gradual timing adjustment.

The obtaining component 1808 may obtain an other indication that a difference between a non-updated timing advance value that is based at least in part on the current satellite location and a non-updated combination of the UE location and the timing advance parameter, and the current timing advance value, is greater than an other threshold.

The generation component 1810 may generate an other adjusted timing advance value that is different from the current timing advance value by an amount that is less than the other threshold.

The obtaining component 1808 may obtain an updated combination of a UE location and a timing advance parameter during a gradual timing adjustment. The obtaining component 1808 may obtain an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold. The generation component 1810 may generate an adjusted timing advance value that is different from the current timing advance value by an amount that is less than the threshold.

The obtaining component 1808 may obtain an other indication that a difference between a previous timing advance value that is based at least in part on the current satellite location and a previous combination of the UE location and the timing advance parameter, and a current timing advance value that is based at least in part on the current satellite location and the current combination of the UE location and the timing advance parameter, is greater than an other threshold.

The generation component 1810 may generate an other adjusted timing advance value that is different from the current timing advance value by an amount that is less than the other threshold.

The obtaining component 1808 may obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold. The generation component 1810 may generate an adjusted transmission timing interval that is different from the transmission timing interval by an amount that is less than the threshold.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
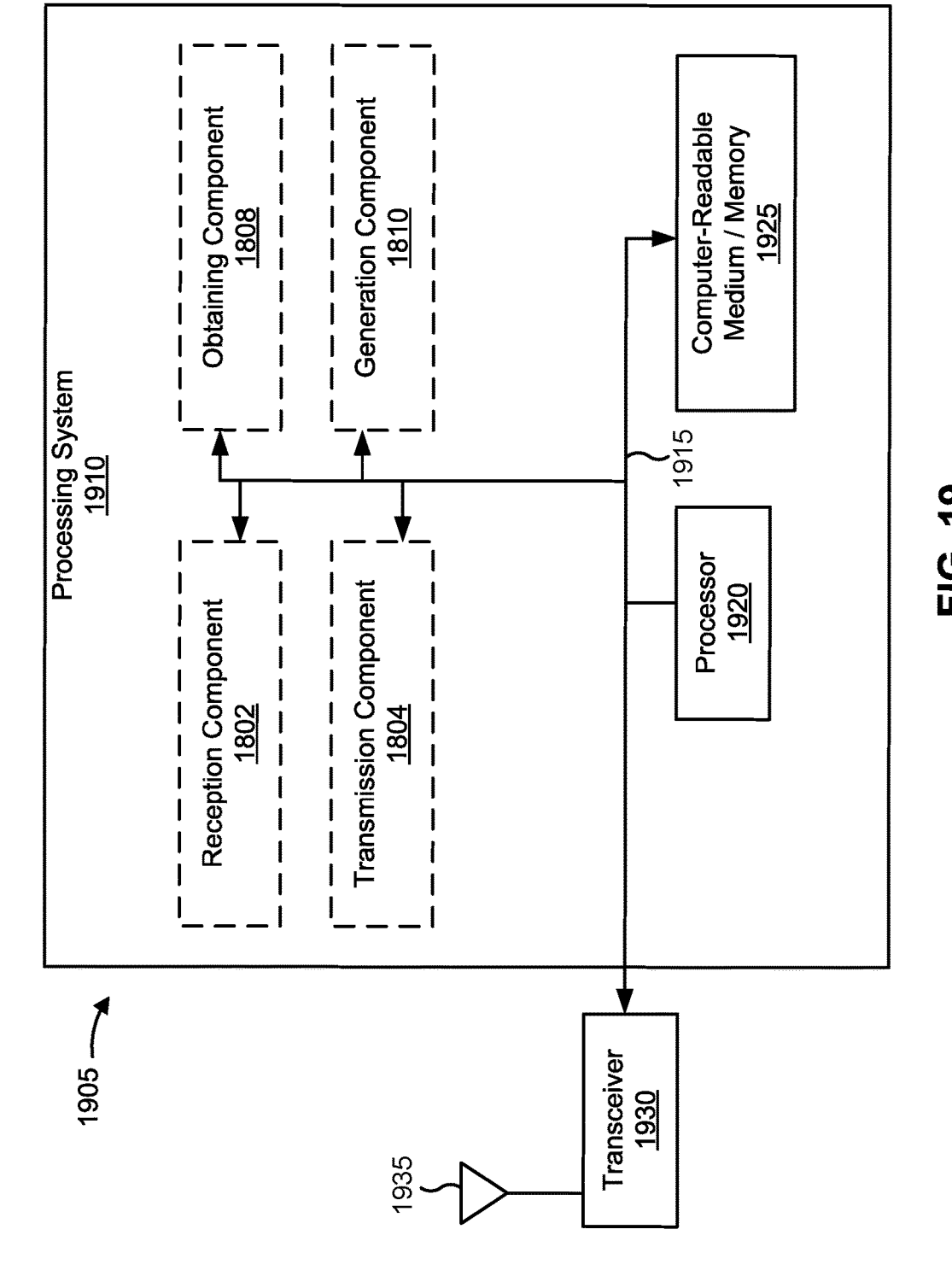
FIG. 19 is a diagram illustrating an example of a hardware implementation for an apparatus employing a processing system, in accordance with the present disclosure.

FIG. 19 is a diagram illustrating an example 1900 of a hardware implementation for an apparatus 1905 employing a processing system 1910. The apparatus 1905 may be a UE.

The processing system 1910 may be implemented with a bus architecture, represented generally by the bus 1915. The bus 1915 may include any number of interconnecting buses and bridges depending on the specific application of the processing system 1910 and the overall design constraints. The bus 1915 links together various circuits including one or more processors and/or hardware components, represented by the processor 1920, the illustrated components, and the computer-readable medium/memory 1925. The bus 1915 may also link various other circuits, such as timing sources, peripherals, voltage regulators, and/or power management circuits.

The processing system 1910 may be coupled to a transceiver 1930. The transceiver 1930 is coupled to one or more antennas 1935. The transceiver 1930 provides a means for communicating with various other apparatuses over a transmission medium. The transceiver 1930 receives a signal from the one or more antennas 1935, extracts information from the received signal, and provides the extracted information to the processing system 1910, specifically the reception component 1502. In addition, the transceiver 1930 receives information from the processing system 1910, specifically the transmission component 1504, and generates a signal to be applied to the one or more antennas 1935 based at least in part on the received information.

The processing system 1910 includes a processor 1920 coupled to a computer-readable medium/memory 1925. The processor 1920 is responsible for general processing, including the execution of software stored on the computer-readable medium/memory 1925. The software, when executed by the processor 1920, causes the processing system 1910 to perform the various functions described herein for any particular apparatus. The computer-readable medium/memory 1925 may also be used for storing data that is manipulated by the processor 1920 when executing software. The processing system further includes at least one of the illustrated components. The components may be software modules running in the processor 1920, resident/stored in the computer readable medium/memory 1925, one or more hardware modules coupled to the processor 1920, or some combination thereof.

In some aspects, the processing system 1910 may be a component of the UE 120 and may include the memory 282 and/or at least one of the TX MIMO processor 266, the RX processor 258, and/or the controller/processor 280. In some aspects, the apparatus 1905 for wireless communication includes means for obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold; and means for generating an adjusted timing advance value that is different from the current timing advance value by an amount that is less than the threshold. In some aspects, the apparatus 1905 for wireless communication includes means for obtaining an updated combination of a UE location and a timing advance parameter during a gradual timing adjustment; means for obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold; and means for generating an adjusted timing advance value that is different from the current timing advance value by an amount that is less than the threshold. In some aspects, the apparatus 1905 for wireless communication includes means for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold; and means for generating an adjusted transmission timing interval that is different from the transmission timing interval by an amount that is less than the threshold. The aforementioned means may be one or more of the aforementioned components of the apparatus 1800 and/or the processing system 1910 of the apparatus 1905 configured to perform the functions recited by the aforementioned means. As described elsewhere herein, the processing system 1910 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 19 is provided as an example. Other examples may differ from what is described in connection with FIG. 19.

Figure 20:
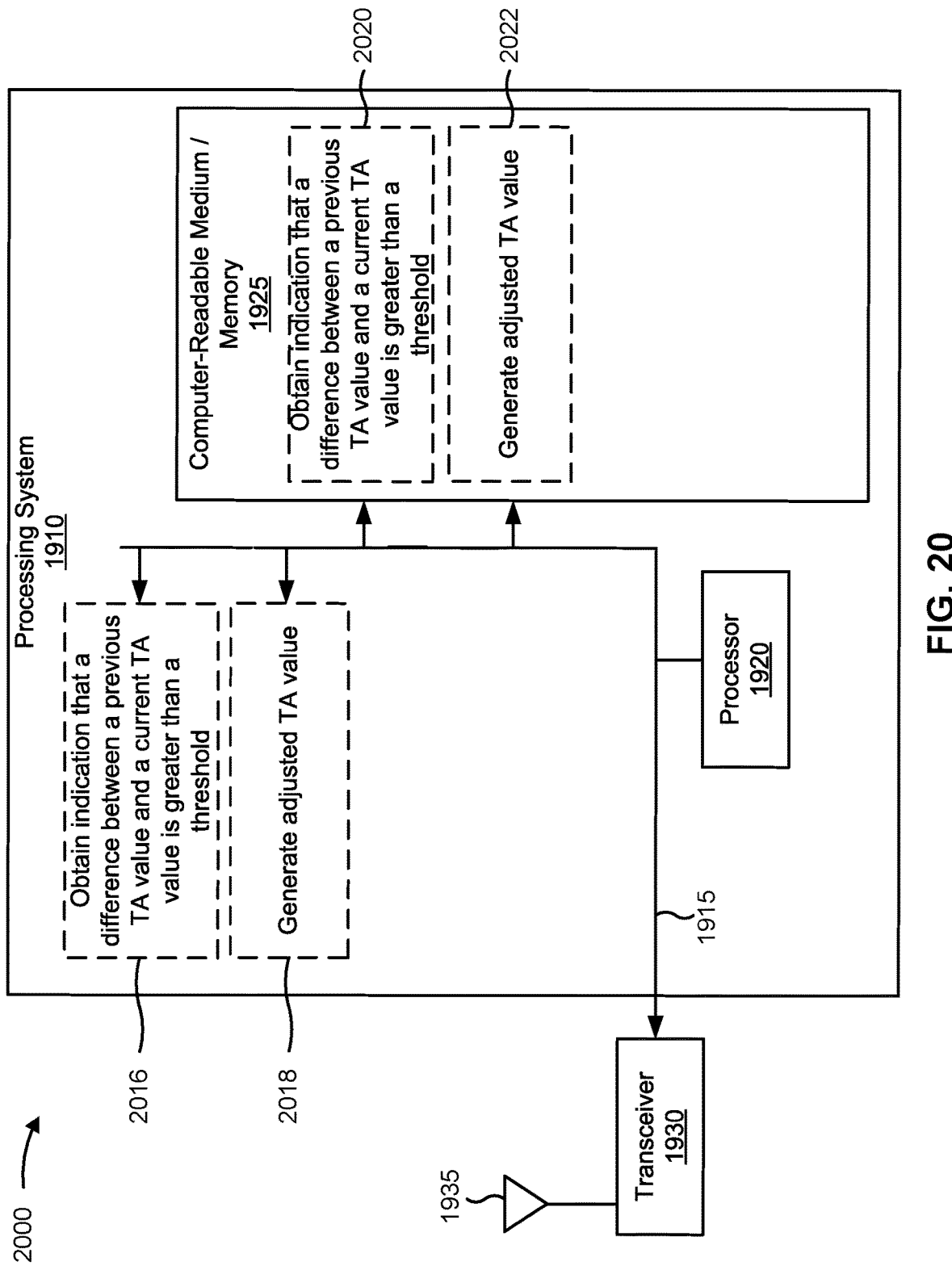
FIG. 20 is a diagram illustrating an example implementation of code and circuitry for an apparatus, in accordance with the present disclosure.

FIG. 20 is a diagram illustrating an example 2000 of an implementation of code and circuitry for an apparatus 1605 for wireless communication. The apparatus 1605 may be, be similar to, include, or be included in the apparatus 1800 shown in FIG. 18, and/or the apparatus 1605 shown in FIG. 16. For example, the apparatus 1605 may be, or include, a base station or a UE. The apparatus 1605 may include a processing system 1810, which may include a bus 1615 coupling one or more components such as, for example, a processor 1620, computer-readable medium/memory 1625, a transceiver 1630, and/or the like. As shown, the transceiver 1630 may be coupled to one or more antenna 1635.

As further shown in FIG. 20, the apparatus 1605 may include circuitry for obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold (circuitry 2016). For example, the apparatus 1605 may include circuitry 2016 to enable the apparatus 1605 to obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold.

As further shown in FIG. 20, the apparatus 1605 may include circuitry for generating an adjusted timing advance value that is different from the current timing advance value by an amount that is less than the threshold (circuitry 2018). For example, the apparatus 1605 may include circuitry 2018 to generate an adjusted timing advance value that is different from the current timing advance value by an amount that is less than the threshold.

As further shown in FIG. 20, the apparatus 1605 may include, stored in computer-readable medium 1625, code for obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold (code 2020). For example, the apparatus 1605 may include code 2020 that, when executed by the processor 1620, may cause the apparatus 1605 to obtain an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold.

As further shown in FIG. 20, the apparatus 1605 may include, stored in computer-readable medium 1625, code for generating an adjusted timing advance value that is different from the current timing advance value by an amount that is less than the threshold (code 2022). For example, the apparatus 1605 may include code 2022 that, when executed by the processor 1620, may cause the transceiver 1630 to generate an adjusted timing advance value that is different from the current timing advance value by an amount that is less than the threshold.

FIG. 20 is provided as an example. Other examples may differ from what is described in connection with FIG. 20.

Figure 21:
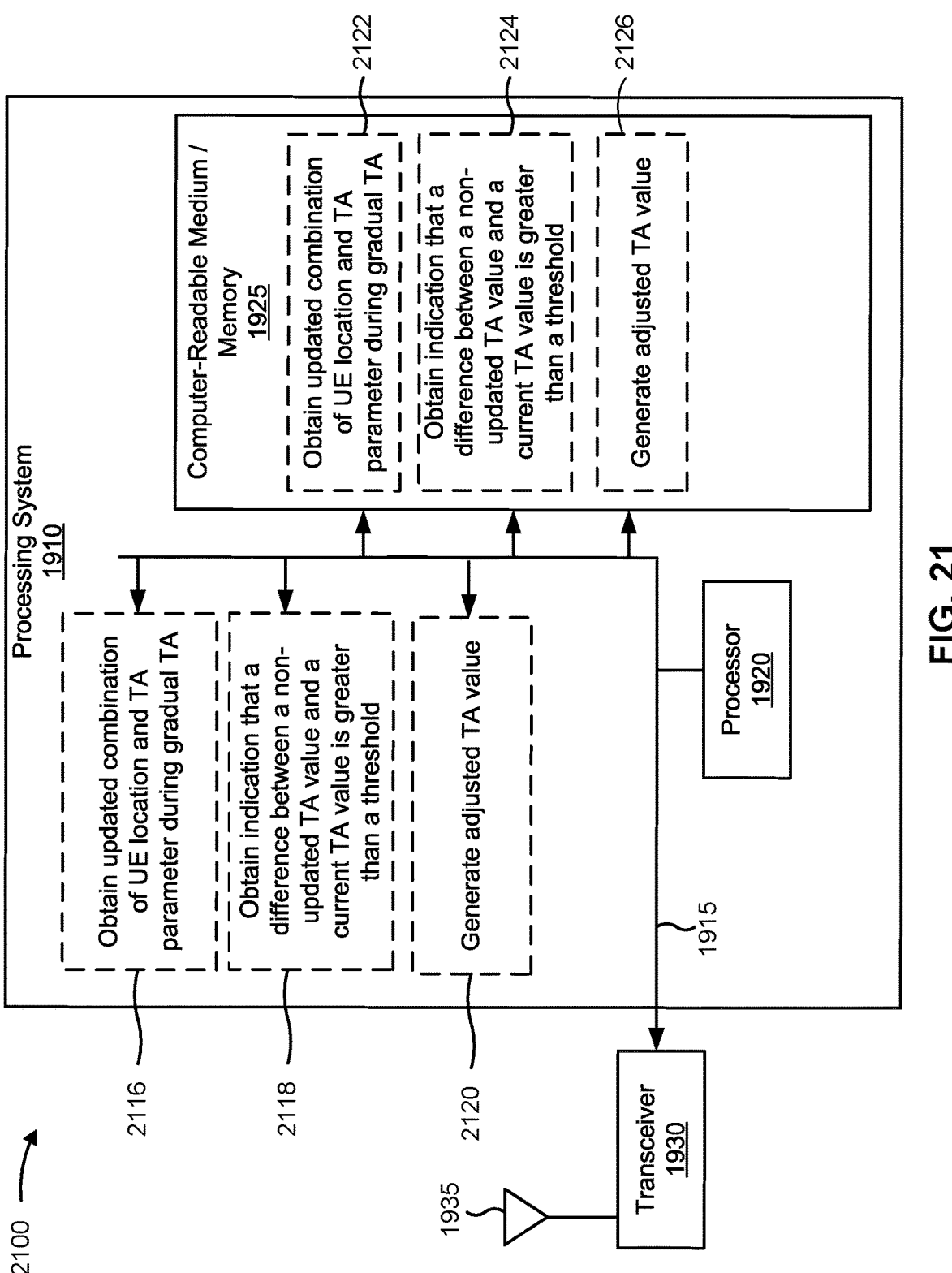
FIG. 21 is a diagram illustrating an example implementation of code and circuitry for an apparatus, in accordance with the present disclosure.

FIG. 21 is a diagram illustrating an example 2100 of an implementation of code and circuitry for an apparatus 1605 for wireless communication. The apparatus 1605 may be, be similar to, include, or be included in the apparatus 1800 shown in FIG. 15, and/or the apparatus 1605 shown in FIG. 16. For example, the apparatus 1605 may be, or include, a base station or a UE. The apparatus 1605 may include a processing system 1810, which may include a bus 1615 coupling one or more components such as, for example, a processor 1620, computer-readable medium/memory 1625, a transceiver 1630, and/or the like. As shown, the transceiver 1630 may be coupled to one or more antenna 1635.

As further shown in FIG. 21, the apparatus 1605 may include circuitry for obtaining an updated combination of the UE location and the timing advance parameter during a gradual timing adjustment (circuitry 2116). For example, the apparatus 1605 may include circuitry 2116 to enable the apparatus 1605 to obtain an updated combination of the UE location and the timing advance parameter during a gradual timing adjustment.

As further shown in FIG. 21, the apparatus 1605 may include circuitry for obtaining an other indication that a difference between a non-updated timing advance value that is based at least in part on the current satellite location and a non-updated combination of the UE location and the timing advance parameter, and the current timing advance value, is greater than an other threshold (circuitry 2118). For example, the apparatus 1605 may include circuitry 2116 to enable the apparatus 1605 to obtain an other indication that a difference between a non-updated timing advance value that is based at least in part on the current satellite location and a non-updated combination of the UE location and the timing advance parameter, and the current timing advance value, is greater than an other threshold.

As further shown in FIG. 21, the apparatus 1605 may include circuitry for generating an other adjusted timing advance value that is different from the current timing advance value by an amount that is less than the other threshold (circuitry 2120). For example, the apparatus 1605 may include circuitry 2118 to generate an other adjusted timing advance value that is different from the current timing advance value by an amount that is less than the other threshold.

As further shown in FIG. 21, the apparatus 1605 may include, stored in computer-readable medium 1625, code for obtaining an updated combination of the UE location and the timing advance parameter during a gradual timing adjustment (code 2122). For example, the apparatus 1605 may include code 2122 that, when executed by the processor 1620, may cause the apparatus 1605 to obtain an updated combination of the UE location and the timing advance parameter during a gradual timing adjustment.

As further shown in FIG. 21, the apparatus 1605 may include, stored in computer-readable medium 1625, code for obtaining an other indication that a difference between a non-updated timing advance value that is based at least in part on the current satellite location and a non-updated combination of the UE location and the timing advance parameter, and the current timing advance value, is greater than an other threshold (code 2124). For example, the apparatus 1605 may include code 2124 that, when executed by the processor 1620, may cause the transceiver 1630 to obtain an other indication that a difference between a non-updated timing advance value that is based at least in part on the current satellite location and a non-updated combination of the UE location and the timing advance parameter, and the current timing advance value, is greater than an other threshold.

As further shown in FIG. 21, the apparatus 1605 may include, stored in computer-readable medium 1625, code for generating an other adjusted timing advance value that is different from the current timing advance value by an amount that is less than the other threshold (code 2126). For example, the apparatus 1605 may include code 2126 that, when executed by the processor 1620, may cause the apparatus 1605 to generate an other adjusted timing advance value that is different from the current timing advance value by an amount that is less than the other threshold.

FIG. 21 is provided as an example. Other examples may differ from what is described in connection with FIG. 21.

Figure 22:
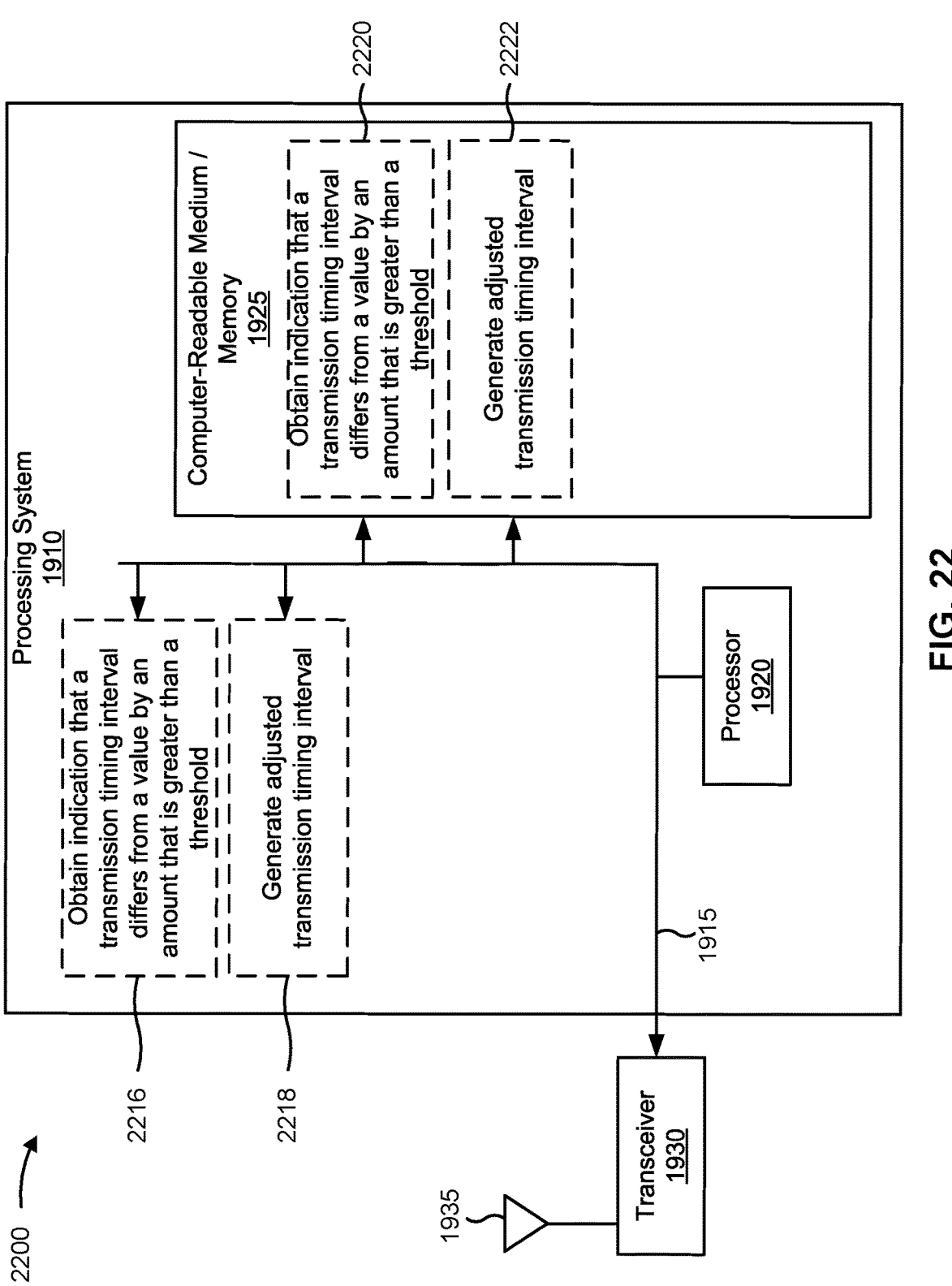
FIG. 22 is a diagram illustrating an example implementation of code and circuitry for an apparatus, in accordance with the present disclosure.

FIG. 22 is a diagram illustrating an example 2200 of an implementation of code and circuitry for an apparatus 1605 for wireless communication. The apparatus 1605 may be, be similar to, include, or be included in the apparatus 1800 shown in FIG. 15, and/or the apparatus 1605 shown in FIG. 16. For example, the apparatus 1605 may be, or include, a base station or a UE. The apparatus 1605 may include a processing system 1810, which may include a bus 1615 coupling one or more components such as, for example, a processor 1620, computer-readable medium/memory 1625, a transceiver 1630, and/or the like. As shown, the transceiver 1630 may be coupled to one or more antenna 1635.

As further shown in FIG. 22, the apparatus 1605 may include circuitry for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold (circuitry 2216). For example, the apparatus 1605 may include circuitry 2216 to enable the apparatus 1605 to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold.

As further shown in FIG. 22, the apparatus 1605 may include circuitry for generating an adjusted transmission timing interval that is different from the transmission timing interval by an amount that is less than the threshold (circuitry 2218). For example, the apparatus 1605 may include circuitry 2218 to generate an adjusted transmission timing interval that is different from the transmission timing interval by an amount that is less than the threshold.

As further shown in FIG. 22, the apparatus 1605 may include, stored in computer-readable medium 1625, code for obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold (code 2220). For example, the apparatus 1605 may include code 2220 that, when executed by the processor 1620, may cause the apparatus 1605 to obtain an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold.

As further shown in FIG. 22, the apparatus 1605 may include, stored in computer-readable medium 1625, code for generating an adjusted transmission timing interval that is different from the transmission timing interval by an amount that is less than the threshold (code 2222). For example, the apparatus 1605 may include code 2222 that, when executed by the processor 1620, may cause the transceiver 1630 to generate an adjusted transmission timing interval that is different from the transmission timing interval by an amount that is less than the threshold.

FIG. 22 is provided as an example. Other examples may differ from what is described in connection with FIG. 22.

Figure 23:
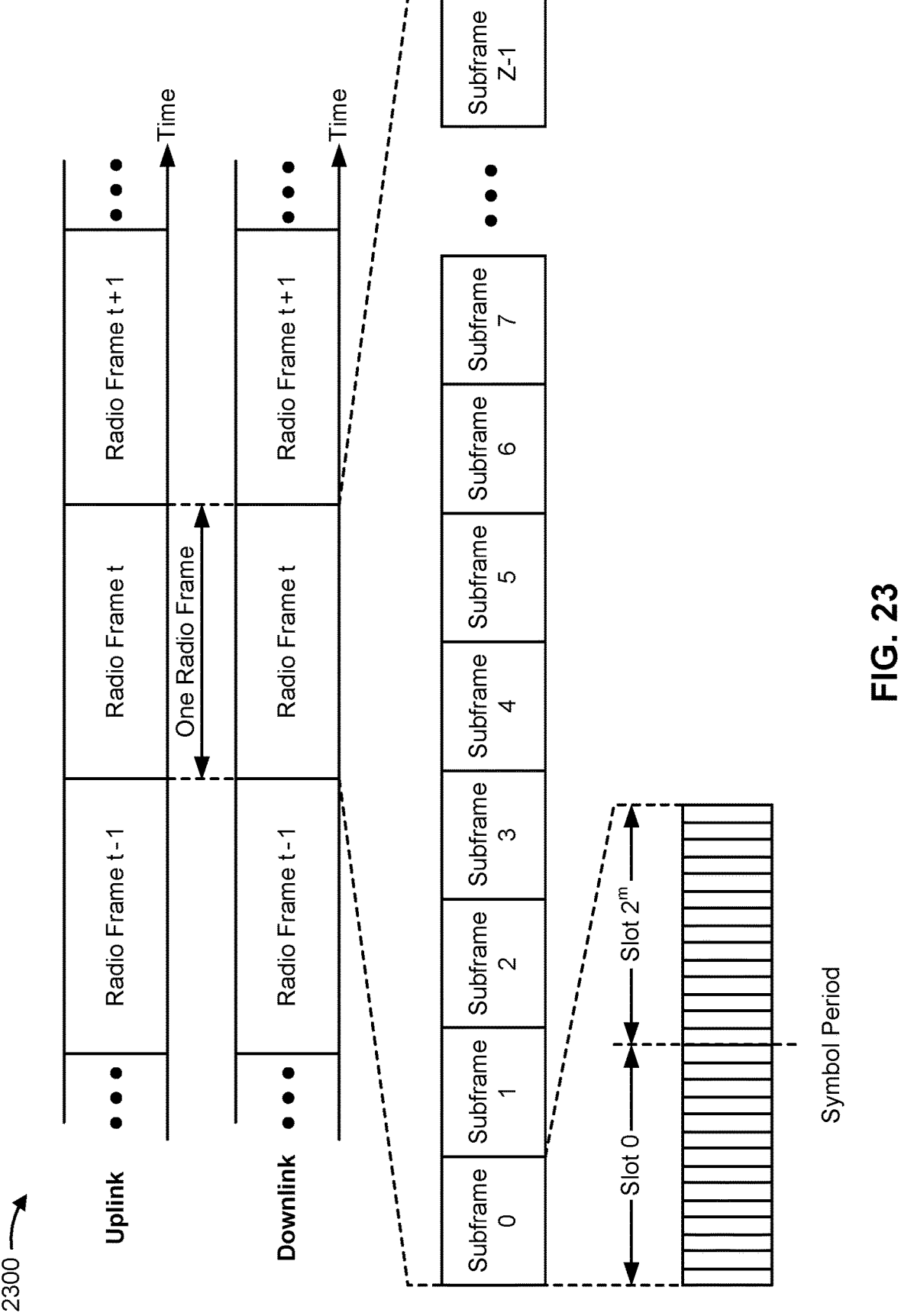
FIG. 23 is a diagram illustrating an example of a frame structure in a wireless communication network.

FIG. 23 is a diagram illustrating an example 2300 of a frame structure in a wireless communication network, in accordance with the present disclosure. The frame structure shown in FIG. 23 is for frequency division duplexing (FDD) in a telecommunication system, such as LTE or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., 2m slots per subframe are shown in FIG. 23, where m is an index of a numerology used for a transmission, such as 0, 1, 2, 3, 4, or another number). Each slot may include a set of L symbol periods. For example, each slot may include fourteen symbol periods (e.g., as shown in FIG. 23), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, mini-slot based, or symbol-based.

As indicated above, FIG. 23 is provided as an example. Other examples may differ from what is described with respect to FIG. 23.

In some aspects, when a UE's TA (TTA) calculated based on the previous combination of the UE location and common TA ($N_{TA,common}$) parameters and the current satellite location differs from the UE's TA calculated based on the current combination of UE location and common TA parameters and the current satellite location by greater than a threshold Te_NTN, i.e., |TA (combination_p, sat_c)-TA (combination_c, sat_c)|>Te_NTN, where combination_p is the previous combination of the UE GNSS location and common TA parameters, combination_c is the current combination of the UE GNSS location and common TA parameters and sat_c is the current satellite location, the UE adjusts its TA to be used so that the difference from TA (combination_c, sat_c) is within Te_NTN subject to these rules:

1) The maximum amount of the magnitude of the timing change in one adjustment shall be Tq.

2) The minimum aggregate adjustment rate shall be Tp per T1 second, where T1 could be 1, 0.5, 2, etc.

3) The maximum aggregate adjustment rate shall be Tq per T2 ms, where T2 could be 200, 100, 400 etc.

Here, Tp and Tq can be the same as those for NTN gradual timing adjustment requirement In some aspects, "when a UE's TA (TTA) calculated based on the previous combination of the UE GNSS location and common TA ($N_{TA,common}$) parameters and the current satellite location" means:

Previous UE GNSS location and current common TA ($N_{TA,common}$) parameters, and current satellite location;

Current UE GNSS location and previous common TA ($N_{TA,common}$) parameters, and current satellite location; or Previous UE GNSS location and previous common TA ($N_{TA,common}$) parameters, and current satellite location.

In some aspects, the UE's GNSS location may be obtained by a GNSS fix (i.e., a GNSS receiver processing GNSS signal), inertial sensors, or other means.

For the common TA:

The common TA may represent the round-trip delay on the feeder link, e.g., the delay between the satellite and the uplink time synchronization reference point.

The common TA may be calculated based on $Delay_{common}$ (t), which is the distance between the satellite and the uplink time synchronization reference point divided by the speed of light at time t, e.g., at the uplink time synchronization reference point.

Common TA parameters may include the parameters used to calculate $Delay_{common}$(t).

In the case the common TA is not signaled by the network, e.g., when the satellite serves as a base station, in the combination of the UE location and common TA ($N_{TA,common}$) parameters, the common TA ($N_{TA,common}$) parameters are assumed to be 0.

The current satellite location is derived based on Ephemeris information and Epoch time broadcasted within a validity duration and a certain orbit propagator mode, i.e. it can be different from a true satellite location.

Te_NTN is the maximum of NTN UE initial transmission timing error allowed by requirement spec corresponding to SCS of SSB and SCS of uplink signals.

In some aspects, when the UE receives an update to the combination of UE GNSS location and common TA parameters, e.g., during an ongoing gradual timing adjustment procedure, if a UE's TA (TTA) that would be used without the update above differs from the UE's TA calculated based on the updated (current) combination of UE location and common TA parameters and the current satellite location by greater than a threshold Te_NTN, i.e., |TA_used−TA (combination_c, sat_c)|>Te_NTN, where TA_used is the TA ($T_{TA}$) that would be used without the update to the combination, combination_c is the current combination of the UE GNSS location and common TA parameters, and sat_c is the current satellite location, the UE is required to adjust the TA to be used so that the difference from TA (combination_c, sat_c) is within Te_NTN subject to these rules:

1) The maximum amount of the magnitude of the timing change in one adjustment shall be Tq.

2) The minimum aggregate adjustment rate shall be Tp per T1 second, where T1 could be 1, 0.5, 2, etc.

3) The maximum aggregate adjustment rate shall be Tq per T2 ms, where T2 could be 200, 100, 400 etc.

Here, Tp and Tq can be the same as those for NTN gradual timing adjustment requirement In some aspects, when a transmission timing interval from the previous uplink transmission to the current uplink transmission differs from |slot_length*(number of slots between the two transmissions)−TA (combination_c, sat_c)/2+TA (combination_p, sat_c)/2| by more than 2*Te_NTN, where combination_p is the previous combination of the UE GNSS location and common TA parameters, combination_c is the current combination of the UE GNSS location and common TA parameters and sat_c is the current satellite location, the UE is required to adjust the current transmission timing (to make future differences to be within 2*Te_NTN) subject to the following rules:

The maximum amount of the magnitude of the timing change in one adjustment shall be Tq.

The minimum aggregate adjustment rate shall be Tp per second.

The maximum aggregate adjustment rate shall be Tq per 200 ms.

When a transmission timing interval from the previous uplink transmission to the current uplink transmission differs from |slot_length*(number of slots between the two transmissions)−TA (combination_c, sat_c)/2+TA_used/2| by more than 2*Te_NTN, where combination_c is the current combination of GNSS location and common TA parameters, TA_used is the TA (TTA) that would be used without the update to the combination of the UE GNSS location and common TA parameters, and sat_c is the current satellite location, the UE is required to adjust the current transmission timing (to make future differences to be within 2*Te_NTN) subject to the following rules:

The maximum amount of the magnitude of the timing change in one adjustment shall be Tq.

The minimum aggregate adjustment rate shall be Tp per second.

The maximum aggregate adjustment rate shall be Tq per 200 ms.

The following provides an overview of some Aspects of the present disclosure:

Aspect 1: A method of wireless communication performed at a user equipment (UE), comprising: obtaining an indication that a difference between a previous timing advance value and a current timing advance value is greater than a threshold, wherein the previous timing advance value is based at least in part on a current satellite location and a previous combination of a UE location and a timing advance parameter, and wherein the current timing advance value is based at least in part on the current satellite location and a current combination of the UE location and the timing advance parameter; and generating an adjusted timing advance value that is different from the current timing advance value by an amount that is less than the threshold.

Aspect 2: The method of Aspect 1, wherein the previous combination of the UE location and the timing advance parameter comprises: a previous UE location and a current timing advance parameter; a current UE location and a previous timing advance parameter; or the previous UE location and the previous timing advance parameter.

Aspect 3: The method of any of Aspects 1-2, wherein the current combination of the UE location and the timing advance parameter comprises a current UE location and a current timing advance parameter.

Aspect 4: The method of any of Aspects 1-3, wherein generating the adjusted timing advance value comprises: generating the adjusted timing advance value that is different from the current timing advance value by the amount that is less than the threshold based at least in part on a maximum magnitude allowed for a timing advance value adjustment.

Aspect 5: The method of any of Aspects 1-4, wherein generating the adjusted timing advance value comprises: generating the adjusted timing advance value that is different from the current timing advance value by the amount that is less than the threshold based at least in part on a minimum aggregate adjustment rate.

Aspect 6: The method of any of Aspects 1-5, wherein generating the adjusted timing advance value comprises: generating the adjusted timing advance value that is different from the current timing advance value by the amount that is less than the threshold based at least in part on a maximum aggregate adjustment rate.

Aspect 7: The method of any of Aspects 1-6, further comprising: obtaining an updated combination of the UE location and the timing advance parameter during a gradual timing adjustment; obtaining an other indication that a difference between a non-updated timing advance value that is based at least in part on the current satellite location and a non-updated combination of the UE location and the timing advance parameter, and the current timing advance value, is greater than an other threshold; and generating an other adjusted timing advance value that is different from the current timing advance value by an amount that is less than the other threshold.

Aspect 8: The method of any of Aspects 1-7, wherein the non-updated timing advance value corresponds to a timing advance value that is not adjusted in accordance with the gradual timing adjustment.

Aspect 9: The method of any of Aspects 1-8, wherein the gradual timing adjustment is based at least in part on the adjusted timing advance value.

Aspect 10: The method of any of Aspects 1-9, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 11: The method of any of Aspects 1-10, wherein the other threshold is the same as the threshold.

Aspect 12: The method of any of Aspects 1-11, wherein the other threshold is different than the threshold.

Aspect 13: The method of any of Aspects 1-12, wherein generating the other adjusted timing advance value comprises: generating the other adjusted timing advance value that is different from the current timing advance value by the amount that is less than the other threshold based at least in part on a maximum magnitude allowed for a timing advance value adjustment.

Aspect 14: The method of any of Aspects 1-13, wherein generating the other adjusted timing advance value comprises: generating the other adjusted timing advance value that is different from the current timing advance value by the amount that is less than the other threshold based at least in part on a minimum aggregate adjustment rate.

Aspect 15: The method of any of Aspects 1-14, wherein generating the other adjusted timing advance value comprises: generating the other adjusted timing advance value that is different from the current timing advance value by the amount that is less than the other threshold based at least in part on a maximum aggregate adjustment rate.

Aspect 16: A method of wireless communication performed at a user equipment (UE), comprising: obtaining an updated combination of a UE location and a timing advance parameter during a gradual timing adjustment; obtaining an indication that a difference between a non-updated timing advance value and a current timing advance value is greater than a threshold, wherein the non-updated timing advance value is based at least in part on a current satellite location and a non-updated combination of the UE location and the timing advance parameter, and wherein the current timing advance value is based at least in part on the current satellite location and a current combination of the UE location and the timing advance parameter; and generating an adjusted timing advance value that is different from the current timing advance value by an amount that is less than the threshold.

Aspect 17: The method of Aspect 16, wherein the non-updated timing advance value corresponds to a timing advance value that is not adjusted in accordance with the gradual timing adjustment.

Aspect 18: The method of any of Aspects 16-17, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 19: A method of wireless communication performed at a user equipment (UE), comprising: obtaining an indication that a transmission timing interval between a previous uplink transmission and a current uplink transmission differs from a value that is based at least in part on a slot length, a number of slots between the previous uplink transmission and the current uplink transmission, a previous timing advance combination, and a previous timing advance combination, by an amount that is greater than a threshold; and generating an adjusted transmission timing interval that is different from the transmission timing interval by an amount that is less than the threshold.

Aspect 20: The method of Aspect 19, wherein the current timing advance combination is a function of a current network entity location, a current UE location, and a timing advance parameter.

Aspect 21: The method of Aspect 19-20, wherein the function includes one half of the current timing advance combination.

Aspect 22: The method of any of Aspects 19-21, wherein the previous timing advance combination is a function of one or more of the following: a current network entity location, a previous UE location, and a current timing advance parameter; the current network entity location, a current UE location, and a previous timing advance parameter; or the current network entity location, the previous UE location, and the previous timing advance parameter.

Aspect 23: The method of Aspect 22, wherein the function includes one half of the previous timing advance combination.

Aspect 24: The method of any of Aspects 22-23, wherein generating the adjusted transmission timing interval comprises: generating the adjusted transmission timing interval that is different from the transmission timing interval by the amount that is less than the threshold based at least in part on a maximum magnitude allowed for a timing interval adjustment.

Aspect 25: The method of any of Aspects 22-24, wherein generating the adjusted transmission timing interval comprises: generating the adjusted transmission timing interval that is different from the transmission timing interval by the amount that is less than the threshold based at least in part on a minimum aggregate adjustment rate.

Aspect 26: The method of any of Aspects 22-25, wherein generating the adjusted transmission timing interval comprises: generating the adjusted transmission timing interval that is different from the transmission timing interval by the amount that is less than the threshold based at least in part on a maximum aggregate adjustment rate.

Aspect 27: The method of any of Aspects 22-26, wherein the previous timing advance combination corresponds to a UE location and timing advance parameter that would be used without an update to the combination of the UE location and the timing advance parameter.

Aspect 28: A method of wireless communication performed by a user equipment (UE), comprising: obtaining an indication that a difference between a previous timing advance value that is based at least in part on a current satellite location and a previous combination of a UE location and a timing advance parameter, and a current timing advance value that is based at least in part on the current satellite location and a current combination of the UE location and the timing advance parameter, is greater than a threshold; and generating an adjusted timing advance value that is different from the current timing advance value by an amount that is less than the threshold.

Aspect 29: The method of Aspect 28, wherein the previous combination of the UE location and the timing advance parameter comprises: a previous UE location and a current timing advance parameter; a current UE location and a previous timing advance parameter; or the previous UE location and the previous timing advance parameter.

Aspect 30: The method of any of Aspects 28-29, wherein the current combination of the UE location and the timing advance parameter comprises a current UE location and a current timing advance parameter.

Aspect 31: The method of any of Aspects 28-30, wherein generating the adjusted timing advance value comprises: generating the adjusted timing advance value that is different from the current timing advance value by the amount that is less than the threshold based at least in part on a maximum magnitude allowed for a timing advance value adjustment.

Aspect 32: The method of any of Aspects 28-31, wherein generating the adjusted timing advance value comprises: generating the adjusted timing advance value that is different from the current timing advance value by the amount that is less than the threshold based at least in part on a minimum aggregate adjustment rate.

Aspect 33: The method of any of Aspects 28-32, wherein generating the adjusted timing advance value comprises: generating the adjusted timing advance value that is different from the current timing advance value by the amount that is less than the threshold based at least in part on a maximum aggregate adjustment rate.

Aspect 34: The method of any of Aspects 28-33, wherein the UE location is a global navigation satellite system location.

Aspect 35: The method of any of Aspects 28-34, wherein the timing advance parameter is a common timing advance parameter.

Aspect 36: The method of any of Aspects 28-35, further comprising: obtaining an updated combination of the UE location and the timing advance parameter during a gradual timing adjustment; obtaining an other indication that a difference between a non-updated timing advance value that is based at least in part on the current satellite location and a non-updated combination of the UE location and the timing advance parameter, and the current timing advance value, is greater than an other threshold; and generating an other adjusted timing advance value that is different from the current timing advance value by an amount that is less than the other threshold.

Aspect 37: The method of Aspect 36, wherein the non-updated timing advance value corresponds to a timing advance value that is not adjusted in accordance with the gradual timing adjustment.

Aspect 38: The method of Aspect 36, wherein the gradual timing adjustment is based at least in part on the adjusted timing advance value.

Aspect 39: The method of Aspect 36, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 40: The method of Aspect 36, wherein the other threshold is the same as the threshold.

Aspect 41: The method of Aspect 36, wherein the other threshold is different than the threshold.

Aspect 42: The method of Aspect 36, wherein generating the other adjusted timing advance value comprises: generating the other adjusted timing advance value that is different from the current timing advance value by the amount that is less than the other threshold based at least in part on a maximum magnitude allowed for a timing advance value adjustment.

Aspect 43: The method of Aspect 36, wherein generating the other adjusted timing advance value comprises: generating the other adjusted timing advance value that is different from the current timing advance value by the amount that is less than the other threshold based at least in part on a minimum aggregate adjustment rate.

Aspect 44: The method of Aspect 36, wherein generating the other adjusted timing advance value comprises: generating the other adjusted timing advance value that is different from the current timing advance value by the amount that is less than the other threshold based at least in part on a maximum aggregate adjustment rate.

Aspect 45: A method of wireless communication performed by a user equipment (UE), comprising: obtaining an updated combination of a UE location and a timing advance parameter during a gradual timing adjustment; obtaining an indication that a difference between a non-updated timing advance value that is based at least in part on a current satellite location and a non-updated combination of the UE location and the timing advance parameter, and a current timing advance value that is based at least in part on the current satellite location and a current combination of the UE location and the timing advance parameter, is greater than a threshold; and generating an adjusted timing advance value that is different from the current timing advance value by an amount that is less than the threshold.

Aspect 46: The method of Aspect 45, wherein the non-updated timing advance value corresponds to a timing advance value that is not adjusted in accordance with the gradual timing adjustment.

Aspect 47: The method of any of Aspects 45-46, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 48: The method of any of Aspects 45-47, wherein generating the adjusted timing advance value comprises: generating the adjusted timing advance value that is different from the current timing advance value by the amount that is less than the threshold based at least in part on a maximum magnitude allowed for a timing advance value adjustment.

Aspect 49: The method of any of Aspects 45-48, wherein generating the adjusted timing advance value comprises: generating the adjusted timing advance value that is different from the current timing advance value by the amount that is less than the threshold based at least in part on a minimum aggregate adjustment rate.

Aspect 50: The method of any of Aspects 45-49, wherein generating the adjusted timing advance value comprises: generating the adjusted timing advance value that is different from the current timing advance value by the amount that is less than the threshold based at least in part on a maximum aggregate adjustment rate.

Aspect 51: The method of any of Aspects 45-50, wherein the UE location is a global navigation satellite system location.

Aspect 52: The method of any of Aspects 45-51, wherein the timing advance parameter is a common timing advance parameter.

Aspect 53: The method of any of Aspects 45-52, further comprising: obtaining an other indication that a difference between a previous timing advance value that is based at least in part on the current satellite location and a previous combination of the UE location and the timing advance parameter, and a current timing advance value that is based at least in part on the current satellite location and the current combination of the UE location and the timing advance parameter, is greater than an other threshold; and generating an other adjusted timing advance value that is different from the current timing advance value by an amount that is less than the other threshold.

Aspect 54: The method of Aspect 53, wherein the previous combination of the UE location and the timing advance parameter comprises: a previous UE location and a current timing advance parameter; a current UE location and a previous timing advance parameter; or the previous UE location and the previous timing advance parameter.

Aspect 55: The method of Aspect 53, wherein the previous timing advance value corresponds to a timing advance value at a time period that is before the updated combination of the UE location and the timing advance parameter is obtained.

Aspect 56: The method of Aspect 53, wherein generating the other adjusted timing advance value comprises: generating the other adjusted timing advance value that is different from the current timing advance value by the amount that is less than the other threshold based at least in part on a maximum magnitude allowed for a timing advance value adjustment.

Aspect 57: The method of Aspect 53, wherein generating the other adjusted timing advance value comprises: generating the other adjusted timing advance value that is different from the current timing advance value by the amount that is less than the other threshold based at least in part on a minimum aggregate adjustment rate.

Aspect 58: The method of Aspect 53, wherein generating the other adjusted timing advance value comprises: generating the other adjusted timing advance value that is different from the current timing advance value by the amount that is less than the other threshold based at least in part on a maximum aggregate adjustment rate.

Aspect 59: The method of Aspect 53, wherein the other threshold is the same as the threshold.

Aspect 60: The method of Aspect 53, wherein the other threshold is different than the threshold.

Aspect 61: A method of wireless communication performed by a user equipment (UE), comprising: obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold; and generating an adjusted transmission timing interval that is different from the transmission timing interval by an amount that is less than the threshold.

Aspect 62: The method of Aspect 61, wherein the current timing advance combination is a function of a current network entity location, a current UE location, and a timing advance parameter.

Aspect 63: The method of Aspect 62, wherein the function includes one half of the current timing advance combination.

Aspect 64: The method of any of Aspects 61-63, wherein the previous timing advance combination is a function of one or more of the following: a current network entity location, a previous UE location, and a current timing advance parameter; the current network entity location, a current UE location, and a previous timing advance parameter; or the current network entity location, the previous UE location, and the previous timing advance parameter.

Aspect 65: The method of Aspect 64, wherein the function includes one half of the previous timing advance combination.

Aspect 66: The method of any of Aspects 61-65, wherein generating the adjusted transmission timing interval comprises: generating the adjusted transmission timing interval that is different from the transmission timing interval by the amount that is less than the threshold based at least in part on a maximum magnitude allowed for a timing interval adjustment.

Aspect 67: The method of any of Aspects 61-66, wherein generating the adjusted transmission timing interval comprises: generating the adjusted transmission timing interval that is different from the transmission timing interval by the amount that is less than the threshold based at least in part on a minimum aggregate adjustment rate.

Aspect 68: The method of any of Aspects 61-67, wherein generating the adjusted transmission timing interval comprises: generating the adjusted transmission timing interval that is different from the transmission timing interval by the amount that is less than the threshold based at least in part on a maximum aggregate adjustment rate.

Aspect 69: The method of any of Aspects 61-68, wherein the previous timing advance combination corresponds to a UE location and timing advance parameter that would be used without an update to the combination of the UE location and the timing advance parameter.

Aspect 70: A method of wireless communication performed by a user equipment (UE), comprising: obtaining an indication that a difference between a first timing advance value that is based at least in part on a current satellite location and a first combination of a UE location and a timing advance parameter, and a second timing advance value that is based at least in part on the current satellite location and a second combination of the UE location and the timing advance parameter, is greater than a threshold; and generating an adjusted timing advance value that is different from the second timing advance value by an amount that is less than the threshold.

Aspect 71: The method of Aspect 70, wherein the first combination of the UE location and the timing advance parameter comprises: a previous UE location and a current timing advance parameter; a current UE location and a previous timing advance parameter; or the previous UE location and the previous timing advance parameter.

Aspect 72: The method of any of Aspects 70-71, wherein the second combination of the UE location and the timing advance parameter comprises a current UE location and a current timing advance parameter.

Aspect 73: The method of any of Aspects 70-72, wherein generating the adjusted timing advance value comprises: generating the adjusted timing advance value that is different from the second timing advance value by the amount that is less than the threshold based at least in part on a maximum magnitude allowed for a timing advance value adjustment.

Aspect 74: The method of any of Aspects 70-73, wherein generating the adjusted timing advance value comprises: generating the adjusted timing advance value that is different from the second timing advance value by the amount that is less than the threshold based at least in part on a minimum aggregate adjustment rate.

Aspect 75: The method of any of Aspects 70-74, wherein generating the adjusted timing advance value comprises: generating the adjusted timing advance value that is different from the second timing advance value by the amount that is less than the threshold based at least in part on a maximum aggregate adjustment rate.

Aspect 76: The method of any of Aspects 70-75, wherein the UE location is a global navigation satellite system location.

Aspect 77: The method of any of Aspects 70-76, wherein the timing advance parameter is a common timing advance parameter.

Aspect 78: The method of any of Aspects 70-77, further comprising: obtaining an updated combination of the UE location and the timing advance parameter during a gradual timing adjustment; obtaining an other indication that a difference between a non-updated timing advance value that is based at least in part on the current satellite location and a non-updated combination of the UE location and the timing advance parameter, and the second timing advance value, is greater than an other threshold; and generating an other adjusted timing advance value that is different from the second timing advance value by an amount that is less than the other threshold.

Aspect 79: The method of Aspect 70, wherein the non-updated timing advance value corresponds to a timing advance value that is not adjusted in accordance with the gradual timing adjustment.

Aspect 80: The method of Aspect 70, wherein the gradual timing adjustment is based at least in part on the adjusted timing advance value.

Aspect 81: The method of Aspect 70, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 82: The method of Aspect 70, wherein the other threshold is the same as the threshold.

Aspect 83: The method of Aspect 70, wherein the other threshold is different than the threshold.

Aspect 84: The method of Aspect 70, wherein generating the other adjusted timing advance value comprises: generating the other adjusted timing advance value that is different from the second timing advance value by the amount that is less than the other threshold based at least in part on a maximum magnitude allowed for a timing advance value adjustment.

Aspect 85: The method of Aspect 70, wherein generating the other adjusted timing advance value comprises: generating the other adjusted timing advance value that is different from the second timing advance value by the amount that is less than the other threshold based at least in part on a minimum aggregate adjustment rate.

Aspect 86: The method of Aspect 70, wherein generating the other adjusted timing advance value comprises: generating the other adjusted timing advance value that is different from the second timing advance value by the amount that is less than the other threshold based at least in part on a maximum aggregate adjustment rate.

Aspect 87: A method of wireless communication performed by a user equipment (UE), comprising: obtaining an updated combination of a UE location and a timing advance parameter during a gradual timing adjustment; obtaining an indication that a difference between a non-updated timing advance value that is based at least in part on a current satellite location and a non-updated combination of the UE location and the timing advance parameter, and a second timing advance value that is based at least in part on the current satellite location and a second combination of the UE location and the timing advance parameter, is greater than a threshold; and generating an adjusted timing advance value that is different from the second timing advance value by an amount that is less than the threshold.

Aspect 88: The method of Aspect 87, wherein the non-updated timing advance value corresponds to a timing advance value that is not adjusted in accordance with the gradual timing adjustment.

Aspect 89: The method of any of Aspects 87-88, wherein the non-updated combination of the UE location and the timing advance parameter comprises: a non-updated UE location and a current timing advance parameter; a current UE location and a non-updated timing advance parameter; or the non-updated UE location and the non-updated timing advance parameter.

Aspect 90: The method of any of Aspects 87-89, wherein generating the adjusted timing advance value comprises: generating the adjusted timing advance value that is different from the second timing advance value by the amount that is less than the threshold based at least in part on a maximum magnitude allowed for a timing advance value adjustment.

Aspect 91: The method of any of Aspects 87-90, wherein generating the adjusted timing advance value comprises: generating the adjusted timing advance value that is different from the second timing advance value by the amount that is less than the threshold based at least in part on a minimum aggregate adjustment rate.

Aspect 92: The method of any of Aspects 87-91, wherein generating the adjusted timing advance value comprises: generating the adjusted timing advance value that is different from the second timing advance value by the amount that is less than the threshold based at least in part on a maximum aggregate adjustment rate.

Aspect 93: The method of any of Aspects 87-92, wherein the UE location is a global navigation satellite system location.

Aspect 94: The method of any of Aspects 87-93, wherein the timing advance parameter is a common timing advance parameter.

Aspect 95: The method of any of Aspects 87-94, further comprising: obtaining an other indication that a difference between a first timing advance value that is based at least in part on the current satellite location and a first combination of the UE location and the timing advance parameter, and a second timing advance value that is based at least in part on the current satellite location and the second combination of the UE location and the timing advance parameter, is greater than an other threshold; and generating an other adjusted timing advance value that is different from the second timing advance value by an amount that is less than the other threshold.

Aspect 96: The method of Aspect 95, wherein the first combination of the UE location and the timing advance parameter comprises: a previous UE location and a current timing advance parameter; a current UE location and a previous timing advance parameter; or the previous UE location and the previous timing advance parameter.

Aspect 97: The method of Aspect 95, wherein the first timing advance value corresponds to a timing advance value at a time period that is before the updated combination of the UE location and the timing advance parameter is obtained.

Aspect 98: The method of Aspect 95, wherein generating the other adjusted timing advance value comprises: generating the other adjusted timing advance value that is different from the second timing advance value by the amount that is less than the other threshold based at least in part on a maximum magnitude allowed for a timing advance value adjustment.

Aspect 99: The method of Aspect 95, wherein generating the other adjusted timing advance value comprises: generating the other adjusted timing advance value that is different from the second timing advance value by the amount that is less than the other threshold based at least in part on a minimum aggregate adjustment rate.

Aspect 100: The method of Aspect 95, wherein generating the other adjusted timing advance value comprises: generating the other adjusted timing advance value that is different from the second timing advance value by the amount that is less than the other threshold based at least in part on a maximum aggregate adjustment rate.

Aspect 101: The method of Aspect 95, wherein the other threshold is the same as the threshold.

Aspect 102: The method of Aspect 95, wherein the other threshold is different than the threshold.

Aspect 103: A method of wireless communication performed by a user equipment (UE), comprising: obtaining an indication that a transmission timing interval between a previous uplink transmission and a current uplink transmission differs from a value that is based at least in part on a slot length, a number of slots between the previous uplink transmission and the current uplink transmission, a current timing advance combination, and a previous timing advance combination, by an amount that is greater than a threshold; and generating an adjusted transmission timing interval that is different from the transmission timing interval by an amount that is less than the threshold.

Aspect 104: The method of Aspect 103, wherein the current timing advance combination is a function of a current network entity location, a current UE location, and a timing advance parameter.

Aspect 105: The method of Aspect 104, wherein the function includes one half of the current timing advance combination.

Aspect 106: The method of any of Aspects 103-105, wherein the previous timing advance combination is a function of one or more of the following: a current network entity location, a previous UE location, and a current timing advance parameter; the current network entity location, a current UE location, and a previous timing advance parameter; or the current network entity location, the previous UE location, and the previous timing advance parameter.

Aspect 107: The method of Aspect 106, wherein the function includes one half of the previous timing advance combination.

Aspect 108: The method of any of Aspects 103-107, wherein generating the adjusted transmission timing interval comprises: generating the adjusted transmission timing interval that is different from the transmission timing interval by the amount that is less than the threshold based at least in part on a maximum magnitude allowed for a timing interval adjustment.

Aspect 109: The method of any of Aspects 103-108, wherein generating the adjusted transmission timing interval comprises: generating the adjusted transmission timing interval that is different from the transmission timing interval by the amount that is less than the threshold based at least in part on a minimum aggregate adjustment rate.

Aspect 110: The method of any of Aspects 103-109, wherein generating the adjusted transmission timing interval comprises: generating the adjusted transmission timing interval that is different from the transmission timing interval by the amount that is less than the threshold based at least in part on a maximum aggregate adjustment rate.

Aspect 111: The method of any of Aspects 103-110, wherein the previous timing advance combination corresponds to a UE location and timing advance parameter that would be used without an update to the combination of the UE location and the timing advance parameter.

Aspect 112: An apparatus for wireless communication at a device, comprising a processor; memory coupled with the processor; and instructions stored in the memory and executable by the processor to cause the apparatus to perform the method of one or more of Aspects 1-15.

Aspect 113: A device for wireless communication, comprising a memory and one or more processors coupled to the memory, the one or more processors configured to perform the method of one or more of Aspects 1-15.

Aspect 114: An apparatus for wireless communication, comprising at least one means for performing the method of one or more of Aspects 1-15.

Aspect 115: A non-transitory computer-readable medium storing code for wireless communication, the code comprising instructions executable by a processor to perform the method of one or more of Aspects 1-15.

Aspect 116: A non-transitory computer-readable medium storing a set of instructions for wireless communication, the set of instructions comprising one or more instructions that, when executed by one or more processors of a device, cause the device to perform the method of one or more of Aspects 1-15.

Aspect 117: An apparatus for wireless communication at a device, comprising a processor; memory coupled with the processor; and instructions stored in the memory and executable by the processor to cause the apparatus to perform the method of one or more of Aspects 16-18.

Aspect 118: A device for wireless communication, comprising a memory and one or more processors coupled to the memory, the one or more processors configured to perform the method of one or more of Aspects 16-18.

Aspect 119: An apparatus for wireless communication, comprising at least one means for performing the method of one or more of Aspects 16-18.

Aspect 120: A non-transitory computer-readable medium storing code for wireless communication, the code comprising instructions executable by a processor to perform the method of one or more of Aspects 16-18.

Aspect 121: A non-transitory computer-readable medium storing a set of instructions for wireless communication, the set of instructions comprising one or more instructions that, when executed by one or more processors of a device, cause the device to perform the method of one or more of Aspects 16-18.

Aspect 122: An apparatus for wireless communication at a device, comprising a processor; memory coupled with the processor; and instructions stored in the memory and executable by the processor to cause the apparatus to perform the method of one or more of Aspects 19-27.

Aspect 123: A device for wireless communication, comprising a memory and one or more processors coupled to the memory, the one or more processors configured to perform the method of one or more of Aspects 19-27.

Aspect 124: An apparatus for wireless communication, comprising at least one means for performing the method of one or more of Aspects 19-27.

Aspect 125: A non-transitory computer-readable medium storing code for wireless communication, the code comprising instructions executable by a processor to perform the method of one or more of Aspects 19-27.

Aspect 126: A non-transitory computer-readable medium storing a set of instructions for wireless communication, the set of instructions comprising one or more instructions that, when executed by one or more processors of a device, cause the device to perform the method of one or more of Aspects 19-27.

Aspect 127: An apparatus for wireless communication at a device, comprising a processor; memory coupled with the processor; and instructions stored in the memory and executable by the processor to cause the apparatus to perform the method of one or more of Aspects 28-44.

Aspect 128: A device for wireless communication, comprising a memory and one or more processors coupled to the memory, the one or more processors configured to perform the method of one or more of Aspects 28-44.

Aspect 129: An apparatus for wireless communication, comprising at least one means for performing the method of one or more of Aspects 28-44.

Aspect 130: A non-transitory computer-readable medium storing code for wireless communication, the code comprising instructions executable by a processor to perform the method of one or more of Aspects 28-44.

Aspect 131: A non-transitory computer-readable medium storing a set of instructions for wireless communication, the set of instructions comprising one or more instructions that, when executed by one or more processors of a device, cause the device to perform the method of one or more of Aspects 28-44.

Aspect 132: An apparatus for wireless communication at a device, comprising a processor; memory coupled with the processor; and instructions stored in the memory and executable by the processor to cause the apparatus to perform the method of one or more of Aspects 45-60.

Aspect 133: A device for wireless communication, comprising a memory and one or more processors coupled to the memory, the one or more processors configured to perform the method of one or more of Aspects 45-60.

Aspect 134: An apparatus for wireless communication, comprising at least one means for performing the method of one or more of Aspects 45-60.

Aspect 135: A non-transitory computer-readable medium storing code for wireless communication, the code comprising instructions executable by a processor to perform the method of one or more of Aspects 45-60.

Aspect 136: A non-transitory computer-readable medium storing a set of instructions for wireless communication, the set of instructions comprising one or more instructions that, when executed by one or more processors of a device, cause the device to perform the method of one or more of Aspects 45-60.

Aspect 137: An apparatus for wireless communication at a device, comprising a processor; memory coupled with the processor; and instructions stored in the memory and executable by the processor to cause the apparatus to perform the method of one or more of Aspects 61-69.

Aspect 138: A device for wireless communication, comprising a memory and one or more processors coupled to the memory, the one or more processors configured to perform the method of one or more of Aspects 61-69.

Aspect 139: An apparatus for wireless communication, comprising at least one means for performing the method of one or more of Aspects 61-69.

Aspect 140: A non-transitory computer-readable medium storing code for wireless communication, the code comprising instructions executable by a processor to perform the method of one or more of Aspects 61-69.

Aspect 141: A non-transitory computer-readable medium storing a set of instructions for wireless communication, the set of instructions comprising one or more instructions that, when executed by one or more processors of a device, cause the device to perform the method of one or more of Aspects 61-69.

Aspect 142: An apparatus for wireless communication at a device, comprising a processor; memory coupled with the processor; and instructions stored in the memory and executable by the processor to cause the apparatus to perform the method of one or more of Aspects 70-86.

Aspect 143: A device for wireless communication, comprising a memory and one or more processors coupled to the memory, the one or more processors configured to perform the method of one or more of Aspects 70-86.

Aspect 144: An apparatus for wireless communication, comprising at least one means for performing the method of one or more of Aspects 70-86.

Aspect 145: A non-transitory computer-readable medium storing code for wireless communication, the code comprising instructions executable by a processor to perform the method of one or more of Aspects 70-86.

Aspect 146: A non-transitory computer-readable medium storing a set of instructions for wireless communication, the set of instructions comprising one or more instructions that, when executed by one or more processors of a device, cause the device to perform the method of one or more of Aspects 70-86.

Aspect 147: An apparatus for wireless communication at a device, comprising a processor; memory coupled with the processor; and instructions stored in the memory and executable by the processor to cause the apparatus to perform the method of one or more of Aspects 87-102.

Aspect 148: A device for wireless communication, comprising a memory and one or more processors coupled to the memory, the one or more processors configured to perform the method of one or more of Aspects 87-102.

Aspect 149: An apparatus for wireless communication, comprising at least one means for performing the method of one or more of Aspects 87-102.

Aspect 150: A non-transitory computer-readable medium storing code for wireless communication, the code comprising instructions executable by a processor to perform the method of one or more of Aspects 87-102.

Aspect 151: A non-transitory computer-readable medium storing a set of instructions for wireless communication, the set of instructions comprising one or more instructions that, when executed by one or more processors of a device, cause the device to perform the method of one or more of Aspects 87-102.

Aspect 152: An apparatus for wireless communication at a device, comprising a processor; memory coupled with the processor; and instructions stored in the memory and executable by the processor to cause the apparatus to perform the method of one or more of Aspects 103-111.

Aspect 153: A device for wireless communication, comprising a memory and one or more processors coupled to the memory, the one or more processors configured to perform the method of one or more of Aspects 103-111.

Aspect 154: An apparatus for wireless communication, comprising at least one means for performing the method of one or more of Aspects 103-111.

Aspect 155: A non-transitory computer-readable medium storing code for wireless communication, the code comprising instructions executable by a processor to perform the method of one or more of Aspects 103-111.

Aspect 156: A non-transitory computer-readable medium storing a set of instructions for wireless communication, the set of instructions comprising one or more instructions that, when executed by one or more processors of a device, cause the device to perform the method of one or more of Aspects 103-111.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to cause the UE to:
   obtain an indication that a difference between a first timing advance value and a second timing advance value is greater than a threshold, wherein the first timing advance value is based at least in part on a current satellite location and a first combination of a UE location and a timing advance parameter, and wherein the second timing advance value is based at least in part on the current satellite location and a second combination of the UE location and the timing advance parameter; and
   perform, during a gradual timing adjustment, a set of adjustments to the second timing advance value, wherein:
   an adjustment, of the set of adjustments, includes a timing change by an amount that is less than the threshold;
   the threshold is based at least in part on a frequency range of uplink signals from the UE and a sub-carrier spacing of the uplink signals; and
   the adjustment is based at least in part on the frequency range and the sub- carrier spacing.

2. The apparatus of claim 1, wherein the first combination of the UE location and the timing advance parameter comprises one or more of:
   a previous UE location and a current timing advance parameter;
   a current UE location and a previous timing advance parameter; or
   the previous UE location and the previous timing advance parameter.

3. The apparatus of claim 1, wherein the second combination of the UE location and the timing advance parameter comprises a current UE location and a current timing advance parameter.

4. The apparatus of claim 1, wherein the timing change is based at least in part on a maximum magnitude allowed for a timing advance value adjustment.

5. The apparatus of claim 1, wherein the timing change is based at least in part on a minimum aggregate adjustment rate.

6. The apparatus of claim 1, wherein the timing change is based at least in part on a maximum aggregate adjustment rate.

7. The apparatus of claim 1, further comprising:
a transceiver,
 wherein the one or more processors, to obtain the indication, are configured to cause the transceiver to obtain the indication, and
 wherein the one or more processors, to perform the set of adjustments, are configured to cause the transceiver to perform the set of adjustments.

8. The apparatus of claim 1, wherein the one or more processors are further configured to cause the UE to:
 obtain an updated combination of the UE location and the timing advance parameter during the gradual timing adjustment;
 obtain an other indication that a difference between a non-updated timing advance value that is based at least in part on the current satellite location and a non-updated combination of the UE location and the timing advance parameter, and the second timing advance value, is greater than an other threshold; and
 generate an adjusted timing advance value that is different from the second timing advance value by an amount that is less than the other threshold.

9. The apparatus of claim 8, wherein the non-updated timing advance value corresponds to a timing advance value that is not adjusted in accordance with the gradual timing adjustment.

10. The apparatus of claim 8, wherein the gradual timing adjustment is based at least in part on the adjusted timing advance value.

11. The apparatus of claim 8, wherein the non-updated combination of the UE location and the timing advance parameter comprises one or more of:
 a non-updated UE location and a current timing advance parameter;
 a current UE location and a non-updated timing advance parameter; or
 the non-updated UE location and the non-updated timing advance parameter.

12. The apparatus of claim 8, wherein the other threshold is the same as the threshold.

13. The apparatus of claim 8, wherein the other threshold is different than the threshold.

14. The apparatus of claim 8, wherein the one or more processors, to generate the adjusted timing advance value, are configured to cause the UE to:
 generate the adjusted timing advance value that is different from the second timing advance value by the amount that is less than the other threshold based at least in part on a maximum magnitude allowed for a timing advance value adjustment.

15. The apparatus of claim 8, wherein the one or more processors, to generate the adjusted timing advance value, are configured to cause the UE to:
 generate the other adjusted timing advance value that is different from the second timing advance value by the amount that is less than the other threshold based at least in part on a minimum aggregate adjustment rate or a maximum aggregate adjustment rate.

16. A method of wireless communication performed at a user equipment (UE), comprising:
 obtaining an indication that a difference between a first timing advance value and a second timing advance value is greater than a threshold, wherein the first timing advance value is based at least in part on a current satellite location and a first combination of a UE location and a timing advance parameter, and wherein the second timing advance value is based at least in part on the current satellite location and a second combination of the UE location and the timing advance parameter; and
 performing, during a gradual timing adjustment, a set of adjustments to the second timing advance value, wherein:
  an adjustment, of the set of adjustments, includes a timing change by an amount that is less than the threshold;
  the threshold is based at least in part on a frequency range of uplink signals from the UE and a sub-carrier spacing of the uplink signals; and
  the adjustment is based at least in part on the frequency range and the sub-carrier spacing.

17. The method of claim 16, wherein the first combination of the UE location and the timing advance parameter comprises one or more of:
 a previous UE location and a current timing advance parameter;
 a current UE location and a previous timing advance parameter; or
 the previous UE location and the previous timing advance parameter.

18. The method of claim 16, wherein the second combination of the UE location and the timing advance parameter comprises a current UE location and a current timing advance parameter.

19. The method of claim 16, wherein the timing change is based at least in part on:
 a maximum magnitude allowed for a timing advance value adjustment,
 a minimum aggregate adjustment rate, or
 a maximum aggregate adjustment rate.

20. The method of claim 16, further comprising:
 obtaining an updated combination of the UE location and the timing advance parameter during a gradual timing adjustment;
 obtaining an other indication that a difference between a non-updated timing advance value that is based at least in part on the current satellite location and a non-updated combination of the UE location and the timing advance parameter, and the second timing advance value, is greater than an other threshold; and
 generating an adjusted timing advance value that is different from the second timing advance value by an amount that is less than the other threshold.

21. The method of claim 20, wherein the non-updated timing advance value corresponds to a timing advance value that is not adjusted in accordance with the gradual timing adjustment.

22. The method of claim 20, wherein the gradual timing adjustment is based at least in part on the adjusted timing advance value.

23. The method of claim 20, wherein the non-updated combination of the UE location and the timing advance parameter comprises one or more of:
 a non-updated UE location and a current timing advance parameter;

a current UE location and a non-updated timing advance parameter; or the non-updated UE location and the non-updated timing advance parameter.

24. The method of claim 20, wherein:

the other threshold is the same as the threshold, or the other threshold is different than the threshold.

25. The method of claim 20, wherein generating the adjusted timing advance value comprises:

generating the adjusted timing advance value that is different from the second timing advance value by the amount that is less than the other threshold based at least in part on:

a maximum magnitude allowed for a timing advance value adjustment, a minimum aggregate adjustment rate, or a maximum aggregate adjustment rate.

26. A non-transitory computer-readable medium storing a set of instructions for wireless communication, the set of instructions comprising:

one or more instructions that, when executed by one or more processors of a user equipment (UE), cause the UE to:

obtain an indication that a difference between a first timing advance value and a second timing advance value is greater than a threshold, wherein the first timing advance value is based at least in part on a current satellite location and a first combination of a UE location and a timing advance parameter, and wherein the second timing advance value is based at least in part on the current satellite location and a second combination of the UE location and the timing advance parameter; and perform, during a gradual timing adjustment, a set of adjustments to the second timing advance value, wherein;

an adjustment, of the set of adjustments, includes a timing change by an amount that is less than the threshold;

the threshold is based at least in part on a frequency range of uplink signals from the UE and a sub-carrier spacing of the uplink signals; and the adjustment is based at least in part on the frequency range and the sub- carrier spacing.

27. The non-transitory computer-readable medium of claim 26, wherein the first combination of the UE location and the timing advance parameter comprises one or more of:

a previous UE location and a current timing advance parameter;

a current UE location and a previous timing advance parameter; or the previous UE location and the previous timing advance parameter.

28. The non-transitory computer-readable medium of claim 26, wherein the second combination of the UE location and the timing advance parameter comprises a current UE location and a current timing advance parameter.

29. The non-transitory computer-readable medium of claim 26, wherein the timing change is based at least in part on:

a maximum magnitude allowed for a timing advance value adjustment, a minimum aggregate adjustment rate, or a maximum aggregate adjustment rate.

30. The non-transitory computer-readable medium of claim 26, wherein the one or more instructions, when executed by the one or more processors, further cause the UE to:

obtain an updated combination of the UE location and the timing advance parameter during the gradual timing adjustment;

obtain an other indication that a difference between a non-updated timing advance value that is based at least in part on the current satellite location and a non-updated combination of the UE location and the timing advance parameter, and the second timing advance value, is greater than an other threshold; and generate an adjusted timing advance value that is different from the second timing advance value by an amount that is less than the other threshold.

31. The non-transitory computer-readable medium of claim 30, wherein the gradual timing adjustment is based at least in part on the adjusted timing advance value.

32. The non-transitory computer-readable medium of claim 30, wherein the non-updated combination of the UE location and the timing advance parameter comprises one or more of:

a non-updated UE location and a current timing advance parameter;

a current UE location and a non-updated timing advance parameter; or the non-updated UE location and the non-updated timing advance parameter.

33. The non-transitory computer-readable medium of claim 3, wherein the non-updated timing advance value corresponds to a timing advance value that is not adjusted in accordance with the gradual timing adjustment.

34. An apparatus for wireless communication, comprising:

means for obtaining an indication that a difference between a first timing advance value and a second timing advance value is greater than a threshold, wherein the first timing advance value is based at least in part on a current satellite location and a first combination of an apparatus location and a timing advance parameter, and wherein the second timing advance value is based at least in part on the current satellite location and a second combination of the apparatus location and the timing advance parameter; and performing, during a gradual timing adjustment, a set of adjustments to the second timing advance value, wherein;

an adjustment, of the set of adjustments, includes a timing change by an amount that is less than the threshold;

the threshold is based at least in part on a frequency range of uplink signals from the apparatus and a sub-carrier spacing of the uplink signals; and the adjustment is based at least in part on the frequency range and the sub-carrier spacing.

35. The apparatus of claim 34, wherein the timing change is based at least in part on a maximum magnitude allowed for a timing advance value adjustment.

36. The apparatus of claim 34, wherein the timing change is based at least in part on a minimum aggregate adjustment rate.

37. The apparatus of claim 34, wherein the timing change is based at least in part on a maximum aggregate adjustment rate.

* * * * *